United States Patent [19]
Biegel et al.

[11] Patent Number: 5,608,720
[45] Date of Patent: Mar. 4, 1997

[54] CONTROL SYSTEM AND OPERATIONS SYSTEM INTERFACE FOR A NETWORK ELEMENT IN AN ACCESS SYSTEM

[75] Inventors: Charles H. Biegel, Sterling; Nicholas J. Carter, Chantilly; Chung Chen, Herndon; Michael Christofferson, Falls Church; Mahesh P. Desai, Annandale; Rita A. Eberhart, Herndon; Steven M. Klonsky, Arlington; Shaun Missett; Theodore F. Rabenko, both of Herndon; John R. Tomassone, Woodbridge; David S. Turvene, Falls Church, all of Va.

[73] Assignee: Hubbell Incorporated, Orange, Conn.

[21] Appl. No.: 258,411

[22] Filed: Jun. 10, 1994

Related U.S. Application Data

[63] Continuation-in-part of Ser. No. 31,395, Mar. 9, 1993, abandoned.

[51] Int. Cl.$^6$ .................................................. G06F 7/00
[52] U.S. Cl. .................................... 370/249; 370/465
[58] Field of Search ........................ 370/79, 85.13, 370/60, 68.1, 60.1, 58.1, 58.2, 58.3, 110.1, 94.1, 94.2, 13, 17; 395/200.06, 427, 600, 650, 700, 775, 200.09, 200.03, 200.2; 364/DIG. 1; 379/90, 201

[56] References Cited

U.S. PATENT DOCUMENTS 5,204,955  4/1993  Kagei et al. .......................... 395/575
5,295,139  3/1994  Palmer .................................. 370/60
5,367,635  11/1994  Bauer .................................. 395/200

OTHER PUBLICATIONS

Table of Contents for Bellcore Technical Reference TR–TSY–000303, Issue 2, Dec. 1992 on Integrated Digital Loop Carrier System Generic Requirements, Objectives and Interface.
Table of Contents for Bellcore Technical Reference TR–NWT–000303, Supplement 2, Issue 1, Oct. 1989, on IDLC System Generic Requirements, Objectives and Interface: Feature Set C–SONET Interface.
Desai, "Migration From TLI to CMISE Operations System Interfaces in Next Generation Digital Loop Carrier Systems" paper presented at the National Fiber Optics Engineers Conference, New Orleans, Louisiana on Jun. 12–16, 1994.

Primary Examiner—Wellington Chin
Assistant Examiner—Huy D. Vu
Attorney, Agent, or Firm—Jerry M. Presson; John E. Holmes; Stacey J. Longanecker

[57] ABSTRACT

A control system for a network element (NE) such as a remote digital terminal (RDT) in an integrated digital loop carrier (DLC) system is provided which comprises subsystems for operating circuit packs and for providing functions that are common to the circuit packs. Each subsystem has a subagent residing on a network processor circuit pack. The subagents communicate via a common subagent interface. A NE which supports both OSI and non-OSI interfaces such as Transaction Language 1 (TL1) and Common Management Services Element (CMISE) interfaces is provided, along with a method for mapping TL1 commands to CMISE messages using TL1 proxy objects.

30 Claims, 36 Drawing Sheets

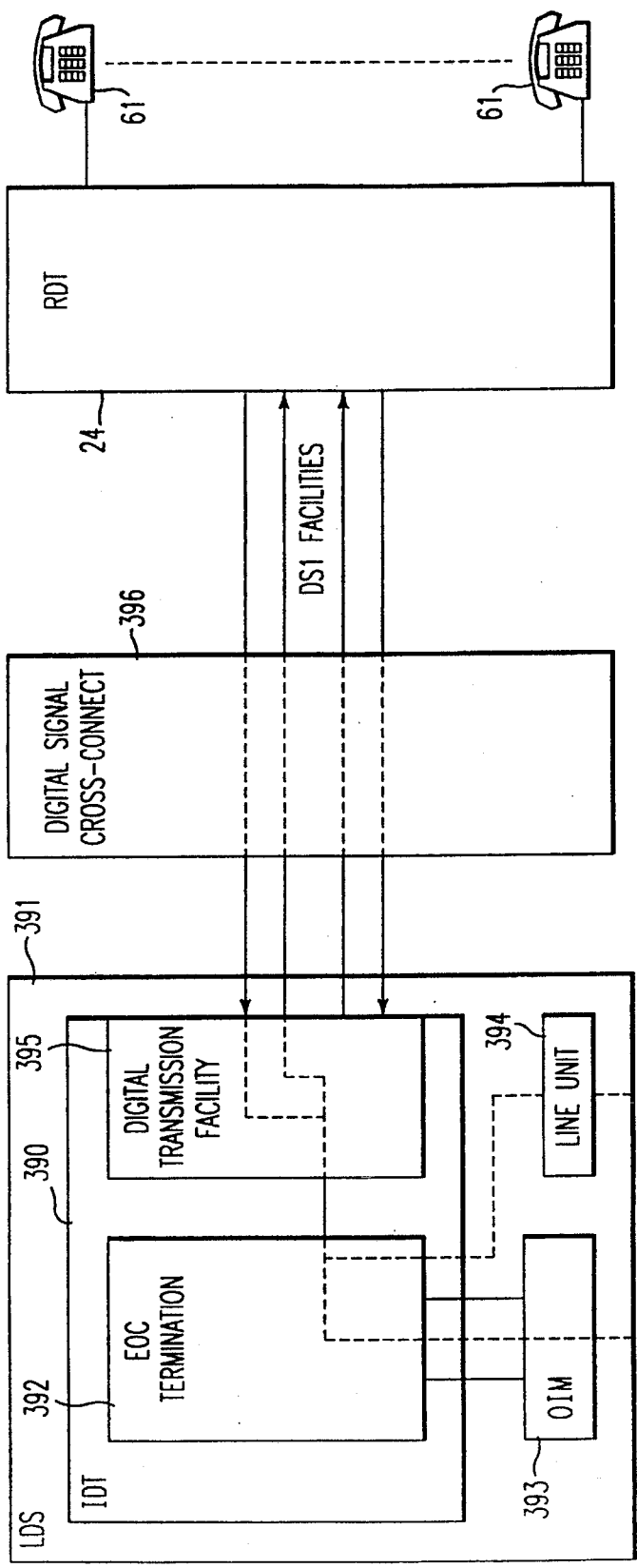
FIG. 1
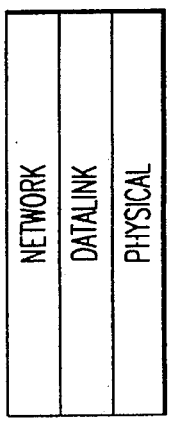
FIG. 2B
FIG. 2A

| OBJECT CLASS | NUMBER OF INSTANCES | OBJECT INSTANCE NAMES | RELATIONSHIP | | |
|---|---|---|---|---|---|
| | | | TYPE | TO CLASS | TO NAME |
| ADMINISTRATIVE SUBAGENT | 1 | ADMINISTRATIVE SUBAGENT | – | – | – |
| NETWORK ELEMENT | 1 | NETWORK ELEMENT | SUPPORTING | VIRTUAL TERMINAL | ALL |
| VIRTUAL NETWORK ELEMENT | up to 28 | 1–28 | CONTAINER | EQUIPMENT | ALL |
| | | | SUPPORTED | NETWORK ELEMENT | NETWORK ELEMENT |
| | | | SUPPORTING | DS1 FRAMED PATH TERMINATION | ALL ASSIGNED TO TERMINAL |
| | | | SUPPORTING | SUBSCRIBER LINE TERMINATION | ALL ASSIGNED TO TERMINAL |
| MEMORY | 4 | LOCAL WORKING, LOCAL NONVOLATILE, REMOTE WORKING, REMOTE NONVOLATILE | – | – | – |
| SESSION | 4 | 1–4 | SUPPORTED | LOCAL ASYNC TERMINATION | SAME AS SESSION |

FIG. 23

| OBJECT CLASS | NUMBER OF INSTANCES | OBJECT INSTANCE NAMES | RELATIONSHIP | | |
|---|---|---|---|---|---|
| | | | TYPE | TO | |
| | | | | CLASS | NAME |
| NMIS SUBAGENT | 1 | NMIS SUBAGENT | NONE | – | – |
| LOCAL ASYNC INTERFACE | 4 | 1–4 | NONE | – | – |

FIG. 24

| OBJECT CLASS | NUMBER OF INSTANCES | OBJECT INSTANCE NAMES | RELATIONSHIP | | |
|---|---|---|---|---|---|
| | | | TYPE | TO | |
| | | | | CLASS | NAME |
| SAI TAS SUBAGENT | 1 | TAS SUBAGENT | NONE | – | – |
| EQUIPMENT HOLDER | 10 | 1–10 CCS HAS 25 EQUIPMENT SLOTS. FIRST 10 SLOTS RESERVED FOR TAS SUBAGENT | CONTAINER | CIRCUIT PACK | – |
| | | | CONTAINED | EQUIPMENT | CCS SHELF |
| CIRCUIT PACK | 2 | SYNC A,B | CONTAINED | EQUIPMENT HOLDER | SYNC A → 1 SYNC B → 2 |
| | | | PROTECTING | CIRCUIT PACK | MATE PACK(S) |
| | | | PROTECTED | CIRCUIT PACK | MATE PACK(S) |

FIG. 26

| OBJECT CLASS | NUMBER OF INSTANCES | OBJECT INSTANCE NAMES | RELATIONSHIP | | |
|---|---|---|---|---|---|
| | | | TYPE | TO | |
| | | | | CLASS | NAME |
| CALL PROCESSING SUBAGENT | 1 | CALL PROCESSING SUBAGENT | NONE | – | – |
| RING VT TERMINATION | 28 | RELATIVE TO SAI DS1 FRAMED PATH TERMINATION | SUPPORTED | SAI DS1 FRAMED PATH TERMINATION | ANY |
| | | | SUPPORTING | SAI DS0 CHANNEL TERMINATION | 1-24 RELATIVE TO RING VT TERMINATION NAME |
| SAI DS0 CHANNEL TERMINATION | 672 | 1-24 RELATIVE TO SAI DS1 FRAMED PATH TERMINATION NAME | SUPPORTED | SAI RING VT TERMINATION | ANY |
| | | | SIMPLE | SAI CROSS CONNECT | ANY |
| CROSS CONNECT | 672 | 1-672 | SIMPLE | SAI DS0 CHANNEL TERMINATION | ANY |
| | | | SIMPLE | SAI SUBSCRIBER LINE TERMINATION | ANY |

FIG. 25

| OBJECT CLASS | NUMBER OF INSTANCES | OBJECT INSTANCE NAMES | RELATIONSHIP |||
| --- | --- | --- | --- | --- | --- |
| | | | TYPE | TO CLASS | NAME |
| CCS SUBAGENT | 1 | CCS SUBAGENT | NONE | – | – |
| | 1 | CCS SHELF | CONTAINER | EQUIPMENT HOLDER | – |
| EQUIPMENT HOLDER | 15 | 11–25 | CONTAINER | CIRCUIT PACK | 11 → VTG 1<br>12 → VTG 2<br>13 → VTG 3<br>14 → VTG 4<br>15 → VTG 5<br>16 → VTG 6<br>17 → VTG 7<br>18 → EPM<br>19 → SCP A<br>20 → SCP B<br>21 → ASRG A<br>22 → ASRG B<br>23 → NEP A<br>24 → NEP B<br>25 → AOW |
| | | | CONTAINED | EQUIPMENT | CCS SHELF |

*FIG. 27*

| OBJECT CLASS | NUMBER OF INSTANCES | OBJECT INSTANCE NAMES | RELATIONSHIP | | |
|---|---|---|---|---|---|
| | | | TYPE | CLASS | TO |
| | | | | | NAME |
| CIRCUIT PACK | 15 | VTG 1-7, EPM SCP A, SCP B ASRG A, ASRG B NEP A, NEP B AOW | CONTAINED | EQUIPMENT HOLDER | VTG 1 → 11 VTG 2 → 12 VTG 3 → 13 VTG 4 → 14 VTG 5 → 15 VTG 6 → 16 VTG 7 → 17 EPM → 18 SCP A → 19 SCP B → 20 ASRG A → 21 ASRG B → 22 NEP A → 23 NEP B → 24 AOW → 25 |

FIG. 28A

| | | | | | | |
|---|---|---|---|---|---|---|
| DS1 LINE TERMINATION | 28 | 1-4 RELATIVE TO VTG | SUPPORTING | DS1 FRAMED PATH TERMINATION | | IDENTICAL NAME |
| | | | SUPPORTED | CIRCUIT PACK | | 1-4 → VTG 1<br>5-8 → VTG 2<br>9-12 → VTG 3<br>13-16 → VTG 4<br>17-20 → VTG 5<br>21-24 → VTG 6<br>25-28 → VTG 7 |
| DS1 FRAMED PATH TERMINATION | 28 | 1-4 RELATIVE TO VTG | SUPPORTED | DS1 LINE TERMINATION | | IDENTICAL NAME |
| | | | SIMPLE | RING VT TERMINATION | | ANY |

FIG. 28C

| OBJECT CLASS | NUMBER OF INSTANCES | OBJECT INSTANCE NAMES | RELATIONSHIP TYPE | RELATIONSHIP TO CLASS | RELATIONSHIP TO NAME |
|---|---|---|---|---|---|
| FAS SUBAGENT | 1 | FAS SUBAGENT | NONE | – | – |
| EQUIPMENT | 1 | FAS SHELF, ONUs | CONTAINER | EQUIPMENT HOLDER | |
| EQUIPMENT HOLDER | 15 | 1-n RELATIVE TO ONU | CONTAINER | CIRCUIT PACK | |
| | | | CONTAINED | EQUIPMENT | |
| CIRCUIT PACK | 15 | | CONTAINED | EQUIPMENT HOLDER | |
| | | | SUPPORTING | DS1 LINE TERMINATION | |
| | | | PROTECTING | CIRCUIT PACK | MATE PACK(S) |
| | | | PROTECTED | CIRCUIT PACK | MATE PACK(S) |
| | | | RELATED | CIRCUIT PACK | NEIGHBORING PACKS |
| SUBSCRIBER LINE TERMINATIONS | 672 | RELATIVE TO ONU EQUIPMENT HOLDER | SIMPLE | CROSS CONNECT | 1-672 |
| | | | SUPPORTED | ONU EQUIPMENT HOLDER | PARENT |

FIG. 29

| OBJECT CLASS | NUMBER OF INSTANCES | OBJECT INSTANCE NAMES | RELATIONSHIP | | |
|---|---|---|---|---|---|
| | | | TYPE | TO CLASS | TO NAME |
| AUXILIARY SUBAGENT | 1 | AUXILIARY SUBAGENT | NONE | – | – |
| EQUIPMENT | 1 | AUXILIARY SHELF | CONTAINER | EQUIPMENT HOLDER | |
| EQUIPMENT HOLDER | 15 | 1-15 | CONTAINER | CIRCUIT PACK | |
| | | | CONTAINED | EQUIPMENT | AUXILIARY SHELF |
| CIRCUIT PACK | 15 | MAU<br>LFE | CONTAINED | EQUIPMENT HOLDER | |
| | | | SUPPORTING | DS1 LINE TERMINATION | |
| | | | PROTECTING | CIRCUIT PACK | MATE PACK(S) |
| | | | PROTECTED | CIRCUIT PACK | MATE PACK(S) |
| | | | RELATED | CIRCUIT PACK | NEIGHBORING PACKS |
| METALLIC TEST ACCESS UNIT | 1 | | SIMPLE | CIRCUIT | LFE |
| METALLIC TEST ACCESS PATH TERMINATION | 1 | | NONE | – | – |
| TEST RESPONSE CIRCUIT | 1 | | NONE | – | – |

*FIG. 30*

| OBJECT CLASS | NUMBER OF INSTANCES | OBJECT INSTANCE NAMES | RELATIONSHIP | | |
|---|---|---|---|---|---|
| | | | TYPE | TO | |
| | | | | CLASS | NAME |
| TURNUP SUBAGENT | 1 | TURNUP SUBAGENT | NONE | - | - |
| SAI TURNUP PACK LIST | 1 | TURNUP PACK LIST | - | - | - |

FIG. 31

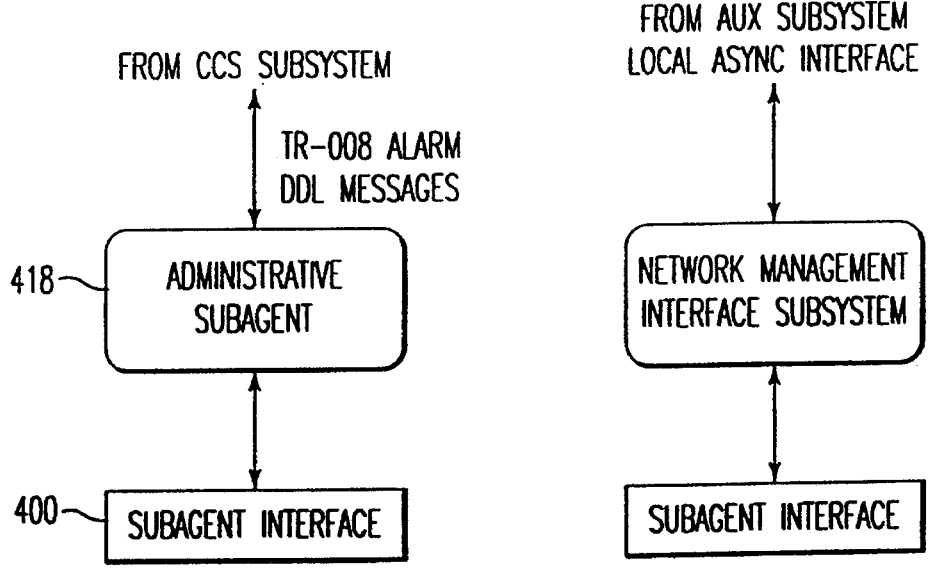
FIG. 34
FIG. 37
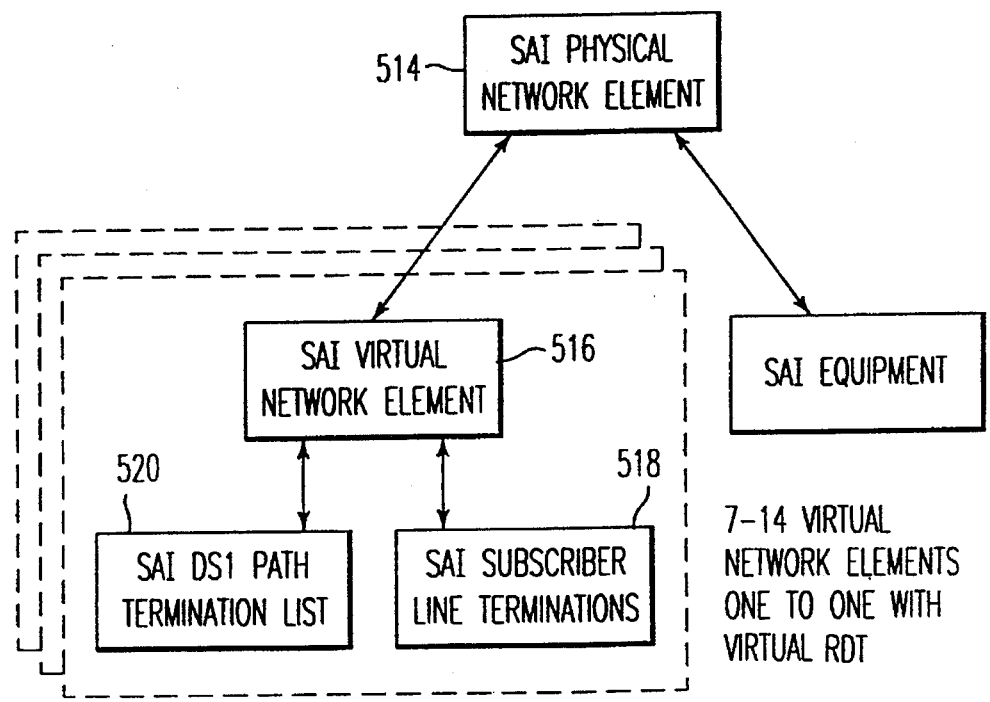
FIG. 35

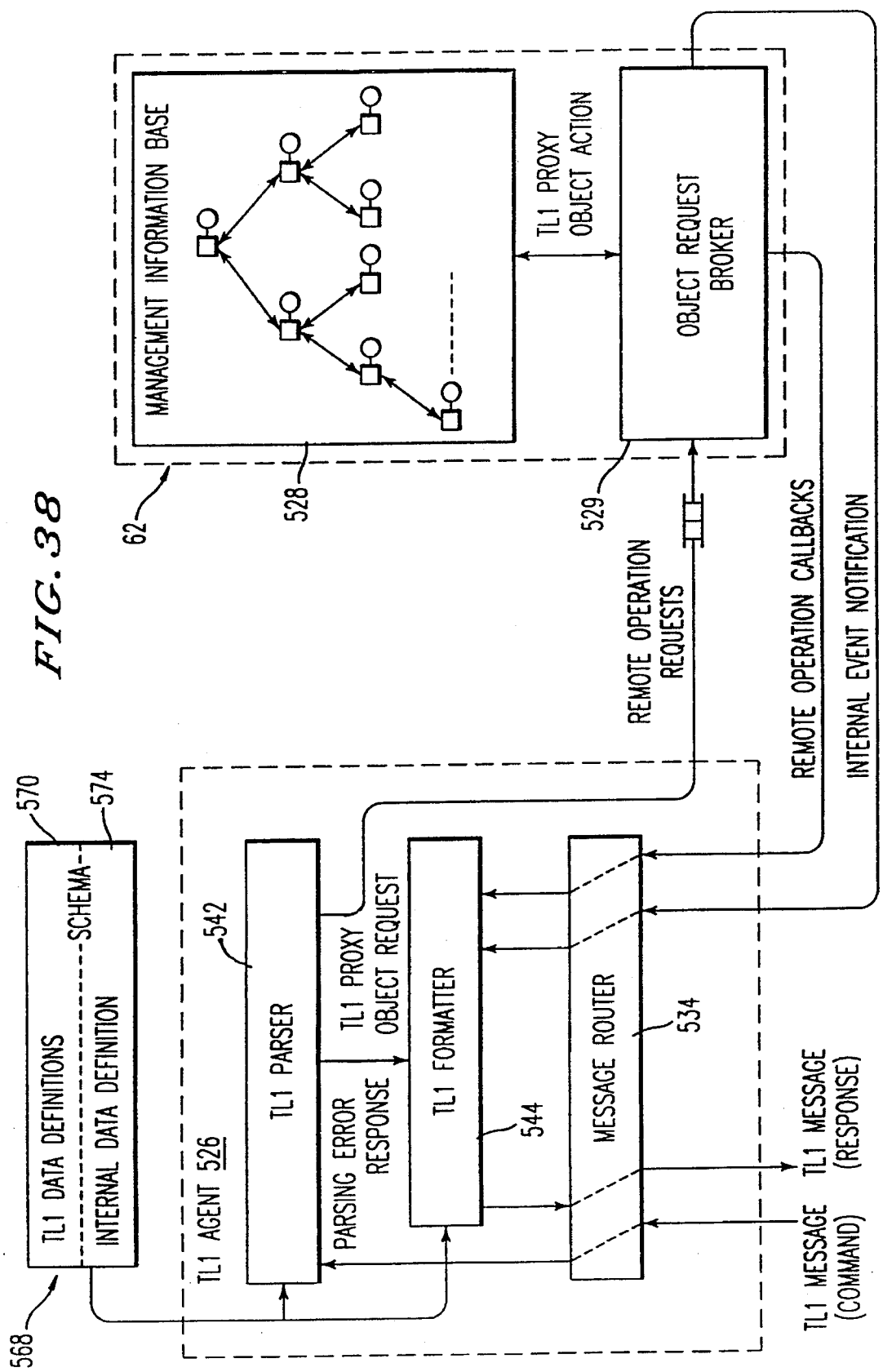

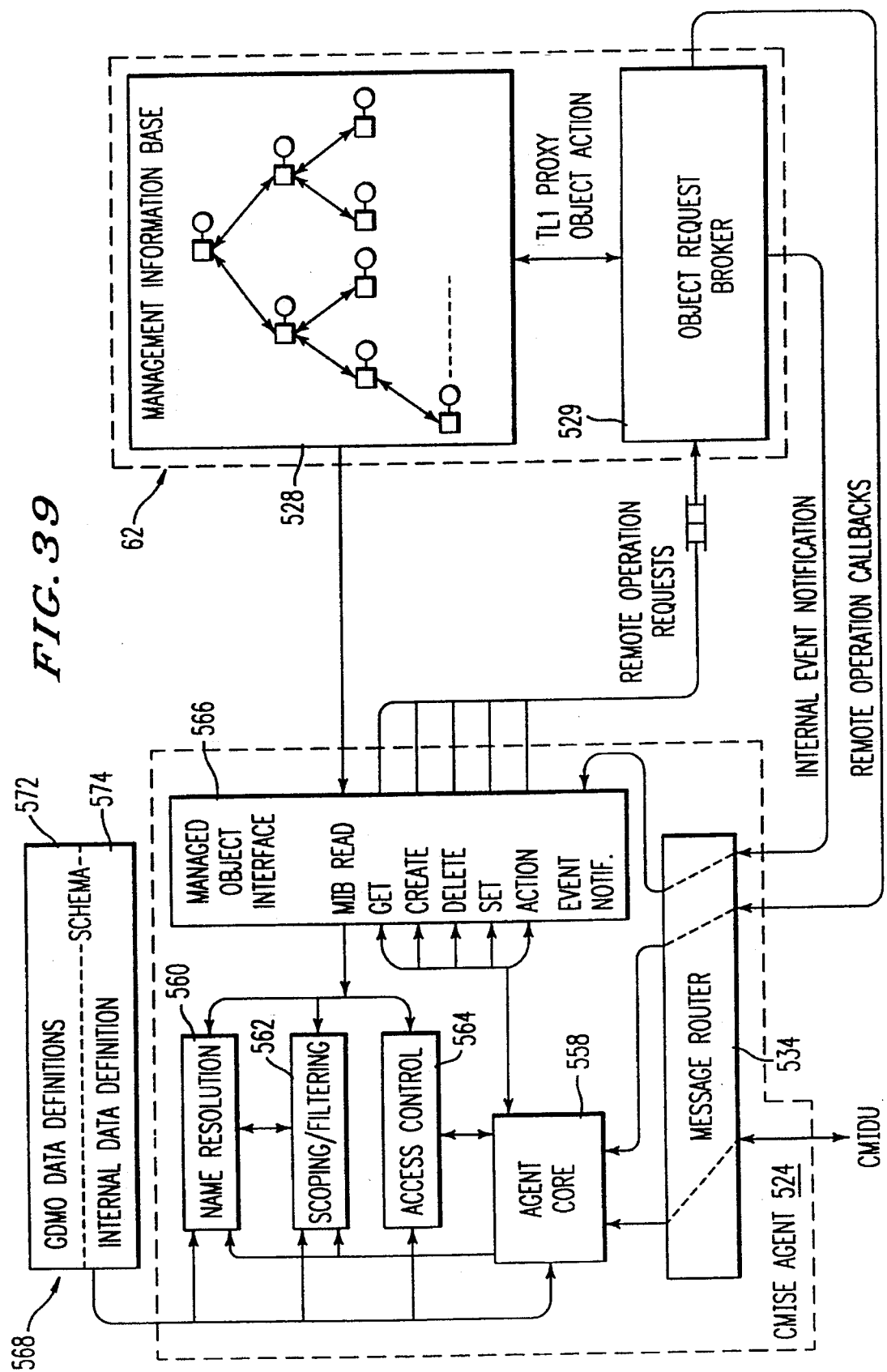

| COMMAND | AID TYPE | PARMS | MESSAGE ID | OBJECT CLASS |
|---|---|---|---|---|
| ENT-TO | BP AID | e.g.GSFN =4DU | XI_DEF_MSG_ID_DLT_SET_C | SAI_DDS_LINE_TERMINATION |
| " | " | GSFN=4LS | etc. | etc. |

*FIG. 40*

| ICN HEADER | INTER-PROCESS HEADER | APPLICATION HEADER | APPLICATION PAYLOAD |
|---|---|---|---|
|  | 4 BYTES |  |  |
|  | 1 BYTE IS MESSAGE ID |  |  |

*FIG. 41*

| AID | OBJECT CLASS | SAOID |
|---|---|---|
| AID FROM THE COMMAND | SAI_DDS_LINE_TERMINATION | SPECIFIC SAOID |
|  |  |  |

*FIG. 42*

| TL1 PARAMETER | SAI ATTRIBUTE |
|---|---|
| RATE=24 | XI_MDLT_RATE_E=XI_MDLT_RATE24_E |
| SC=N | XS_DEF_BOOLEAN_E=0 |

*FIG. 43*

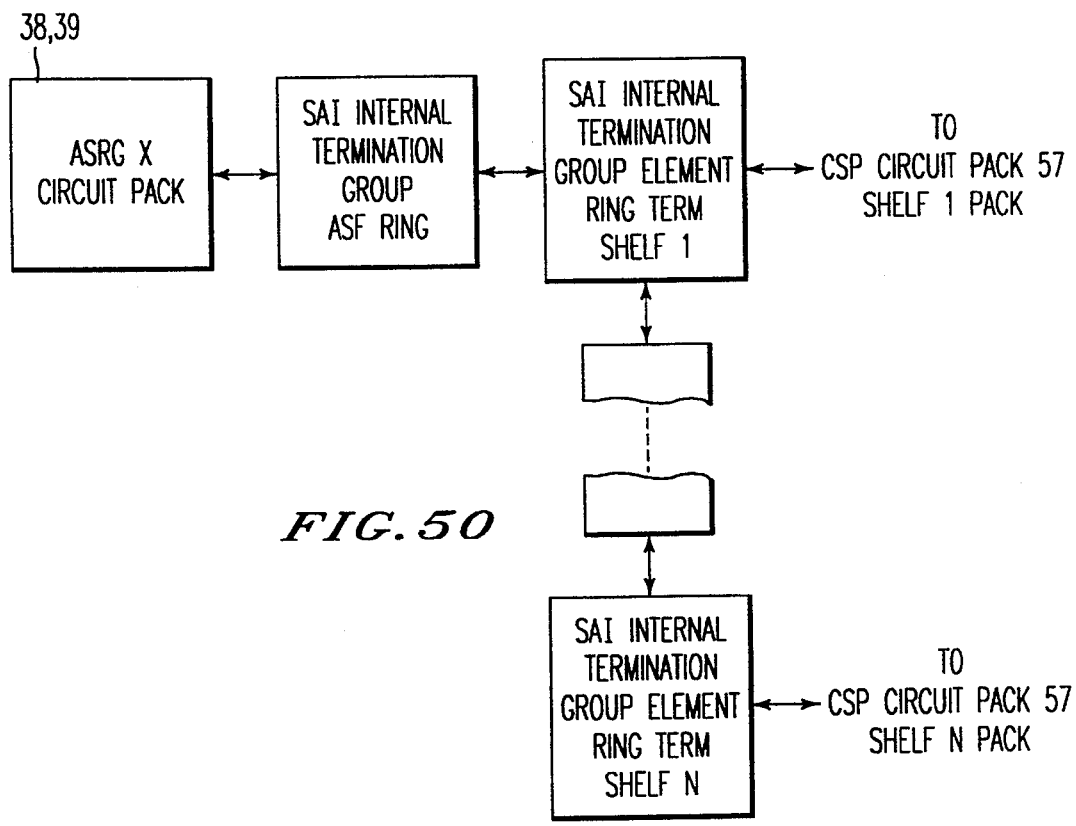
FIG.50
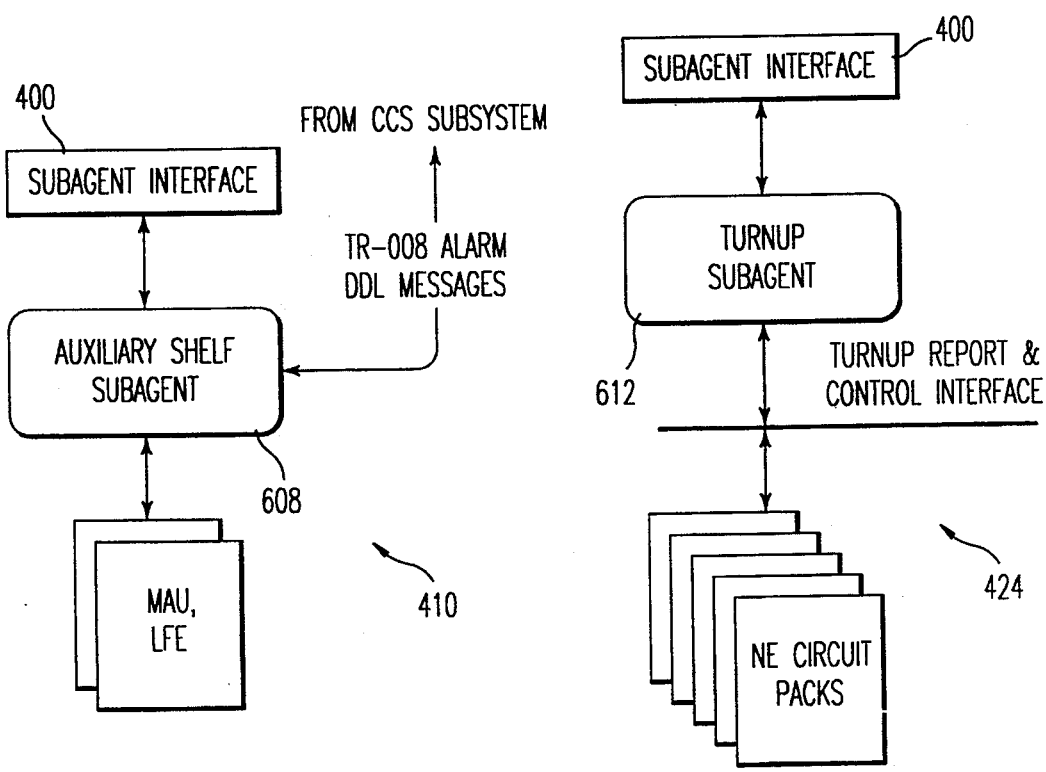
FIG.51
FIG.52

| 638 | | |
|---|---|---|
| SUBSYSTEM ID | CLASS TYPE | INSTANCE NAME |

*FIG. 57*

| 642 | 644 | 646 | 648 |
|---|---|---|---|
| TO OBJECT ID | FROM OBJECT ID | TRANSACTION ID | STATUS |

*FIG. 58*

| 650 | 652 | 654 | 656 | 658 | 660 | 662 | 664 |
|---|---|---|---|---|---|---|---|
| TO ACID | TO SAOID | FROM SAOID | FLAGS | SEQUENCE # | MESSAGE ID | SAI STATUS | TIME |

*FIG. 59*

CONTROL SYSTEM AND OPERATIONS SYSTEM INTERFACE FOR A NETWORK ELEMENT IN AN ACCESS SYSTEM

CROSS-REFERENCE TO RELATED APPLICATION

This application is a continuation-in-part of U.S. patent application Ser. No. 08/031,395, filed Mar. 9, 1993, now abandoned, the entire subject matter of which is hereby incorporated herein by reference for all purposes. Related U.S. patent application Ser. No. 08/251,848, of Ertugrul Baydar et al, filed May 31, 1994, for VIRTUAL TRIBUTARY MAPPER APPLICATION-SPECIFIC INTEGRATED CIRCUIT (ASIC) is also a continuation-in-part of U.S. patent application Ser. No. 08/031,395, filed Mar. 9, 1993, and is also hereby incorporated herein by reference for all purposes.

FIELD OF THE INVENTION

A network element (NE) in an integrated digital loop carrier or other access system system is provided which operates in accordance with a control system comprising subsystems in software for operating circuit packs in the system. The control system provides agents and subagents for each subsystem. Communication between the subsystems occurs via common messaging on a subagent interface (SAI). A NE which supports both Transaction Language 1 (TL1) and Common Management Services Element (CMISE) interfaces is also provided, along with a method for mapping TL1 messages to CMISE messages.

BACKGROUND OF THE INVENTION

Bell Operating Companies (BOCs) have shown growing interest in the deployment of the third generation digital loop carrier systems (DLCs), also called Next Generation DLCs (NGDLC) or access systems, for meeting their needs in the access network markets. In contrast to the first and second generation DLC systems (SLC-96 and SLC Series 5, respectively), these access system will be able to support a wide range of desirable features such as an Integral Synchronous Optical NETwork (SONET) fiber optic transport facility, a variety of service transport media such as twisted pair, coax, fiber, or wireless, Time Slot Interchange (TSI) for grooming and concentration, and TR-303 functionality, in addition to support of the earlier generation features. A need exists, therefore, for a network element which provides flexible interfacing to various kinds of access shelves or systems that support these features, as well as encapsulates interfaces to the access shelves.

There is a also need for generic Open Systems Interconnect (OSI) interfaces between NEs. Most of the current Operations System to Remote Digital Terminal (OS-RDT) NGDLC interfaces are based on non-OSI architectures. In the architectural structure of a NGDLC, as described by Bellcore Technical Reference TR-303, the Integrated Digital Terminal (IDT) 390 is the logical part of the Local Digital Switch (LDS) 391 that is related to a single RDT 24, as shown in FIG. 1. Operations System (OS) interfaces to the RDT will be through the LDS. FIG. 1 shows a simplified view of the OS interfaces with the RDT. The Embedded Operations Channel (EOC) 392 between the RDT 24 and the IDT 390 is terminated in the IDT. The Operations Interface Module (OIM) 393 provides the interface to the OSs. Due to the complexities involved in the design of OIM, switch vendors are waiting for the availability of open interfaces on the OSs. In the interim, a private line or a switched circuit connection through a Line Unit (LU) 394 to the Supervisory System (SS) will be used for supporting the remote operations capabilities of the RDT. References to the OS-RDT interface hereinafter generally refer to the OS⇆OIM⇆IDT⇆EOC⇆RDT interface or the SS⇆LU⇆IDT⇆EOC⇆RDT. It is expected that the OSs will have an Open Systems Interconnect (OSI) interface in the future. BOCs therefore have a strong preference for the RDT-LDS interface to be fully compatible with the evolving OS interface architectures. With the rapid increase in the number of OS communication interfaces to the Network Elements (NEs), the need for generic OSI interfaces between the NEs and the OSs is becoming more of a requirement than an objective from the BOCs perspective. Bellcore has made significant contributions in this direction by defining the Generic Interface requirements based on the OSI model.

Manufacturers of access systems generally choose between the following system designs:

a. A system that meets current non-OSI architecture requirements, and provides an upgrade path to OSI architecture when the OSs are ready. An upgrade path most likely would include hardware and software upgrades and, in some cases, possibly replacing parts of the old system with the new ones.

b. A system that meets the OSI architecture requirements at some later time, because currently most of the OS interfaces are based on a non-OSI architecture.

Neither of the above two approaches provides a smooth migration from non-OSI to OSI architectures.

A highly desirable approach is to implement the LDS-RDT interface in such a manner that it works with currently prevalent non-OSI architectures and is also compatible with the forthcoming OSI-based architecture. When the OSI-based LDS-RDT interface becomes available in the digital switches, the BOCs, therefore, will not have to incur substantial costs to replace all or part of existing equipment to achieve the desired generic interface. Differences between the non-OSI and OSI models of LDS-RDT interfaces are provided below to illustrate the advantages of using this approach.

In the non-OSI, e.g., TL1 architecture, there are only three layers (i.e., the Network, Datalink, and Physical layers), as shown in FIG. 2A. The operations application messages are mapped directly to the network layer or datalink layer of the OSI reference model. The application messages for operations in the non-OSI environment are defined using TL1. The RDTs based on the non-OSI architecture support at least one of the following two protocols: X.25 Permanent Virtual Circuit (PVC) or X.25 Switched Virtual Circuit (SVC). As an example, the following TL1 command is used to edit the information associated with a particular T1 line:

ED-T1::<aid>:<ctag>:::LINECDE=B8ZS

In a typical implementation (hereinafter referred to as TL1-only implementation), the RDT has an array of structures that holds all the necessary information related to T1 entities. The information contained in various fields includes the address to which that particular array element is related to in the RDT, and other parameters like the Linecode (AMI, B8ZS), framing format (SF,ESF), Sequence (D4, D1D), etc. Upon successful receipt of the command from the OS, the RDT applications modify the information associated with the appropriate field in the appropriate array element. The results of this operation are sent to the OS upon completion of the operation.

By contrast, in the OSI architecture, there are more layers and operations application messages mapped to layer 7 of the OSI reference model. The operation messages are written using Common Management Information Services (CMIS), and the Remote Operations Service (ROS) is used to support CMIS. The particular application-service-elements that provide CMIS and ROS services are referred to as CMISE and ROSE, respectively. The transfer syntax for the messager is Abstract Syntax Notation 1 (ASN.1). FIG. 2B shows the protocol stack for the NGDLC EOC. As shown in the figure, layers 3, 4 and 5 of the OSI reference model are not used, but a convergence function is provided.

The basic concept for CMISE architecture lies in defining a broad database of object classes with specific properties. All of these object classes are referred to as the Managed Object Class or Managed Support Object Class, and would be managed by a managing system. Each object class includes the following:

a) an object class label
b) a list of behavior definitions
c) a list of attributes
d) a list of actions that may be performed on it
e) a list of notifications it may issue This entire set of information that the RDT maintains is called the Management Information Base (MIB).

CMISE uses the following two types of services supporting operations functions between the managing and the managed systems. These are (1) Management Operations Services; and (2) Management Notification Services.

The Management Operations Services can be used to request an operation to be performed on an instance of object class (e.g. "M-CREATE" service to create an instance of an object class in a managed system; "M-DELETE" service to delete an object instance in a managed system; "M-SET" service to set the values of one or more attributes of managed object class instance; and "M-ACTION" service to request a predefined action to be performed on an object class instance).

The Management Notification Services can be used by an object instance to report an event to a managing system. "M-EVENT-REPORT" service allows a managed system to report an event related to an object class instance to a managing system.

As an example of the CMIS Interface, with reference to the TL1 command discussed earlier, the associated object class is "OSI Line Termination". The hierarchical position of this object class in the MIB is as shown below:

Top
  Termination Point
    Line Termination
      DS1 Line Termination

This hierarchical relationship determines the inheritance of characteristics such as attributes, notifications and actions, among others. In the above example, "DS1 Line Termination" object class is a subclass of "Line Termination" object class, making the "Line Termination" object class the superclass. The subclass inherits all of the characteristics of the superclass, as well as its own characteristics. The object class label for the "DS1 Line Termination" object class is "dslLineTermination". Each object class has a set of behavior definitions that specify how the instances of object class can be created or deleted. Instances of some object classes can be inherently created during system initialization without intervention from the managing system. Instances of some object classes can be created automatically by the RDT based on some predefined occurrence. Instances of some object classes can be created only by the managing system (with the CMIS "M-CREATE" service). Instances of "DS1 Line Termination" object class may be created inherently or may be created and deleted only by the CMIS "M-CREATE" and CMIS "M-DELETE" services, respectively.

Each object class has various attributes including a naming attribute and other attributes associated with that particular object class, as well as the attributes inherited from its superclass. The naming attribute for the "DS1 Line Termination" object class is "dslLineTermId". One of the attributes associated with this object class is "dslLineCode" (which would be set to AMI or B8ZS). One of the attributes inherited by this object class from the superclass is "primary Service State" (which would be set to IS or OOS). All of the attributes have various properties associated with them (e.g., whether they are read-only or read-and-write). Each object class also has a set of notifications that are reportable for the object instances using the CMIS "M-EVENT-REPORT" service. The CMIS "M-EVENT-REPORT" may be used to report the Object Creation, Object Deletion, Attribute Change, and Event Reporting for the "DS1 Line Termination" object class. Each object class also has a list of actions that the object instances may be asked to perform by using the CMIS "M-ACTION" service. One of the actions the "DS1 Line Termination" object class supports is "Restore" which happens to be inherited from the superclass.

Referring back to the example of editing information associated with a particular T1, in a typical CMISE Implementation (hereinafter referred to as CMISE-only implementation), the CMIS M-SET service would be invoked for the specified "dslLineTermId" with the "dslLineCode" attribute set to B8ZS. A comparison of how the same operation is performed in a TL1-only implementation and a CMISE-only implementation will now be made. The same TL1 command given above is presented again with a simple change as follows:

ED-T1::<aid>:<ctag>:::LINECDE=B8ZS, FMT=ESF

The TL1-only implementation handles the above command in the same way as it did the previous command, except that it will modify two fields instead of one field in the appropriate MIB array element. The CMISE-only implementation uses two CMIS M-SET service messages to get the equivalent effect. The reason is that the "dslFrameFormat" attribute belongs to another object class (other than "DS1Line Termination" object class), namely the "DS1 Framed Path Termination" object class. Both the M-SET service messages are treated independently.

SUMMARY OF THE INVENTION

In accordance with an aspect of the present invention, a network element is provided which has a control system organized into a plurality of application subsystems, each having a software component called a subagent on a network element circuit pack. These software components communicate along a common subagent interface.

In accordance with another aspect of the invention, the control system comprises a system services subsystem for providing operating system functions, internal messaging functions between the application subsystems and interfaces to standard components.

In accordance with still another aspect of the invention, the applications subsystems include circuit pack interface subsystems and common function subsystems. The circuit pack interface subsystems comprise subsystems for management, provisioning and maintenance support for each of a plurality of circuit packs which constitute the hardware components of the network element. The common function subsystems comprise subsystems for network management, call processing, alarm reporting, and virtual terminal administration, among other functions.

In accordance with yet another aspect of the present invention, the subagent interface (SAI) interfaces to each of the subsystems through a name resolution function to route messages to a particular task using a subagent object instance identifier (SAOID) for which the message is targeted. By allowing applications to direct messages toward objects rather than specific tasks, the details about which subsystem is responsible for handling a particular message and the internal organization of subsystems is concealed.

In accordance with a still further aspect of the present invention, an interface is disclosed which provides TL1 compatibility, as well as a smooth migration path to CMISE-based interfaces.

BRIEF DESCRIPTION OF THE DRAWINGS

In order to impart a full understanding of the manner in which these and other advantages are attained in accordance with the invention, a particularly advantageous embodiment thereof will be described with reference to the accompanying drawings, which form a part of this disclosure, and wherein:

FIG. 1 is an integrated schematic block diagram of a digital loop carrier system;

FIG. 2A illustrates the architecture of an OS-NE interface which employs a non-OSI protocol and has only network, datalink and physical layers;

FIG. 2B illustrates the seven layer architecture of an OS-NE interface which employs an OSI protocol;

FIGS. 23 through 31 are tables listing object classes for each of several subsystems;

FIG. 34 illustrates the software hierarchy of an administrative subsystem in accordance with the present invention;

FIG. 35 is a functional block diagram illustrating network element containment by the administrative subsystem;

FIG. 37 is a diagram illustrating the software hierarchy of a Network Management Subsystem in accordance with the present invention;

FIGS. 38 and 39 are functional block diagrams of a TL1 agent and a CMISE agent, respectively, configured in accordance with the present invention;

FIGS. 40, 41, 42 and 43 are TL1 agent tables used to map a TL1 command into a subagent interface message in accordance with the present invention;

FIGS. 48, 49 and 50 are functional block diagrams illustrating the CCS equipment, CCS termination and ring manager relationships, respectively, in the CCS Subsystem;

FIG. 51 is a diagram illustrating the software hierarchy of an Auxiliary Shelf Subagent in accordance with the present invention;

FIG. 52 is a diagram illustrating the software hierarchy of a Turnup Subsystem in accordance with the present invention;

FIG. 57 illustrates the structure of a subagent object instance identifier (SAOID) in accordance with the present invention;

FIG. 58 illustrates the structure of an SAI header in accordance with the present invention; and FIG. 59 illustrates the format of an SAI debug entry.

DETAILED DESCRIPTION OF THE PREFERRED EMBODIMENT

The description of the present invention assumes some familiarity with the following related documents:

Integrated Digital Loop Carrier System Generic Requirements, Objectives, and Interface: Operations (ROS/CMIS/ASN.1) Messages Release 1.0 Bellcore Technical Reference TR-TSY-000303, Revision 1, August 1992

Integrated Digital Loop Carrier System Generic Requirements, Objectives, and Interface: Bellcore Technical Reference TR-TSY-000303, Issue 2, December 1992

Integrated Digital Loop Carrier System Generic Requirements, Objectives, and Interface: Feature Set C-SONET Interface Bellcore Technical Reference TR-TSY-000303, Supplement 2, Issue 1, October 1989

Figure 3:
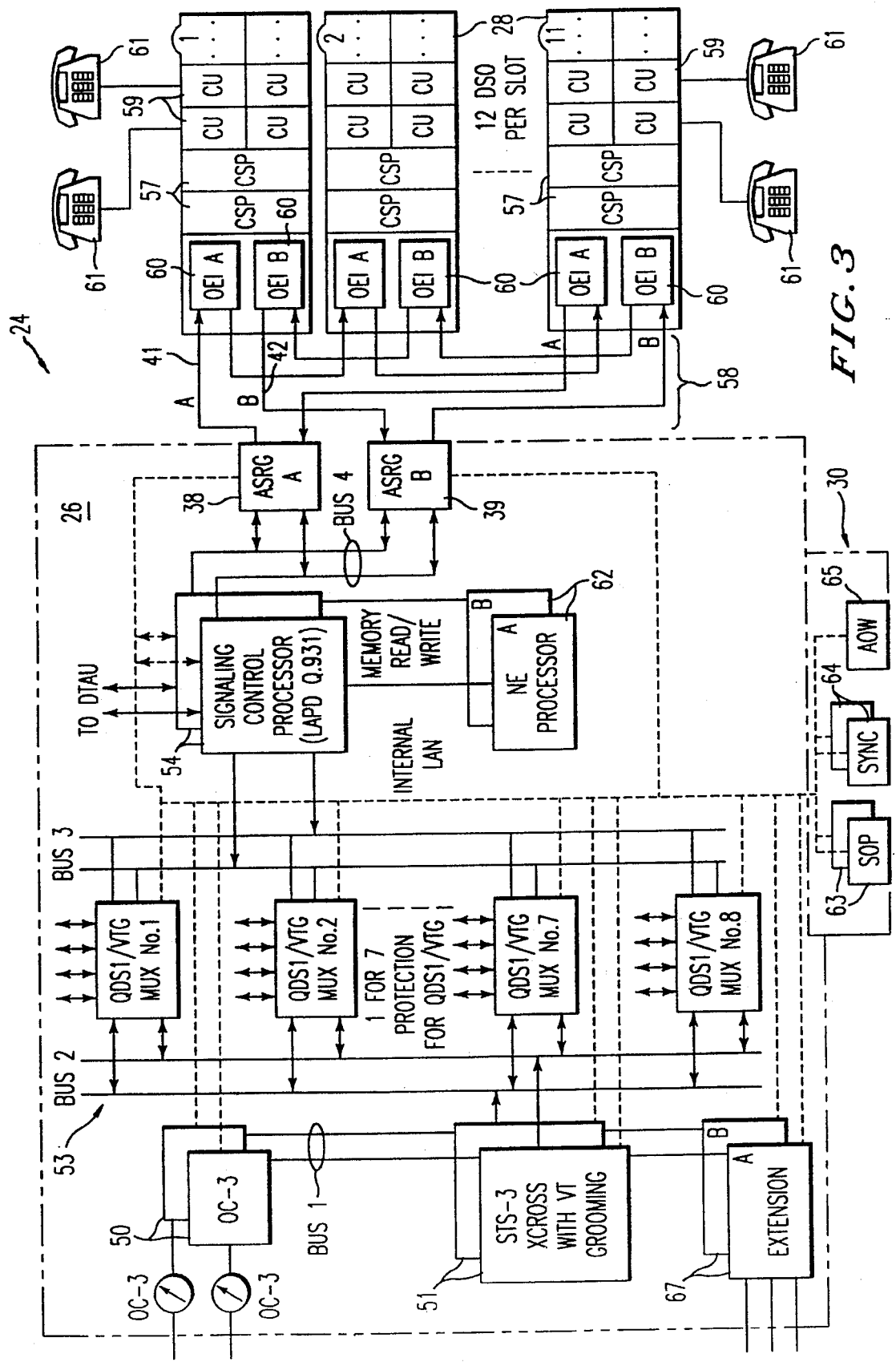
FIG. 3 is a schematic block diagram of a remote digital terminal (RDT)

For illustrative purposes, the RDT discussed in the background (FIG. 1) is the RDT disclosed in U.S. patent application Ser. No. 08/031,395 filed Mar. 9, 1993, the entire subject matter of which is hereby incorporated by reference for all purposes. While the present invention is described in relation to an RDT, it can be used with other types of network elements such as a DLC Central Office Terminal (COT) or a host digital terminal. With reference to FIG. 3, the RDT 24 comprises a common core shelf (CCS) 26 and a number of channel shelves 28. Each channel shelf (CHS) 28 comprises a number of channel units 59 for interfacing with subscriber units 61. Each channel unit supports a particular type of subscriber service such as fiber optics, an integrated services digital network (ISDN), and plain old telephone service (POTS). The CCS 26 provides the features that are central to the RDT 24, as described in more detail below.

Each OC-3 optical interface circuit pack 50 interfaces with an OC-3 feeder for converting optical signals therefrom into electrical signals and vice versa, as well as demultiplexing OC-N signals to STS-1 signals for further processing by the CCS 26. Two identical OC-3 optical interface circuit packs are provided for channels A and B, respectively. The OC-3 optical interface circuit pack 50 also perform STS-1 SPE pointer processing, and Section, Line and Path overhead termination functions such as alarm detection, performance monitoring and controlling the access of other modules to Data Communications Channels (DCC) and Alarm and Order Wire (AOW) fields.

With continued reference to FIG. 3, demultiplexed STS-1 streams from the OC-3 optical interface circuit packs are provided on Bus 1 to STS-3 Multiplexer (STSM) circuit packs 51. The STSM circuit packs 51 provide STS-1 space switching and the capability to add and drop STS-1 streams to and from High Speed Extension (HSEXT) circuit packs 67. The STSM circuit packs provide a parallel 3xSTS-1 data interface on Bus 2 to the VTG/Quad DS1 (VTG) circuit packs indicated generally at 53. The STSM circuit packs also perform diagnostic loopbacks to diagnose and isolate faults on both the OC-3 optical interface circuit pack side and the VTG circuit pack side of the STSM circuit packs 51. There are preferably seven VTG circuit packs 53 and one standby VTG circuit pack 53. Each VTG circuit pack can handle Floating Byte-Sync and Floating Bit-Async payload mapping as required by TR-TSY-303. In Floating Byte-Sync mode, the DS0s within the VT are accessed and aligned to the internal frame timing. The VTG output is Locked Byte-Sync payload mapping, with the V1.5 path overhead bytes no longer required. This locked Byte-Sync STS-1 is output in parallel on the CCS internal Bus 3 (i.e., 3xSTS-1) to be further processed by the Signal Control Processing (SCP) circuit packs 54. For Floating Bit-Async mode, the VT1.5 is passed intact transparently through the VTG circuit packs 53, the SCP circuit packs 54, the Access Shelf Ring Gateway (ASRG) circuit packs 38 and 39, and through optical ring paths 41 and 42 to a Channel Shelf Processor (CSP) circuit pack 57, and finally to the channel units 59 where it is processed.

The SCP circuit packs 54 convert the Locked Byte-Sync VT format to a unique Locked Byte-Sync format. To accomplish this, the signaling bits contained in the VTs are reformatted so that all the signaling bits for a given subscriber appear in the same byte. The SCP circuit packs also perform DS0 Unicode and Yellow Alarm processing on a per-subscriber basis and translate signaling between TR-TSY-303 mode and TR-TSY-8 mode as required, on a per-subscriber basis. After the VT1.5s have been processed and reformatted by an SCP circuit pack 54, the data is passed to an Access Shelf Ring Gateway (ASRG) circuit pack 38 or 39, which adds the STS-1 Path and Transport Overhead and then converts the 51.84 MHz data stream to an optical signal. This optical signal is then broadcast to all channel shelves on an optical token ring indicated generally at 58. The ring includes the two separate paths 41 and 42 on which signals pass in opposite A and B directions, respectively.

The optical signals are converted back to electrical signals in the CHS 28 by Optical Electrical Interface (OEI) circuit packs 60. Two OEI circuit packs are associated with each CHS, one each for the A and B portions of the ring 58. These signals are then fed to a Channel Shelf Processor (CSP) circuit pack 57. The CSP circuit pack 57 recovers the STS-1 clock and data and then performs STS-1 pointer processing to locate the STS-1 SPE. The CSP then performs rate conversion on the VT payload and passes the VT DS0 Byte-synchronously to the synchronous channel units 59. In the case of DS1 services, the CSP circuit pack 57 passes the VT transparently, without timing modification, to the channel units 59. Other functions of the CSP circuit packs 57 include dial pulse digit collection and insertion, DS0 grooming and Dynamic Timeslot Assignment, ISDN D channel multiplexing, and alarm processing.

The control of the entire system depicted in FIG. 3 is maintained by one 1:1 redundant processor group comprising two cards. These circuit packs are one of two redundant Network Element Processor (NEP) circuit packs 62 and one of two redundant Signaling Control Processor (SCP) circuit packs 54. Network element control, OSI (open system interconnect) protocol processing, signaling processing and database functions are contained in the NEP/SCP processor circuit pack pair. The NEP and the SCP circuit pack pair communicate with each other via a memory read/write interface. Each SCP circuit pack also contains a redundant local area network (LAN) interface, shown by the dotted lines, to enable it to communicate with the redundant NEP/SCP group, as well as with other circuit packs in the CCS 26. The communication is also extended to the channel units 59 via embedded data channels in the STS-1 rate signals, allowing communication with both the CCS 26 and the channel unit shelves 28. All other circuit packs in the system (with the exception of some older CUs) preferably have on-board microprocessors which deal with real-time processing. This keeps the real-time processing required by the main processors to a minimum. The call-processing function is the major function which requires real-time processing by the NEP/SCP processor group.

While the following function is not located in the primary signal path depicted in FIG. 1, it is contained in the CCS 26. Twenty-eight DS1 feeders or extensions are available from the CCS. These DS1s can be SLC-96, SF or ESF (Superframe or Extended Superframe) and can be mapped into asynchronous or byte-synchronous SONET floating or locked mode VT1.5 formats. As feeders, the DS1s can be TR-TSY-8 or TR-TSY-303 formatted. The 8 VTG circuit packs 53 each have four duplex DS1 interfaces, arranged in a 1:7 equipment protection scheme. In the case of a VTG module failure, the complete module (4*DS1) is switched off the bus and the eighth VTG module is switched onto the bus. The DS1 feeders can be transported to the RDT 24 on a SONET path and terminated on a VTG circuit pack 53.

The synchronization of the system of the present invention is controlled by 1:1 redundant SYNC circuit packs 64. Each of these circuit packs can select one of six fundamental timing references as a source to provide all of the internal timing required by the system of the present invention. These sources are one of two DS1 BITS (building integrated timing supply), the receive clock from one of the eight VTG circuit packs 53, one of two OC-3 clocks, the sync from the adjacent SYNC module, or the internal temperature controlled crystal oscillator (TCXO). Each circuit pack requiring timing from the SYNC circuit packs selects between the primary and backup SYNC circuit packs to accommodate protection switching of the SYNC cards.

Figure 7:
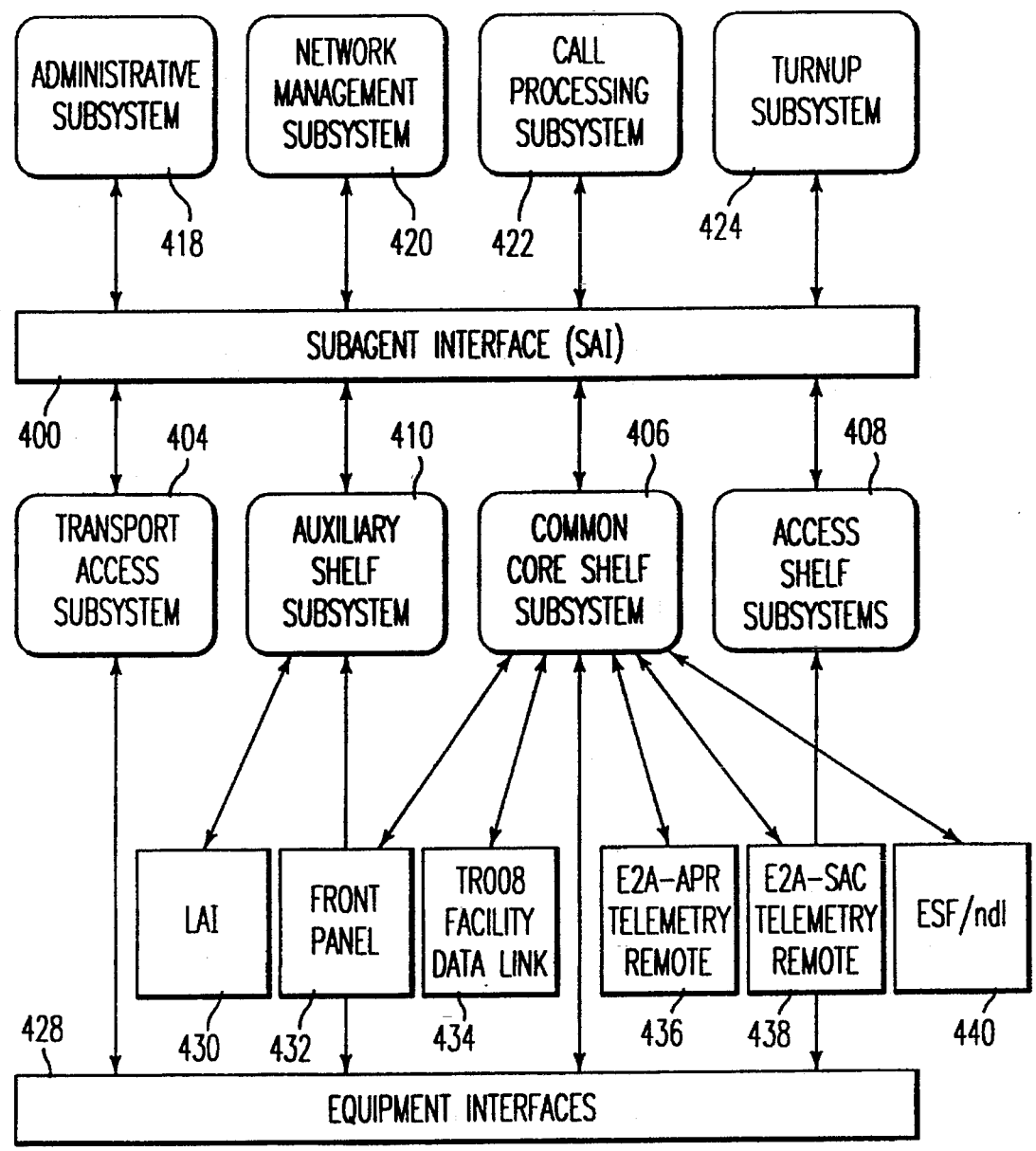
FIG. 7 is a functional block diagram illustrating the software hierarchy if an RDT in accordance with the present invention.

DTAU (digital test access unit), MTAU (metallic test access unit), and CTU (channel test unit) testing functions are also contained in the Auxiliary (AUX) shelf but are not shown in FIG. 7. These circuit packs enable full test access to the digital bitstream, analog loops, and analog channels (inward from the loop). By utilizing a RTU (remote test unit), remote testing is possible. The CTU provides channel termination and signaling detection under control of a PGTC (pair gain test controller), and provides loop switching to external bypass pair access.

The description of the present invention is in accordance with the following general outline:

GENERAL OUTLINE

Figure 4:
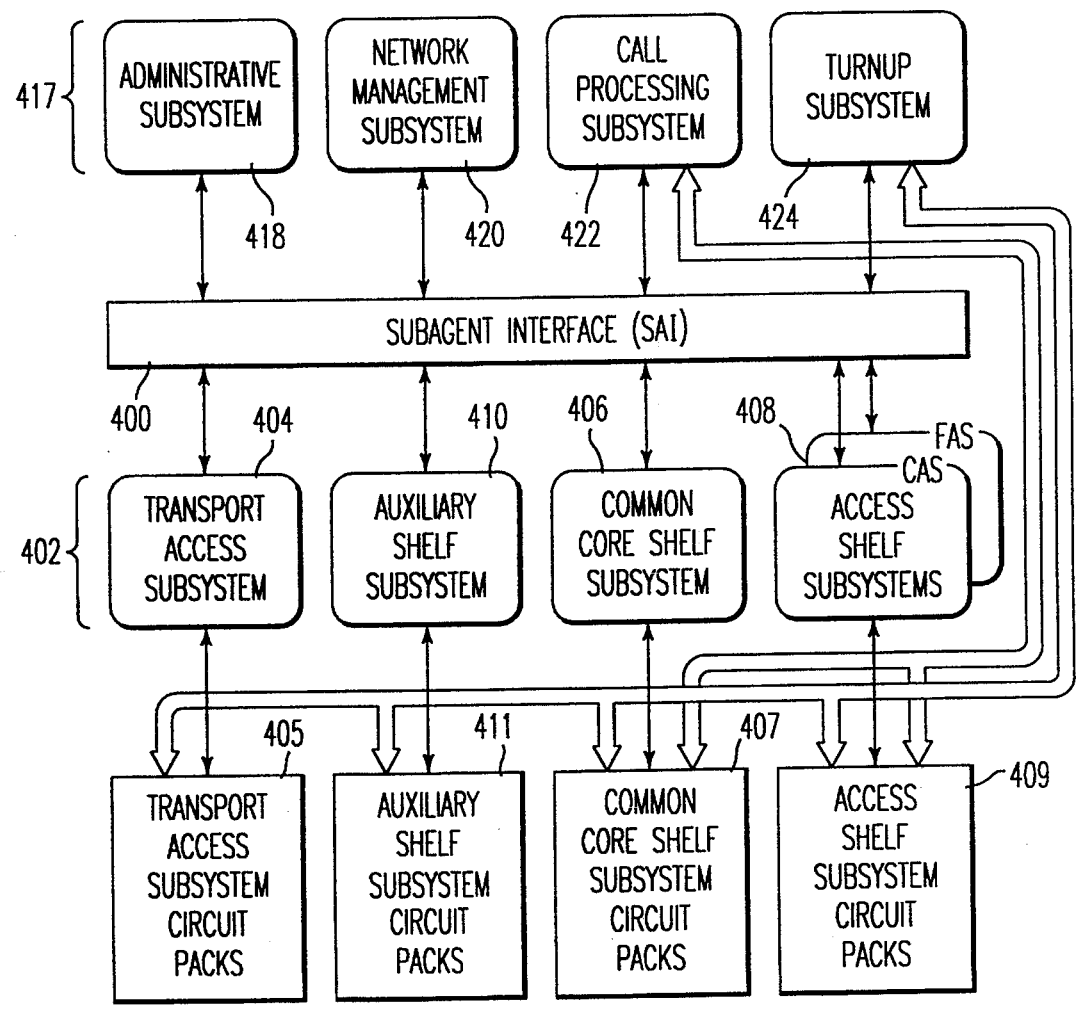
FIG. 4 is a functional block diagram illustrating the software architecture of a NE such as an RDT in accordance with the present invention.

1. Overview
2. Common Architectural Functionality
2.1 Communication Protocol
2.2 Data Management
2.3 Error Management
2.4 Debug System
3. Common Subsystem Architecture, e.g., the Subagent Interface
4. Administration Subsystem
5. Network Management Interface Subsystem
6. Call Processing Subsystem
7. Transport Access Subsystem
8. Common Core Shelf Subsystem
9. Auxiliary Shelf Subsystem
10. Turnup Subsystem
11. System Services Subsystem
12. Access Shelf Subsystem
13. Subagent Interface 1. Overview In accordance with the invention, the RDT is operated in accordance with a software control system, the architecture of which is organized as shown in FIG. 4. The RDT software system is partitioned into application software subsystems and a System Services Subsystem. The application software subsystems are further subdivided into those that provide management of and direct interface to the equipment and terminations in the RDT 402 (FIG. 4) and those that do not (417 in FIG. 4). The application software subsystems that interface to and provide the management of the physical equipment and terminations in the system provide a virtual machine interface to the other application software. This interface is provided by the Subagent Interface (SAI) 400.

The subsystems that are responsible for managing all of the equipment and terminations in the RDT are called Circuit Pack Interface Subsystems and are indicated generally at 402. They are the Transport Access Subsystem 404; the Common Core Shelf (CCS) Subsystem 406; the Access Shelf Subsystems 408 such as the Copper Access Shelf Subsystem and the Fiber Access Shelf Subsystem; and the Auxiliary Shelf Subsystem 410. Each of these subsystems' decomposition preferably yields exactly one component on the Network Element Processor circuit pack 62. This component is called a subagent, and it is this component that provides the virtual machine interface to the equipment and terminations that are managed by the subsystem. The components are indicated collectively at 414 in FIG. 5, which illustrates the organization of the NEP circuit pack 62 software. These subsystems preferably provide all of the application software on the circuit packs that they manage, except for the component provided by the System Services Subsystem, which is indicated at 416 in FIG. 5. The application software provided for a circuit pack is a component. Thus, each of the Circuit Pack Interface Subsystems 402 decomposes into one component on the NEP, the subagent 414, and one component for each circuit pack in the subsystem, that is, the Transport Access Subsystem Circuit Pack 405, the CCS Subsystem Circuit Pack 407, the Access Shelf Subsystem Circuit Pack 409 or the Auxiliary Shelf Subsystem Circuit Pack 411.

The other application software subsystems provide common functionality that is independent of the physical equipment and terminations and are indicated generally at 417 in FIG. 4. These subsystems are: Administrative Subsystem 418, Network Management Interface Subsystem 420, the Call Processing Subsystem 422, and the Turnup Subsystem 424. These subsystems provide one or more agents or subagents that reside on the Network Element Processor 62 collectively at 426 in FIG. 5. The components provided by the Network Management Subsystem 420 are commonly referred to as "agents" since they interface directly to some external manager, and these systems commonly use the term agent to describe the entity in a remote system that receives commands from a managing system. The term subagent is an extension of this model, and it refers to a software entity that receives commands from an agent. In the RDT, the Transport Access, Common Core Shelf, Copper Access Shelf, Fiber Access Shelf, Auxiliary Shelf, Administrative, Call Processing and Turnup Subsystems all provide subagents that respond to commands from the network management agents within the Network Management Subsystem 420.

Figure 5:
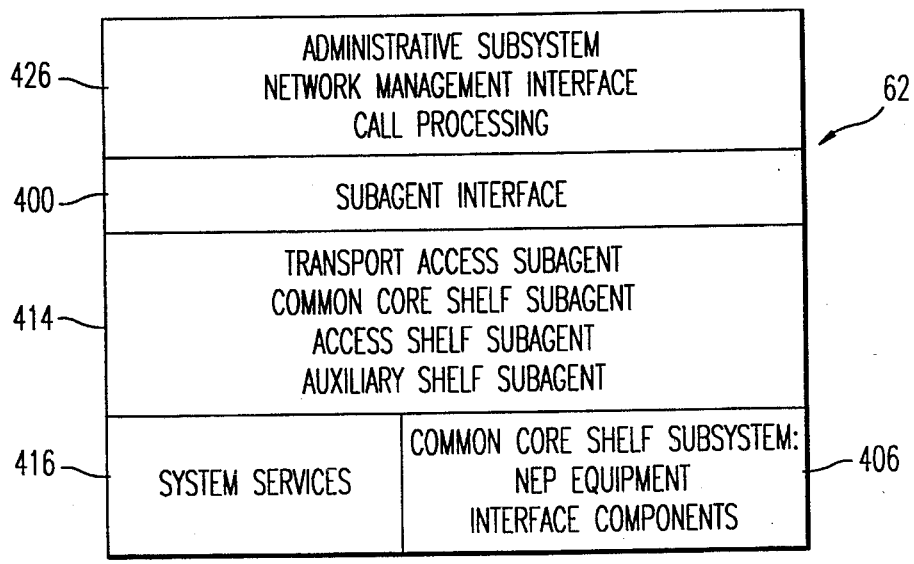
FIG. 5 is a functional block diagram illustrating a software hierarchy in the Network Element Processor (NEP) of an RDT in accordance with the present invention.
Figure 6:
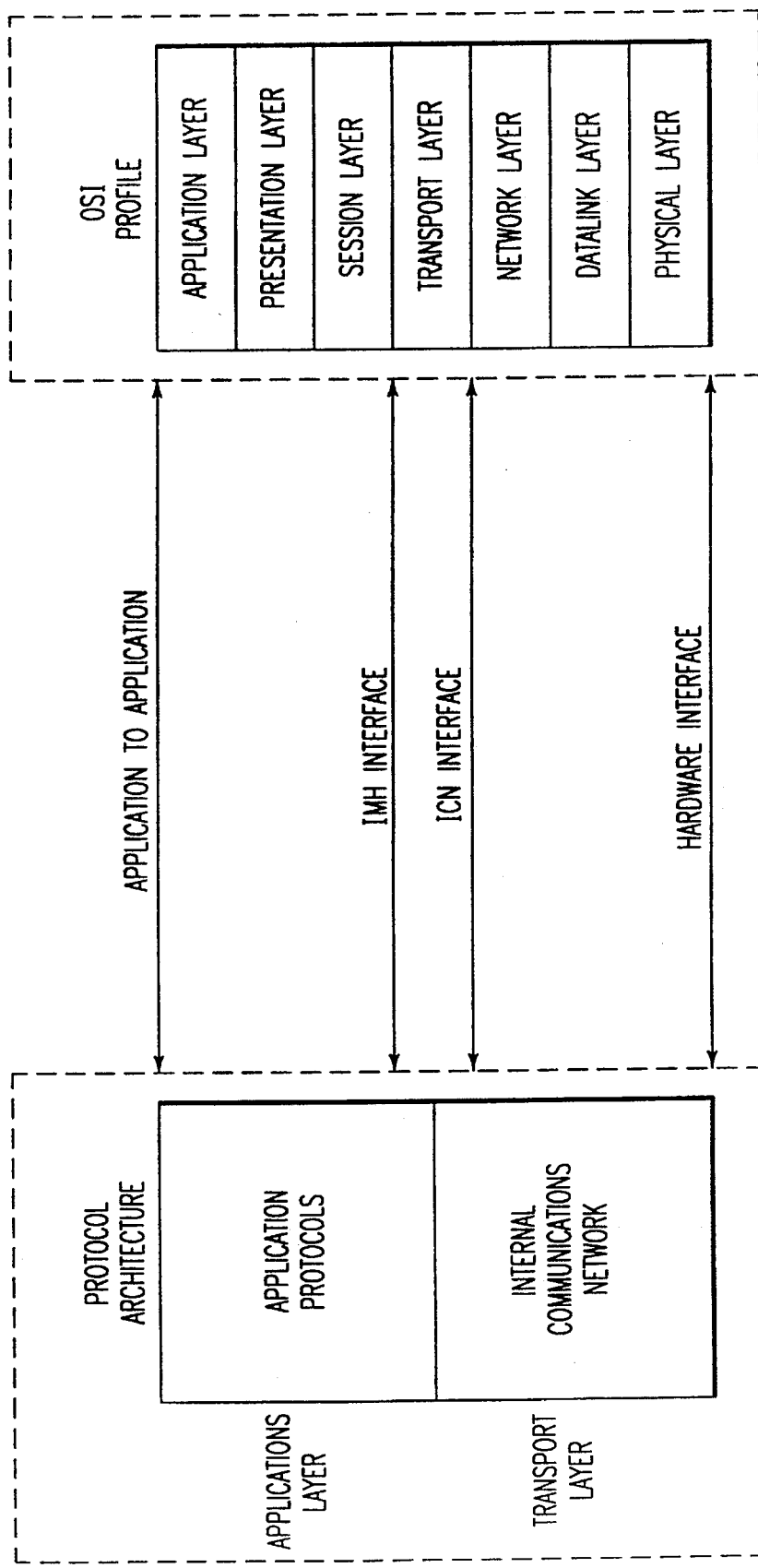
FIG. 6 illustrates the protocol stack architecture of the RDT in accordance with the present invention.

The System Services subsystem 416 (FIG. 5) preferably provides a common operating platform for all circuit packs and the lower four layers of the system communication protocol, which are shown in FIG. 6. This subsystem 416 also provides customization packages for each circuit pack in the RDT that contains the common operating platform and communication protocol. These customization packages are called Board Support Packages (BSPs). Each BSP also contains low-level drivers for the custom components on the circuit pack.

A brief description of each of the software system components depicted in FIG. 4 follows.

The Transport Access Subsystem 404 provides the management of the equipment and terminations associated with the SONET transport front-end component of the RDT. This subsystem manages the OC-3 and STS-1 portion of the SONET hierarchy. This subsystem also provides management of the equipment and terminations associated with the system timing resources and the internal common core shelf LAN management function. The Transport Access subsystem provides management of the SYNC circuit packs 64.

The Common Core Shelf Subsystem 406 provides the management of the equipment and terminations in the common core shelf 26 of the RDT system except for those circuit packs and terminations associated with the SONET transport front-end, i.e., the OC-3 interface 50, SYNC and STSM 51 circuit packs. This subsystem also provides management of the access shelf ring 58. The Common Core Shelf Subsystem provides management of the following circuit packs: Virtual Tributary Group (VTG) circuit packs 53; Signaling Control Processor (SCP) circuit pack 54; the Network Element Processor (NEP) circuit pack 62; Access Shelf Ring Gateway (ASRG) circuit packs 38 and 39; and the Alarm Order Wire (AOW) circuit pack 65.

Figure 9:
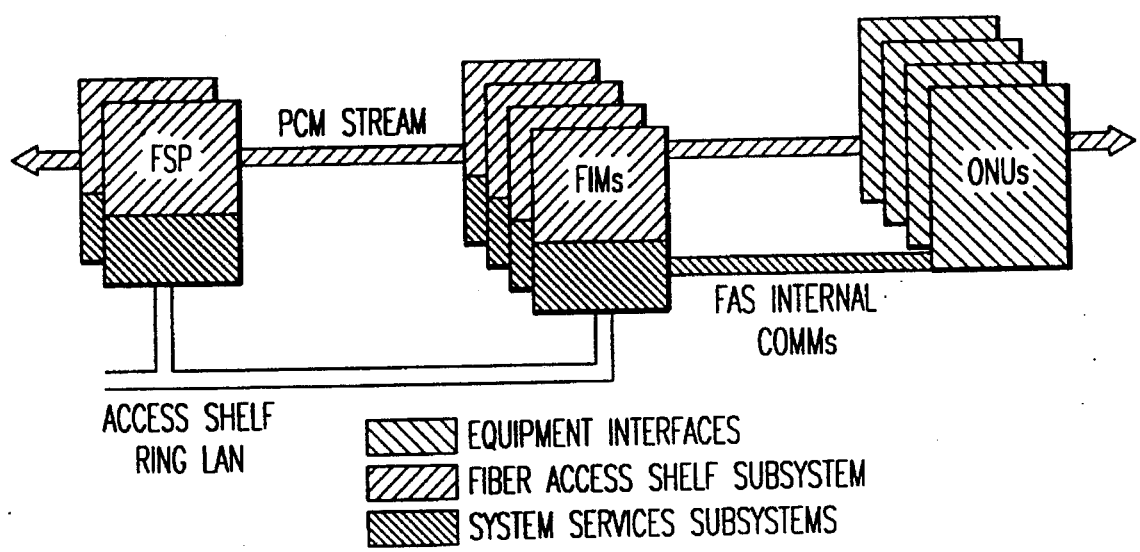
FIG. 9 is a functional block diagram illustrating the software organization of an exemplary access shelf in accordance with the present invention.

The Copper and Fiber Access Shelf Subsystems 408 provide the management of the equipment and terminations in the copper and fiber access shelves, respectively, of the RDT. The Fiber Access Shelf Subsystem provides management of the following circuit packs: Fiber Shelf Processor (FSP); Fiber Interface Module (FIM); Optical Network Units (ONUs) and all circuit packs contained in ONUs (FIG. 9). The Copper Access Shelf subsystem provides management of the following circuit packs: the Channel Shelf Processor 57; the Optical-Electrical Interface 60, a test bus segmenter (not shown) and the channel units 59.

The Auxiliary Shelf Subsystem 410 provides the management of the equipment and terminations in the auxiliary shelf of the RDT.

The Auxiliary Shelf Subsystem 410 provides management of the following circuit packs: Maintenance Access Unit (MAU); and Loop Fault Emulator (LFE).

The Administrative Subsystem 418 takes advantage of commonality among the hardware interface subsystems. This subsystem provides the following functions in lieu of implementing them in each of the hardware interface subsystems: external alarm and event reporting; database synchronization; and database backup and restoration. In addition, this subsystem provides support functions for the Network Management Subsystem 420. These functions are command validation, and maintenance of system parameters. Finally, this subsystem provides system wide supervision and configuration functions such as schedule maintenance and execution, performance monitoring timing and virtual terminal setup and maintenance.

The Network Management Subsystem 420 provides the TL1 and CMISE agents that interface to external management systems. This subsystem also provides the protocol stacks required to interface to these systems in accordance with the present invention, as described in more detail below.

The Call Processing Subsystem 422 provides control over the assignment of the channels on the access shelf ring gateway 58.

The Turnup Subsystem 424 provides the following functions: coordinates the start-up functions of circuit packs; verifies the correct software load is present; performs software down load to circuit packs if required; and introduces circuit packs to the managing subagent at start-up.

The Subagent Interface (SAI) 400 provides a virtual machine interface for the application agents and subagents on the NEP 62. This interface is an object-oriented message interface. Agents and subagents communicate with each other by sending messages to objects. The interface is defined in terms of the objects that are present in the interface and the services they provide. The invoker of a service need not know explicitly which subagent is providing a particular service in order to use it. All of the services provided by one object are preferably provided by one subagent.

System Services Subsystem 416 provides an interface to the processor and internal communication means. This includes interfaces to the internal operating system and a means for communication between circuit packs. From the System Services viewpoint, all RDT software components are applications. From an application viewpoint, the interface to System Services is not explicit because System Services is omnipresent. Although not part of the application, the system services subsystem 416 is generally required for applications to exploit the hardware resources of the RDT.

Figure 8:
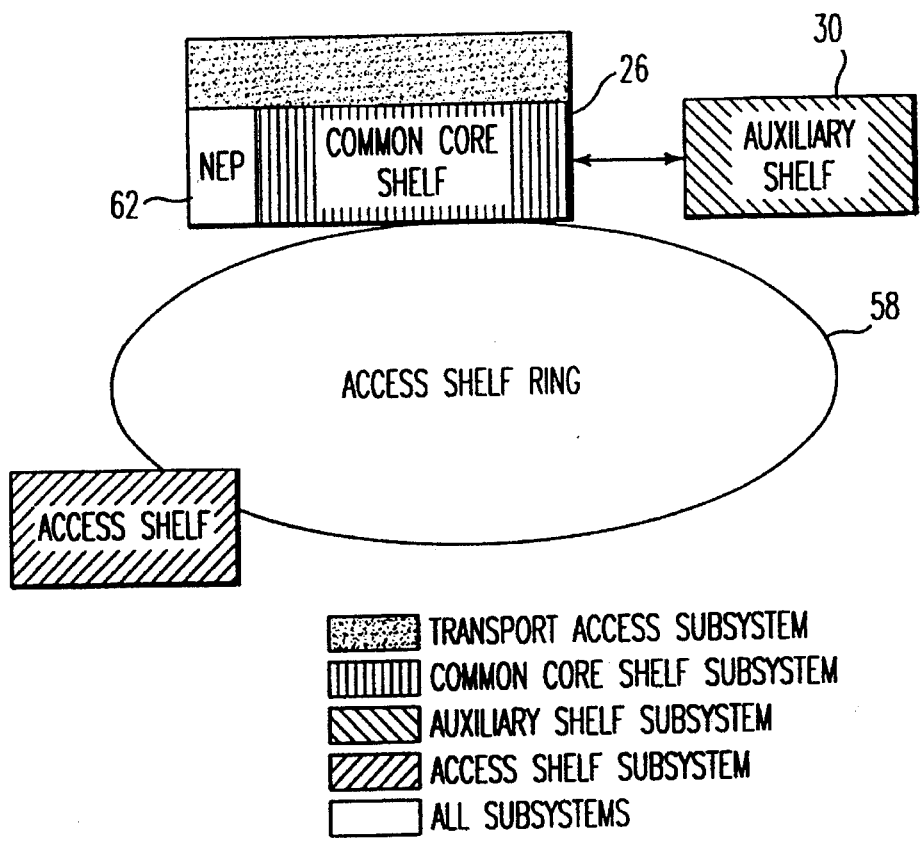
FIG. 8 is a functional block diagram illustrating the software organization of an RDT in accordance with the present invention.
Figure 10:
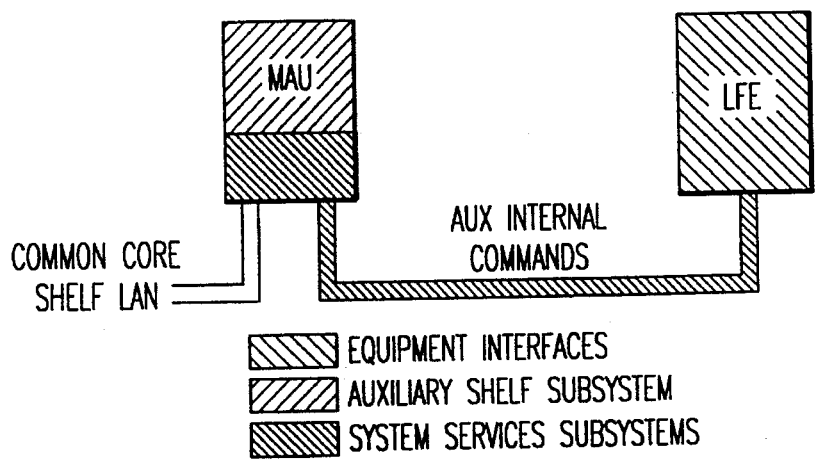
FIG. 10 is a functional block diagram illustrating the software organization of an auxiliary shelf in accordance with the present invention.
Figure 11:
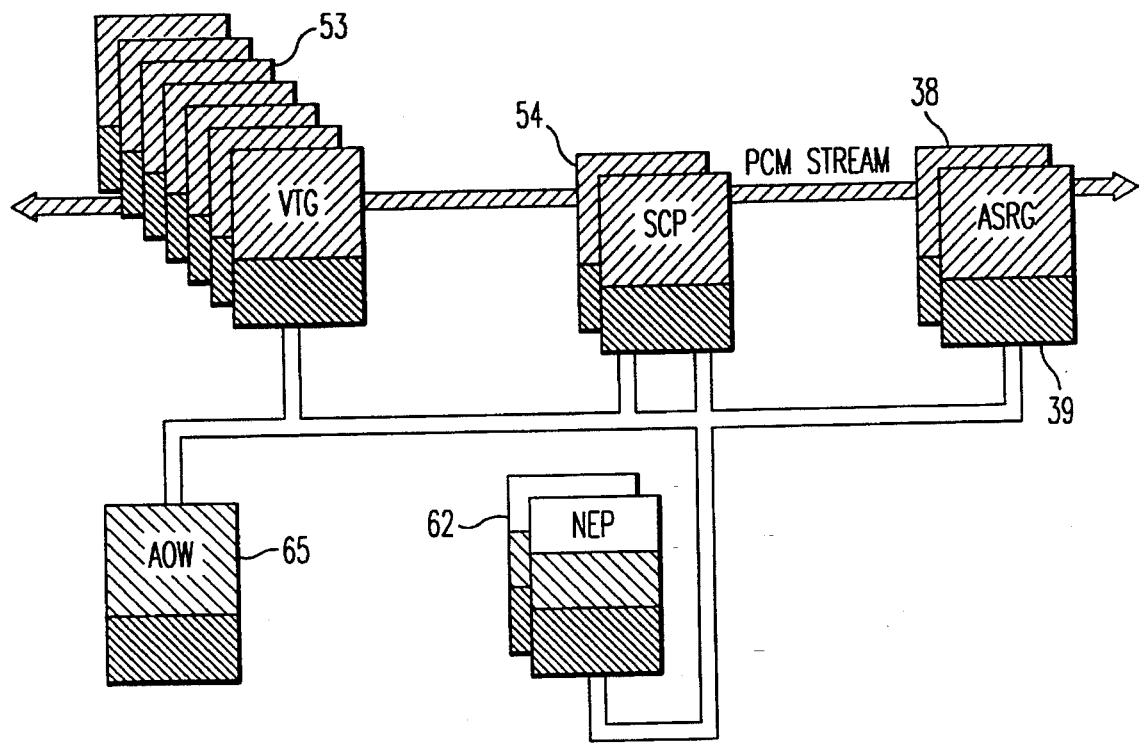
FIG. 11 is a functional block diagram illustrating the software organization of a common core shelf in accordance with the present invention.

The RDT software hierarchy is shown in FIG. 7. FIG. 8 shows the overall software organization with respect to the RDT architecture. FIG. 9, 10 and 11 illustrate the organization of the software with respect to at least part of the architecture of the fiber access, auxiliary and common core shelves 28, 30, and 26, respectively, in the RDT. The architecture of a CAS has been omitted since it is similar to FIG. 9. As described previously, FIG. 5 shows the organization of the software on the NEP 62 which contains components of the software subsystems in the RDT.

As described above in connection with FIG. 3, the RDT consists of a collection of circuit packs, which can be generally classified as hardware components only, 8 bit processors and 16/32 bit processors. The general software architecture described in connection with FIG. 4 essentially identifies the features and capabilities supported by the software contained in the 16/32 bit processors in the RDT. The 16/32 bit processors are preferably Motorola 68000 class machines. The circuit packs in the system with 8 bit processors are identified as equipment interfaces. The major interfaces to the RDT are shown in FIG. 7. There are other smaller, less visible interfaces encapsulated in the RDT Equipment Interface 428. The Equipment Interface 428 comprises interfaces to specific devices on a particular circuit pack, as well as interfaces to circuit packs. The local asynchronous interface (LAI) 430 is provided by the Maintenance Access Unit (MAU) on the Auxiliary shelf 30. The MAU provides four local asynchronous interfaces. Each LAI on the MAU operates in one of two modes: the primary mode is for MML commands, and the secondary mode is for code downloads. In the MML mode, the MAU collects ASCII characters forming a complete MML command from the RS-232 port associated therewith and sends it to the NEP 62 for processing. In this mode, the MAU provides primitive command line editing such as back-spacing and line deletion. Command execution responses are delivered back to the MAU asynchronously to be transmitted through to the RS-232 port. The LAI in this mode can be used to interface to local craft, test controllers and intelligent power supplies. The secondary mode supports code download from an intelligent device via a binary protocol based on ZMODEM.

With continued reference to FIG. 7, the RDT front panel 432 provides LED indications of the system alarm state. The panel consists of LED indicators that represent critical, major and minor system alarm states. This panel provides an LED that qualifies any one of these alarms states as due to conditions at the far end or near end. In addition, this panel provides indications of abnormal and miscellaneous alarm conditions. These system alarm LEDs interface to the system software through the AOW circuit pack 65. The AOW circuit pack also provides an alarm cutoff input on the front panel. The facility datalink 434 for the TR-008 DS1 terminations is terminated and decoded on the VTG circuit packs 53. The E2A-SAC telemetry remote interface 438 is provided as part of a set of sixteen relay closure outputs on the Alarm and Orderwire (AOW) circuit pack 65. The E2A-APR telemetry remote interface 436 (also known as telemetry byte oriented serial or TBOS interface) is also provided on the AOW circuit pack. This interface is an RS-422 interface. The Equipment Interface 428 preferably comprises interfaces to the devices on each circuit pack. Of special note are the interfaces to circuit packs in the RDT that have eight bit microcontrollers or no microcontroller at all. These circuit packs are not accessible via the internal communications network (ICN) and, as a result, have an agent on a processor that is accessible via this network. These interfaces are: the Loop Fault Emulator (LFE) in the auxiliary shelf; and the Optical Network Unit (ONU) and the Fiber Line Circuit packs and associated equipment in the Fiber Access Shelf.

2. Common Architectural Functionality

This section discusses common architectural protocols, models, and mechanisms. Included in this section are: Communication Protocol; Data Management; Error Management; and Debug System.

2.1 Communication Protocol

The communication protocol architecture for the RDT application software comprises a layered protocol stack that is used for inter-application and intra-application message communication. This stack can be approximately modeled on the OSI seven layer model, with the application layer converging onto the transport layer. The lowest four layers (FIG. 6) are implemented by the System Services Subsystem 416 (FIG. 5). These layers provide delivery of variable sized messages, handling of redundant physical circuit packs and communication media, routing to logical applications, a reliable delivery option, a non-guaranteed delivery option, and circuit pack level flow control.

The application layer contains an Inter-Process Message Header (IMH 446 in FIG. 14) that is used by applications to manage multiple transactions with other applications. This is preferably required for all application software messages. Session establishment occurs between circuit packs in the RDT. Applications on a physical circuit pack are considered to have a session established with an originating application if the physical circuit pack supporting the destination application has a session established with the physical circuit pack supporting the originating application. The RDT application layer provides the following functions: indicates whether a message is solicited or unsolicited; indicates that a message is a command, response or event; provides a means for requesting an acknowledgement to a message; provides a means to acknowledge a message by posting the original message back to the originator; provides a means for indicating and detecting retransmissions; and provides a means for indicating message delivery errors occurring above the transport layer (FIG. 6).

Figure 12:
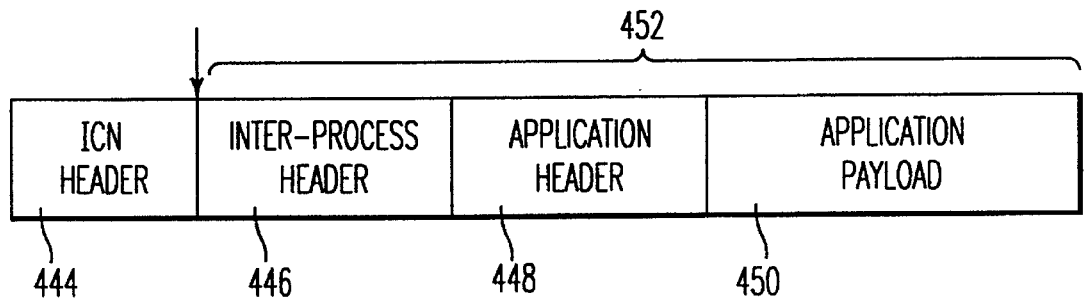
FIG. 12 illustrates the fields in an Internal Communication Network (ICN) message in accordance with the present invention.

The application protocol layer (FIG. 6) is defined by each application. Additional protocol headers (448 in FIG. 14) for the application layer is subsystem dependent. Each application provides the following functionality: I/O timing and retransmission; error recovery timing and command/response and event/acknowledgement pairing; and application flow control (which is optional). All application level inter-process communication preferably uses this protocol stack. Messages generally consist of the following components: ICN Header 444, followed by an Inter-Process Message Header 446, an optional Application Header 448, and finally an optional Message Payload 450, as shown in FIG. 12. Both the ICN and Inter-Process Message headers are of fixed size across the RDT software. The arrow at the left in FIG. 12 indicates the beginning of the application data area in a message. This is the demarcation between elements of the message that are managed by the ICN, and elements of the message that are managed by the application. The Inter-Process Message Header (IMH) starts in the first byte after the ICN header. The application header and/or message payload, if present, start in the first byte after the IMH.

Figure 22:
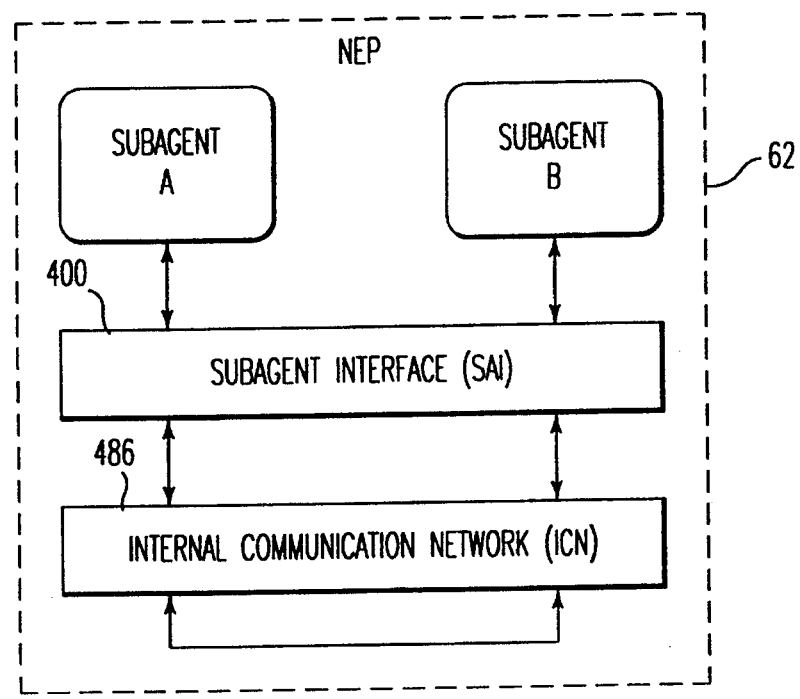
FIG. 22 is a functional block diagram of the Subagent Interface (SAI) in accordance with the present invention.
Figure 28B:
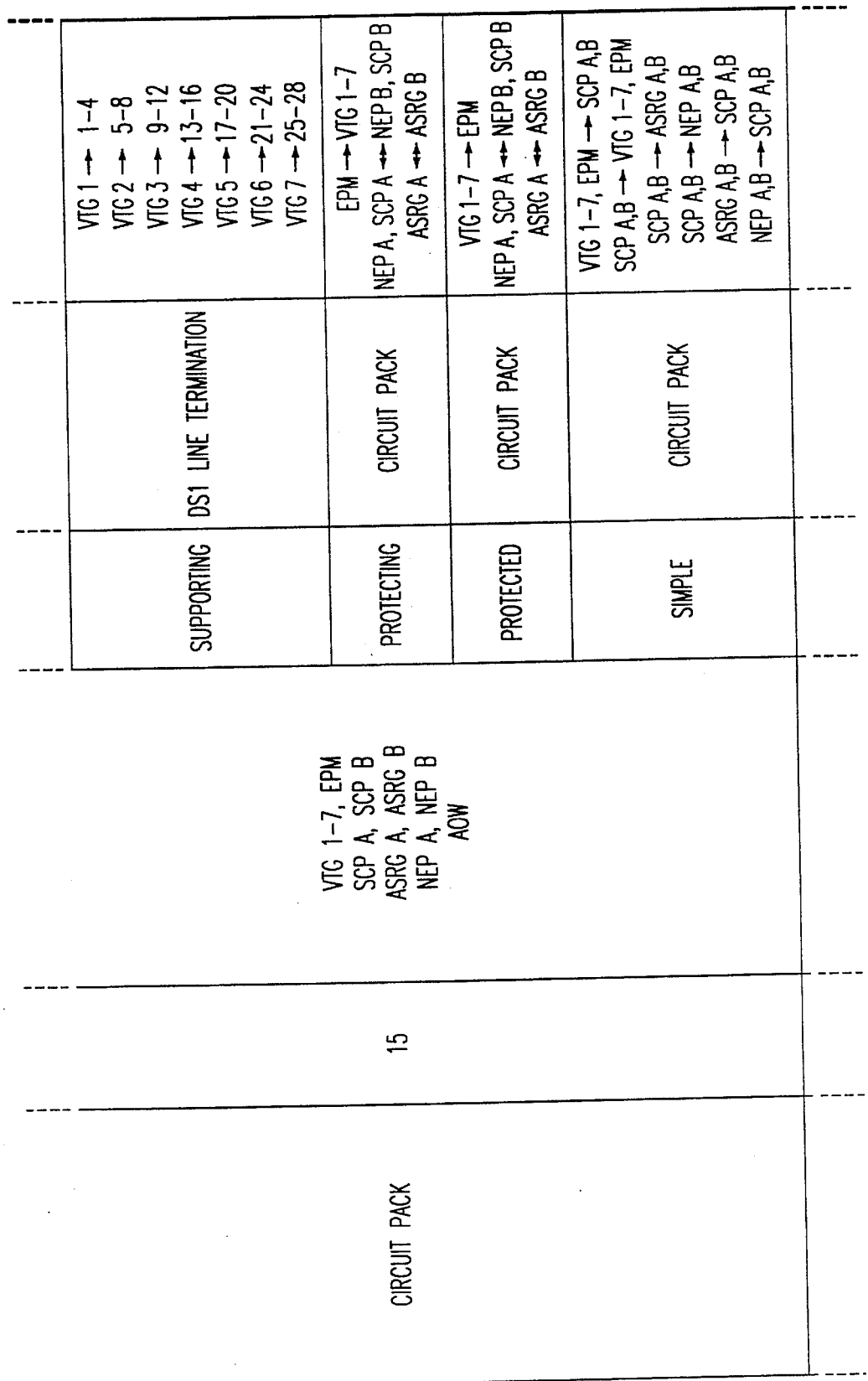

The lower layers (FIG. 6) of the communication stack are implemented by the System Services Subsystem 416. This subsystem provides a component called the Internal Communication Network (ICN) 486 (FIG. 22). The ICN provides the delivery mechanism for applications within the RDT. This delivery mechanism provides functionality associated with the lower four layers of the OSI model protocol stack shown in FIG. 6. This delivery mechanism applies to intra-circuit pack messages and inter-circuit pack messages. The ICN supports reliable message delivery between communicating applications, while decoupling physical board addresses and task identifiers from the addresses known to the applications. A specific application task is addressed with its Module Identifier (MID) and Application Class Identifier (ACID). Module Identifiers are assigned system wide, and each MID represents a circuit pack in the RDT. Circuit packs that are not on the internal network are not assigned MIDs. ACIDs are preferably assigned for all of the application tasks on a circuit pack. The ICN 486 provides the following features: address de-coupling; prioritized message delivery; dynamic destination transparency; active circuit pack selection; circuit pack level flow control; inter-network routing between separate media segments; and a broadcast capability for each media segment. The ICN supports the following physical media in the RDT: the common core shelf 26, the LAN, the access shelf ring gateway 58 and the NEP/SCP shared memory interface. The communication media in the Copper Access Shelf, the Auxiliary Shelf and the Fiber Access Shelf, as well as the communication media on the Fiber Access Passive Data Networks (PDNs), are not supported by the ICN. In the RDT, each circuit pack can act as a hub between each of the different media to which it is attached.

In general, the circuit packs that exchange messages in the system are redundant and work in an active/standby scheme, in which the standby circuit pack is a warm standby. When a circuit pack in the transmission path of a message fails, protection switching from the active to the standby circuit pack is executed, along with such activities as fault location, reconfiguration, and fault recovery. The ICN handles transient intermittent communications faults that can be tolerated by retry and do not require protection switching. The ICN also provides notifications of permanent communications faults that demand protection switching in order to be processed by a circuit pack level or system level entity which can perform the required reconfiguration actions.

The ICN de-couples the addresses used to deliver a message over the physical media by preferably providing a MID for every addressable node on the network. The ICN de-couples the queue identifier used to deliver a message to an application task on a circuit pack by providing ACIDs, which can be assigned to tasks at system startup.

The ICN provides prioritized delivery of messages to an ACID. This provides the ICN with the ability to perform selective flow control in periods of high message traffic on a particular MID, as well as avoiding the priority inversion associated with the delivery of messages to a first-in-first-out (FIFO) message queue. The ICN provides dynamic destination transparency of the actual physical media being used to deliver a message. ICN provides a delivery option to allow an application to force the message to be delivered over a particular redundant media.

When redundant circuit packs are available, the ICN provides transparency of the actual circuit pack providing service for a message. ICN provides a delivery option to allow an application to force a message to be delivered to a particular circuit pack. The ICN provides selective flow control based on priority for messages arriving to a circuit pack. The ICN broadcasts changes in flow control status to all nodes in the network. The ICN also provides internetworking between the Common Core Shelf LAN, the Access Shelf Ring LAN and the NEP/SCP Shared Memory interface. A Broadcast Capability is provided on the Common Core Shelf LAN and the Access Shelf Ring LAN.

Figure 13:
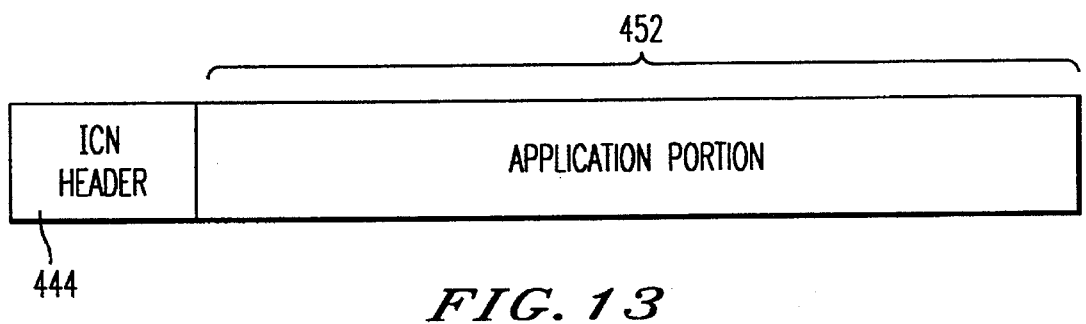
FIG. 13 illustrates an ICN message as viewed by the ICN.

The ICN message format that is delivered to the application consists of a ICN header 444 followed by a user data area indicated generally at 452 in FIG. 13. The ICN delivers a buffer to the user that starts at the user data area 452. The ICN header 444 includes source MID, source ACID, destination MID and destination ACID. The ICN functionality permits an application to post back a message without copying the message.

The application software messages in the RDT preferably provide one of the following grades of service when delivering a message to another application: Non-guaranteed Message Delivery; Reliable Message Delivery; Reliable Message Delivery with Error Recovery; Guaranteed Message Delivery and Critical Guaranteed Message Delivery.

Non-guaranteed Message Delivery service provides a single attempt to deliver a message using the non-guaranteed delivery option provided by the ICN. Use of this service is restricted. Examples of situations where this service can be used are messages that are internal to ICN or the common platform on a single circuit pack, messages that are generated and received by a circuit pack's bootstrap code and messages that are used by internal probes and monitors.

Reliable Message Delivery with Error Recovery service provides a single attempt to deliver a message with no error recovery. The application sends the message once, and then the state data associated with the message is lost. Post backs are ignored. Application level responses and acknowledgements are also ignored. This service uses the guaranteed delivery option provided by the ICN. Since this service provides no error recovery, or retry timing, it is not used for operations which change the state, provisioned data or configuration of a circuit pack without some additional messages for verifying the state of the pack and/or rolling back inconsistent changes. This service is suitable for the delivery of protocol data units between application tasks which provide different layers of a protocol stack.

Reliable Message Delivery service provides a single error recovery attempt to deliver a message with minimal error recovery. The application sends the message once and provides retries when a post back or recoverable send error is received. Responses and acknowledgements are optional. If a response of acknowledgement is expected, the application can provide retry timing and a finite number of retransmissions. The retry timeout and the number of retransmissions are fixed by system wide constants. This service is suitable for maintenance actions commands from an external managing system of craft user.

Guaranteed Message Delivery service provides unlimited attempts to deliver a message. When using this protocol, all messages require a response message, e.g., either an acknowledgement or a response. The sending application must continually retry the message if no response is received within the application message delivery timeout. The application continues to retry the message until a response is received or there is an outage detected on the physical entity supporting the destination application. The retry timing is fixed by a system-wide constant. This protocol is preferably used for all provisioning messages between circuit packs and for all event messages announcing the failure of a facility or equipment, if that facility or equipment does not affect the system timing or internal network media.

Critical Guaranteed Message Delivery service is a robust protocol that is used for critical messages which must be delivered. This protocol adds route diversity to the guaranteed message delivery protocol to ensure that a message is delivered. This service is used for all messages which must be delivered in a timely manner, even if the delivery media is in the midst of a reconfiguration or outage. This condition applies to events announcing a failure or recovery of a delivery media and commands to reconfigure the delivery media.

Figure 14:
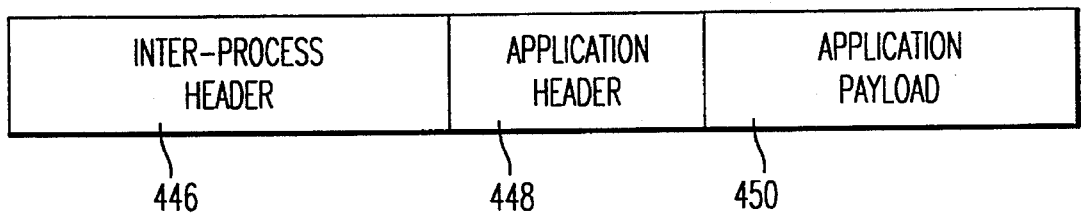
FIG. 14 illustrates the application portion of an ICN message which is processed by an application.

With reference to FIG. 14, the user data area or application portion 452 of the message shown in FIG. 13 consists of three distinct parts. The first part is the inter-process message header (IMH) 446. The second part is the application header 448. The last part is the application payload 450. The application header and application payload are optional. An application header is generally required in order to provide some of the protocol services described above, such as guaranteed message delivery service. The inter-process message header (IMH) 446 is used by the application software to determine the format of the application header 448. This portion of the application message is generally fixed in size and format across the application software in the RDT. As described in connection with FIG. 12, the IMH 446 appears in the first bytes of the message after the ICN header 444. Some low-level messages can be defined to use just the IMH 446 and no application header 448, although applications using messages with only the IMH are restricted to the reliable message delivery protocol as the highest grade of service it can provide. Examples of messages using just the IMH include messages generated from interrupt handlers, messages that are internal to ICN or the common platform, messages that are generated and received by a circuit packs bootstrap code and messages that are used by internal probes and monitors.

Figure 15:
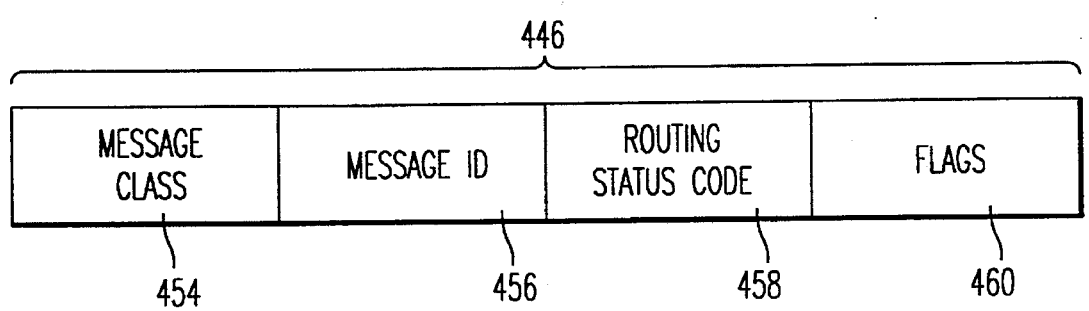
FIG. 15 illustrates the subfields of the inter-process message header (IMH) field of an ICN message.

With reference to FIG. 15, the IMH 446 comprises the message class field 454, which is a one byte field that identifies the format of the application header. The following message classes are defined: (1) One class for each subsystem; and (2) cross subsystem messages which are not recognized as part of a subsystem. The message class is used to decouple the message formats of different subsystems from each other and from the common message format used across the subagent interface (SAI) 400, while allowing a single entity such as a fault tolerance task or a subsystem communication manager to perform a minimum amount of decode and processing on the message.

The message identification field 456 in FIG. 15 is a one byte field that identifies the type of message being delivered. This field is present in the IMH to allow certain low level messages the flexibility of not defining an application header. It is recognized that in the interest of keeping the IMH to a reasonable size, this field may not provide enough address space to define all of the messages for a subsystem. A subsystem can use this field to define additional message categories within a subsystem and reserve a field within the subsystem application header 448 for the actual message identifier. When not used, the reserved value for this field is "zero".

The status code field 458 in FIG. 15 is the third field in the IMH 446. The status code is used in response messages to indicate the success or failure in the routing of the command. It does not reflect the status of the application command. Applications that do not use an application header can use this field for application oriented status. This field is divided into a user area and a system area. Status codes in the system area have the high order bit in the field reset. These status codes are reserved for system wide status codes. User status codes have the high order bit set and are available for applications to use. Possible status codes are as follows:

1. No Routing Errors—The transaction was successfully routed to the target application.

2. Invalid Route—The ICN send failed at the receiving end.

3. Flow Control—The message could not be routed to the destination application due to flow control.

4. Invalid Object ID—The managed object instance does not exist.

Figures 16, 17:
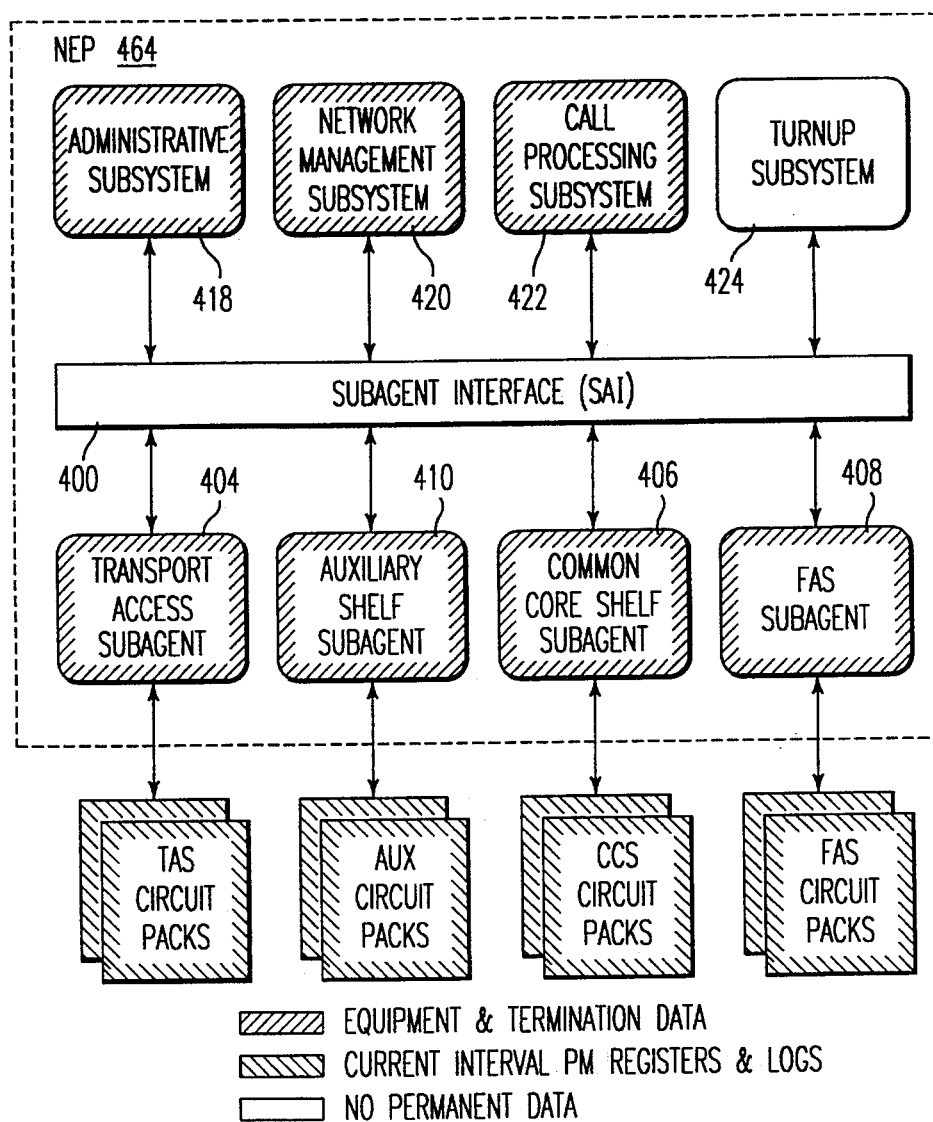
FIG. 16 is a table of states for the message flag field in the IMH of an ICN message.
FIG. 17 is a functional block diagram of the database of the RDT of the present invention.

The flags field 460 (FIG. 15) is the fourth field in the IMH and is one-byte long. The flags identify the type of service the message is to receive. They consist of the following: (1) Message Type (MT subfield)—this is a three bit subfield indicating the type of the message, which can be an Event (an unsolicited message), a Command (a solicitation for information or action), a Response (the result of a solicitation) or Unused (the message is not classified as to type); (2) Acknowledgment Requested (AR bit)—this informs the receiving application that this message must be acknowledged or responded to; (3) Acknowledgment (A bit)—This informs the originating application that this message is an acknowledgment to a previously received message; and (4) Retransmission (RTX bit)—this is a retransmission of a previous message. The table in FIG. 16 summarizes the allowed states of the message flags fields.

With reference to FIG. 14, the content and format of the application header 448 is specific to the particular application message class identified in the IMH. All messages of a particular message class preferably use the same application header. The purpose of the application header is to support additional routing to objects or modules within the subsystem and to support the grade of service or services being employed by the subsystem. Examples of fields that can be present in the application header are object identifiers, transaction identifiers and sequence numbers. The content of the application payload is specific to the particular application message type.

Protocol errors in the ICN will now be described. A recoverable send error is an error that is detected before the message is accepted at the entry to the ICN on the originating side. This type of error results in rejection of the message by the ICN. Examples of recoverable send errors are a circuit pack in flow control, a network outage or an attempt to send a message to a circuit pack that is not present in the network. An irrecoverable send error is a send error for which there is no recovery. Examples of these errors include formatting errors and resource exhaustion.

An ICN post back occurs when a message is accepted at the delivery layer on the originating end and is subsequently undeliverable to the specified receiver. In this case, the message is posted back to the originator by an intermediary or ICN Fault Tolerance process which logs a message that cannot be routed by the ICN or sends a postback to the sender. The routing status code in the IMH indicates Invalid Route. Generally, only those messages with the AR bit set in the IMH are posted back.

An application post back occurs when a message is delivered to the receiver and the receiving application subsequently determines that it cannot process the message. This occurs when an application declares a module, subcomponent, component or entire subsystem in flow control or when an application determines that the entity being addressed is not present. Application flow control provides a subsystem with a higher level of flow control than the flow control offered by ICN, which is on a circuit pack basis only. For a subsystem, ICN flow control on a circuit pack (other than the NEP) is equivalent to flow control on a component. ICN flow control on the NEP is essentially equivalent to flow control being enacted simultaneously on at least one component, and at most the entire subsystem for each subsystem. If an application goes into application flow control, it stops accepting messages for the entity that is in flow control and posts all messages to that entity back to the originator. The routing status code 458 in the IMH indicates Application Flow Control. When an application is in flow control, it preferably must accept messages which release resources. The application typically accepts responses and acknowledgements while rejecting commands and events. When an addressed entity is not present, such as an object in an object base, the application posts the message back to the originator indicating Invalid Object ID in the routing status 458 code of the IMH.

With regard to application protocol data types and constants, the application protocol profile object is a read-only object that contains all application protocol constants. There is one instance of this object per circuit pack in the RDT. This object is created when the circuit pack is initialized and is globally accessible to all application components, subcomponents, modules and compile units hosted by the circuit pack. The application protocol constants are encapsulated in a profile object in order to insulate the applications software from static bindings in the System Services Subsystem 416 on the circuit pack. This is done to avoid propagating recompilations to the application software when basic definitions in the System Services component change.

The application protocol profile contains the following attributes: Application I/O Timeout; Application Error Recovery Timeout; Maximum Application Retransmission; and Maximum Network Delay.

The Application I/O Timeout constant is used system-wide to time a response or acknowledgement to a message in all grades of service above the Non-guaranteed Message Delivery Protocol. The Application Error Recovery Timeout constant is used system-wide to time a delay for error recovery. This timeout is shorter than the Application I/O Timeout. The Max Application Retransmission constant is used to set the maximum number of times a message can be retransmitted after an application I/O timeout in the Reliable Message Delivery with Error Recovery protocol. The Maximum Network Delay constant is used to account for worst case network delay. It is used on the destination side of a transaction in the Guaranteed Message Delivery Protocols.

With regard to the Non-guaranteed Message Delivery Protocol, this protocol can be used between a source application task and one or more destination application tasks. The protocol consists of a message sent from the source to the destination tasks. This protocol is generally used for event messages requiring an acknowledgement or commands requiring a response.

The Reliable Message Delivery Protocol can be used between a source and destination application for message delivery with no error recovery above the delivery service. This protocol differs from the Non-guaranteed Message Delivery Protocol in that it uses the ICN guaranteed delivery option, and, as a result, generally cannot be used when sending a single message to multiple destinations. In this protocol, a message is sent and an application I/O timeout is initiated. Messages can have required responses or acknowledgements, but, if the response does not arrive within the application I/O timeout, the command is declared failed. All post backs and recoverable send errors cause the transaction to be declared failed immediately.

The Reliable Message Delivery Protocol with Error Recovery provides error recovery to the reliable message delivery protocol. In this protocol, messages are sent and timed for at least one application I/O timeout. However, all recoverable send errors and post backs are retransmitted after a delay of one application error recovery timeout, as long as the time remaining the application I/O timeout is greater than the application error recovery timeout. As an option, messages for which a response or acknowledgement are expected can be retransmitted after each application I/O timeout, up to a maximum of max application retransmission times.

The Guaranteed Message Delivery Protocol is essentially identical to the Reliable Message Delivery Protocol except that the number of retries for a message is infinite. With no post backs, send errors or response to a message, the original message is transmitted once every application I/O timeout. When a post back or send error is found, the message is transmitted once every application error recovery timeout, until the message is delivered successfully. This protocol continues to attempt delivery until either a response is received, the physical entity supporting the entity being sent to experiences an outage (i.e. transitions to an OOS state), or the physical entity supporting the entity sending the message experiences an outage (i.e. there is no requirement to remember active transactions after an outage.) Every originating message in this protocol is preferably paired with an acknowledgement. Acknowledgements can be piggybacked onto a response, or they can be a separate message.

The Critical Guaranteed Message Delivery Protocol adds route diversity to the service provided by the guaranteed delivery protocol. A message is sent on the primary media as usual.

2.2 Database Management

The Network Element Processor 62 in the RDT contains two types of memory that can contain RDT operating data: (1) working memory which is volatile; and (2) back-up memory which is non-volatile. The primary database in the RDT is contained in the working memory of the NEP that is in service and active. In a system with redundant NEPs, the standby NEP contains a secondary database. Non-volatile back-up copies of the database can be present on both the primary and secondary NEPs regardless of their service state.

During normal operation, the in-service and active NEP automatically attempts to synchronize all changes to the primary database with the secondary database. No attempts are made to automatically back-up the database to non-volatile memory. This is generally done only in response to an external command or a schedule. During system startup and initialization, only one NEP initializes at a time. This first NEP to initialize is the primary NEP. The primary database is constructed in the working memory of this NEP. If a second NEP is present in the system, this circuit pack is not given the opportunity to initialize and construct a database, until the primary NEP is initialized and the primary database is constructed. During system startup and initialization, the primary database is constructed from one of the following sources: (1) the back-up memory of the primary NEP (if a valid back-up exists on this NEP, it is used to construct the primary database); or (2) system wide default provisioning and current equipment states. This later source is the discovery mode, in which the database is constructed according to what equipment is discovered in the system during the initialization phase. All provisioning is defaulted according to system wide profiles.

Once the primary NEP has initialized, and the primary database has been constructed, the secondary NEP is initialized. A secondary database is constructed on this NEP. The secondary database is constructed from the primary database. If after initialization, the secondary NEP's service state changes from in-service, hot-standby to another state, then a transition to in-service and active or in-service and hot-standby involves reconstruction of the database. The secondary database is synchronized or re-constructed from one of the following sources: (1) the primary database; (2) the back-up on the primary NEP; (3) the backup on the secondary NEP; and (4) system wide defaults and current equipment states.

With reference to FIG. 17, the RDT database 464 is organized as a collection of objects that are distributed across most of the subsystems. Each subsystem contains a collection of objects, and the internal organization of these objects is preferably unspecified. All of the data in the RDT database is preferably stored in the working memory of the active NEP (the primary database) and synchronized with the database in the working memory on the standby NEP (the secondary database). Exceptions to this rule are: (1) performance monitoring data for the current interval is stored in the working memory on the circuit pack on which the monitored facility terminates; and (2) debug logs for each circuit pack are stored in the circuit pack's working memory.

With regard to object organization, the RDT database 464 is organized as a collection of objects, and each subsystem maintains a subset of the entire collection. The entire database appears as one unified collection. Since there are no internal requirements on each subsystem as to how its data is organized or stored, the only visibility into this collection of objects is preferably through a common interface. This interface is the subagent interface 400. The subagent interface 400 allows an application to access the database by sending messages to an object instance. An application can do this without any regard for which subsystem contains the object instance.

There are a few relationships which exist among this collection of objects. These relationships exist to facilitate the following functions: (1) database integrity; (2) event suppression; (3) correlation of multiple events; (4) protection switching; and (5) reconfiguration actions. The relationships can be categorized as:

1. Contained/Container Object: This expresses the relationship where an object is contained by another object. The contained object cannot exist in the database without the presence of the container object. The container object can exist without the contained object. The deletion of the container object cannot occur without the deletion of the contained objects.

2. Supporting Object/Supported Object: This expresses the relationship where an object is supported by a higher order supporting object. The supported object cannot function properly without the supporting object. The supporting object can function, but may be partially impaired due to the absence or impairment of a supported object. This relationship also has all of the properties of the Contained/Container relationship.

3. Protecting/Protected Object: This expresses the relationship where one object is a standby for one or more objects.

4. Simple Relation: This captures relationships between objects that are related, yet do not have the strict requirements of the contained/container or supporting/supported relationships. The objects in this relationship can function when its related object is impaired or absent, although it can change its behavior to accommodate this. Object relationships are categorized here for the purposes of making rules for event propagation and suppression discussed below. The subagent interface 400 names several object classes to support these relationships: namely the entity-relationship base class and the protection group class. Note that only object classes that can be instantiated are discussed in this section. The presence of base classes and their functions are discussed below.

The following paragraphs describe the object classes that are used in the RDT database. The object classes are preferably grouped logically according to a common functionality, and the relationships they employ are discussed.

Figure 18:
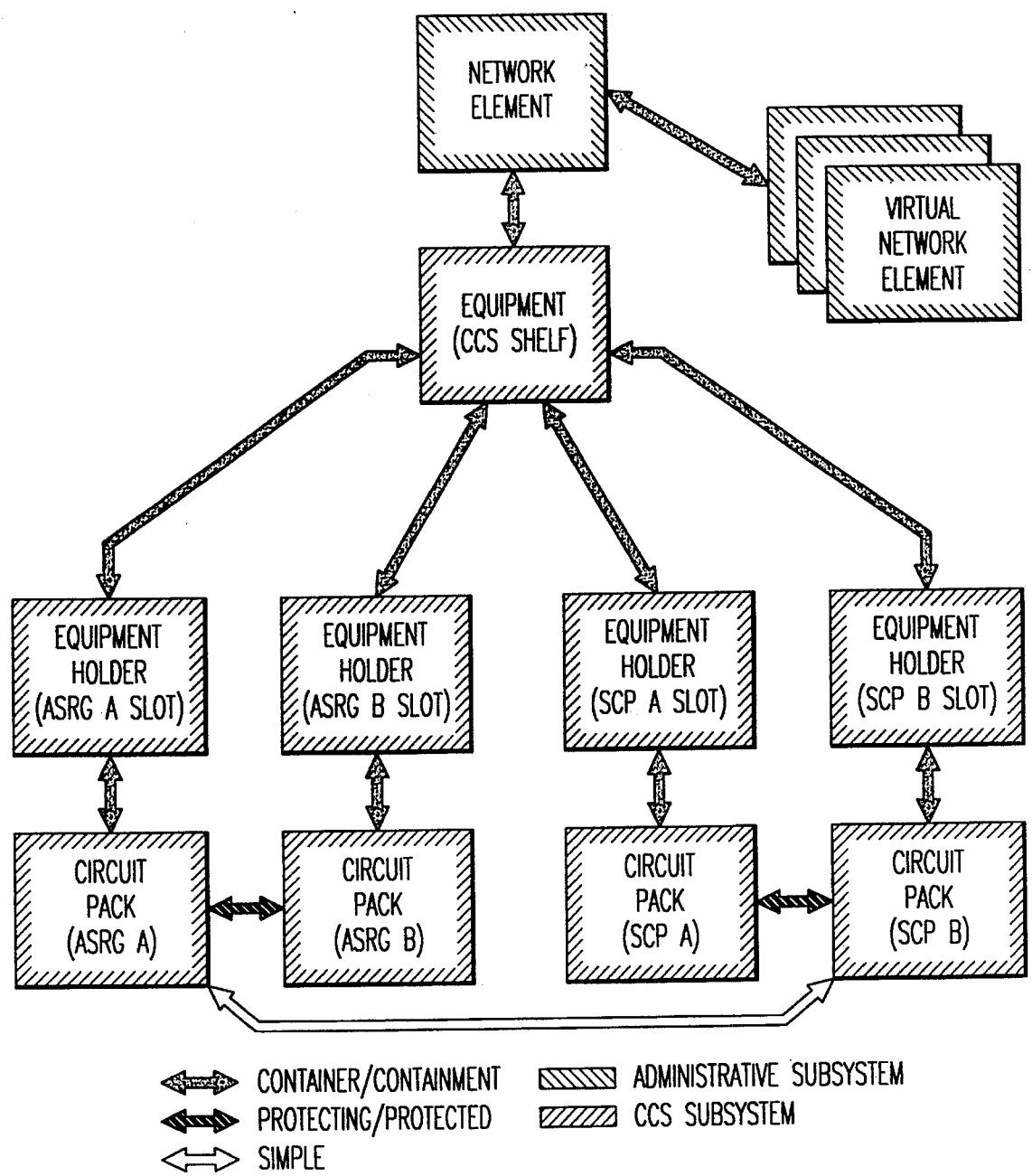
FIG. 18 is a functional block diagram illustrating relationships between selected Equipment object classes.

The following object classes are Equipment object classes used to represent physical equipment in the RDT. (1) Equipment—represents physical shelves and assemblies; (2) Equipment Holder—represents physical sub-shelves, sub-assemblies and equipment slots; (3) Circuit Pack—represents RDT circuit packs; (4) Metallic Test Access Unit—represents the collection of equipment and circuit packs that provide metallic test access; (5) Network Element—represents the entire RDT and system wide parameters; and (6) Virtual Network Element—represents a virtual view of the system. These object classes employ the container/contained object relationship to represent physical containment relationships that exist in the RDT; as shown in FIG. 18. The Network Element object uses this relationship to contain Equipment objects and virtual terminal objects. The Network Element object is a root object in the database since it contains everything either directly or indirectly through its containment relationships. The Virtual Network Element objects use containment to contain feeder and subscriber terminations associated with a virtual terminal. Equipment objects use this relationship to contain Equipment Holders. Equipment Holders use this relationship to contain other Equipment Holders or Circuit Packs.

The supporting/supported relationship is employed by equipment holders to express the relations between termination objects and the physical underlying equipment. This relation is made at the equipment holder, and not at the circuit pack, because termination objects can exist in the database independent of a circuit pack object.

The simple object relationship is employed by circuit packs to express the relations that exist among groups of neighboring circuit packs. This relationship is used in the database to propagate events received by one circuit pack on the behalf of another which may be unable to communicate. This is the case when a Common Core Shelf 26 circuit pack detects failures on a neighboring pack.

The protecting/protected relationship is used to express the relationship of sets of redundant circuit packs. This relationship is used to determine which circuit pack in a redundant set is active and standby.

The following object classes are used to represent the feeder and subscriber terminations in the RDT: (1) Feeder DS1 Line Termination—represents DS1 line terminations on the feeder side of the system; (2) DS1 Framed Path Termination—represents DS1 framed path terminations; (3) Ring VT Termination—represents the VT path terminations in the access shelf ring; (4) DS0 Channel Termination—represents the DS0 channel terminations in the access shelf ring; (5) Subscriber Line Terminations—each of the following object classes represent a subscriber service which terminates on the RDT. (a) Analog Line Termination—represents subscriber line terminations that are used for POTS, SPOTS or ESPOTS; (b) DDS Line Termination—represents subscriber line terminations that are used for digital data service; (c) ISDN Line Termination—represents subscriber line terminations that are used to provide ISDN service; (d) 3DS0 ISDN Framed Path Termination—represents the point where a subscriber's ISDN termination is divided into 3 DS0 Channel Terminations; and (e) Subscriber DS1 Line Termination—represents a DS1 line termination on the subscriber side of the system; (6) Binding Post—represents the physical pair of wires where a subscriber service terminates; (7) Cross Connection—represents a simple relation between a subscriber line termination and a DS0 Channel Termination; (8) Local Craft Interface Termination—represents a local craft interface port; (9) Metallic Test Access Path Termination—represents the collection of terminations used to provide a metallic test access path; and (10) Test Response Circuit—represents the test response circuit.

Figure 19:
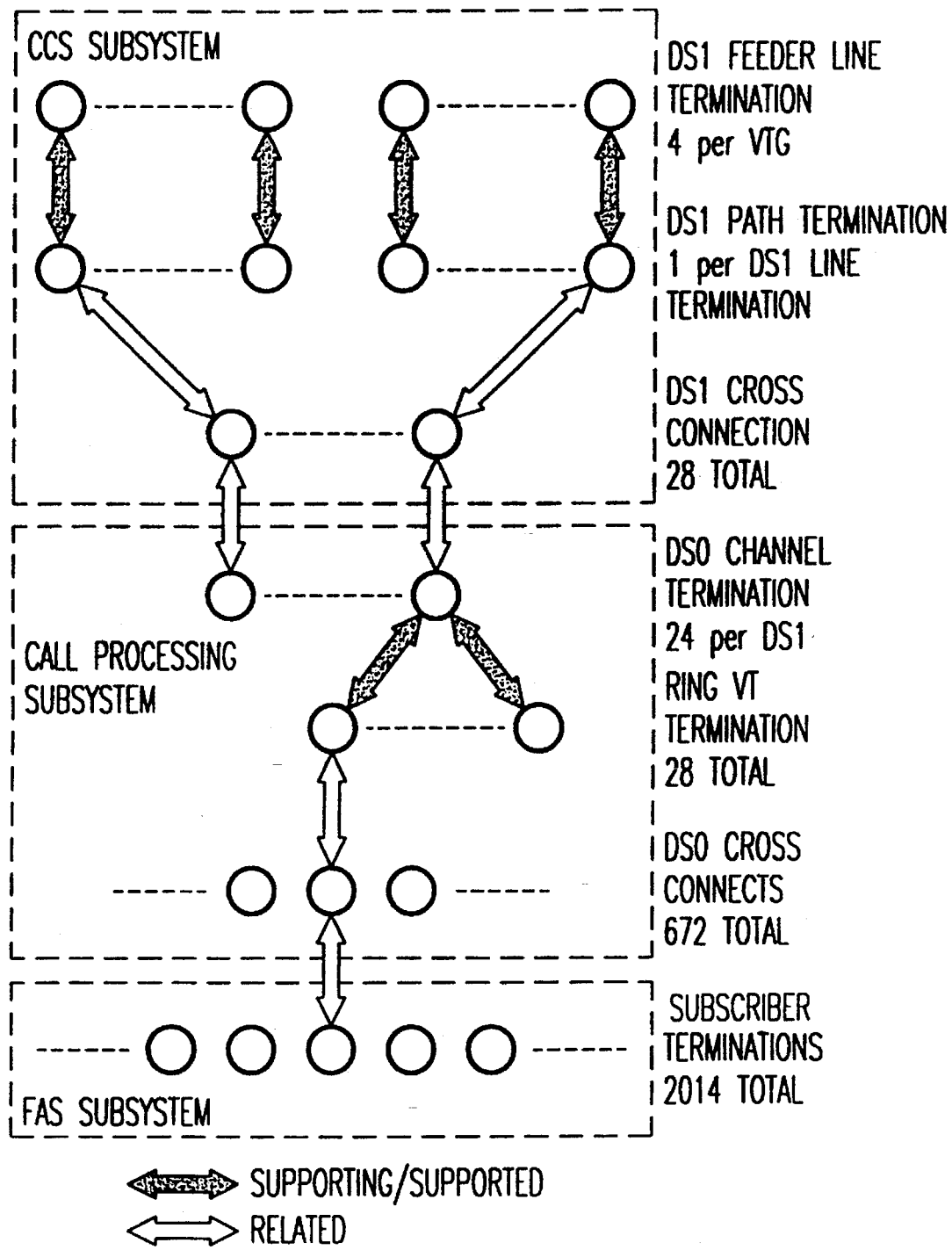
FIG. 19 is a diagram illustrating the relationships between selected Termination object classes.

The terminations in the digital signal hierarchy are related using the supporting/supported relationship as shown in FIG. 19. Recall that this relationship inherits all of the characteristics of the container/contained relationship so that terminations generally must obey containment rules for creation and deletion.

The subscriber line terminations are not part of the digital signal hierarchy and can be created and deleted independent of this hierarchy. Thus, the relationship between a subscriber line termination and a DS0 channel is simple. This relationship is captured in the cross-connect object. Since this relationship is managed externally, it is visible in the database.

The binding post represents the mapping that is made from the physical location of a subscriber line termination to its logical location in a virtual terminal.

Profile object classes exist in the database to capture system-wide default provisioning. A profile can exist for any object class. No profile objects are currently required to be managed externally. These objects generally do not require any relationships.

Other object classes are present in the database to represent miscellaneous items such as (1) Subagents for the Administrative Subsystem 418, the NMIS Subsystem 420, the CP Subsystem 422, the TAS, CCS, CAS, FAS and Auxiliary Shelf 414, and the Turnup Subsystem 424; (2) logs, e.g., the Alarm Log, the Error Log, and the Trace Log; and (3) schedules, e.g., the Backup Schedule, the Diagnostic Schedule and the Performance Monitoring Report Schedule. These objects generally do not require any of the relationships discussed above.

The Object Creation Policy will now be described. Object creation in the RDT database can be inherent or provisioned. Inherent creation occurs when a new physical circuit pack is detected in the system. The RDT database is automatically updated to include an object or objects which represent this circuit pack, its container equipment and its supported terminations. Provisioned creation occurs when an OS or craft user submits a command to provision a termination or equipment. In provisioned database creates, the only object that is created is the object that represents the requested entity. The container equipment must already be present in the database. Supported objects are not created.

The RDT database follows the following policy for inherent database creation:

1. During the initialization of the NEP, the following objects are created inherently:
   a. 1 Network Element to represent the RDT 24;
   b. 1 Equipment to represent the CCS Shelf 26;
   c. 25 Equipment Holders to represent the equipment slots in the CCS Shelf;
   d. 1 Circuit Pack to represent the NEP 62;
   e. 1 Circuit Pack to represent the SCP 54; and
   f. 28 Ring VTs and 672 DS0 Channel Terminations to represent the PCM stream;

2. When the presence of a CCS circuit pack is detected a circuit pack object is created to represent this pack. The equipment holder object should indicate that the slot is equipped. The circuit pack object transitions in accordance with system-wide state model.

3. When a VTG circuit pack is detected, the following additional objects are created:
   a. 4 Feeder DS1 Line Terminations;
   b. 4 DS1 Framed Path Terminations; and
   c. One Virtual Terminal 4. When an FSP is detected, the following objects are created:
   a. 1 Equipment object to represent the FAS if an appropriate equipment object does not already exist. This occurs when the second FSP in a shelf boots up;
   b. 15 Equipment Holder objects to represent the equipment slots in the FAS, if the appropriate equipment holder objects do not already exist; and
   c. 1 Circuit pack object to represent the FSP.

5. When a FIM is detected, the following objects are created:
   a. 1 Circuit pack object to represent the FIM.

6. When an ONU is detected, the following objects are created:
   a. 1 Equipment object to represent the ONU;
   b. Equipment Holder objects to represent the holders in the ONU; and
   c. Circuit Packs to represent the common equipment in the ONU.

7. When a Line Card is detected, the following objects are created:
   a. 1 Circuit Pack object to represent the line card; and
   b. Termination objects to represent the type and number of terminations supported by the line card.

8. When an MAU is detected, the following objects are created:
   a. 1 Equipment Object to represent the Auxiliary Shelf;
   b. 15 Equipment Holder objects to represent the equipment slots in the Auxiliary Shelf; and
   c. 1 Circuit Pack object to represent the MAUA11 inherently created objects indicate a state according to the system-wide state model.

Provisioned creates can occur for physical equipment or terminations. A provisioned create for physical equipment fails if the container equipment is not present. For example, the TL1 command ENT-EQPT for a FAS line card in an ONU that is not currently present in the database will fail. A provisioned create for terminations succeeds regardless of whether its supporting equipment is present or not.

The object Deletion Policy will now be described. All provisioned deletions from the database occur using a two phase committ policy to support the deletion of container and supporting objects. In this policy, when an object is targeted for deletion, the object marks itself deleted pending a committ and then attempts to delete all of its contained objects. This example is for equipment using the container/contained relation. The same is true for terminations using the supporting/supported relation. However, equipment deletes do not traverse across supporting/supported relations. Each contained object in turn starts to execute the same policy. Once marked for deletion pending committ, the object only responds to a request to committ or de-committ the action. All other requests are treated as if the object is not present in the database.

Once all contained objects have responded successfully to the deletion request, the targeted object responds to the originator of the message with a success indication. The originator of the message requests that the attempt be committed or de-committed. A de-committ can occur if the originator requires several deletes to be atomic, and one or more objects indicate they cannot perform the delete. Upon receipt of a committ or de-committ, the targeted object propagates the request to all contained objects. Once the targeted object has collected all successful responses to the request, it executes the request itself.

Once the first phase of a delete is complete, the targeted object waits for the length of one two-phase committ timeout. If this timeout occurs before a committ or de-committ request arrives, the object automatically implements a de-committ. This causes an error to be logged.

The following error situations result in a panic error which causes a log entry and a fatal exception:
   1. Failure to implement a committ after indicating success on the first phase of the delete;

2. Failure to implement a de-committ after indicating failure on the first phase of the delete; and 3. Failure to implement a de-committ after expiration of the two-phase committ timeout.

Deletions from the RDT database for physical equipment generally must satisfy two conditions:

1. A provisioned request must occur; and

2. All physical equipment representing the object and its contained objects must not be present in the system.

This double condition prevents a large amount of churn in the database due to equipment outages, since this is not sufficient to cause an object to be deleted. It also removes the ambiguity involved in discerning a network outage or equipment failure from removal of equipment. While this is generally not a problem for the common core shelf 25, it can be for the access shelves (FAS, CAS) and the ONUs in the FAS. When each of these conditions are met, an attempt is made to delete the object using the two-phase committ policy.

Deletions from the RDT database for terminations can generally only occur through a provisioned request. A provisioned delete request results in the deletion of the termination and all of the objects it supports using the two-phase committ policy.

In accordance with an Object Update Policy, all updates to the database occur using a single phase committ policy. This does not include deletions from the database. All update requests are defined in such a way that multiple attributes can be specified in the request. The subsystem receiving the request to update the object generally must ensure that each object update is atomic and immediate. Updates to multiple objects, which must be atomic, are implemented using a rollback policy implemented by the network management agents.

In accordance with an Object Collision/Locking Policy, the RDT database is distributed to allow each of the subagents to organize their data internally as required to meet their unique processing requirements. Each subsystem generally must develop a policy to manage collisions on its data arising from multiple internal and external requests. Thus, each subsystem architecture supports a policy that guarantees the integrity of the data in its domain, while meeting all timing requirements for processing events and commands that can modify the database.

A number of Object Propagation Policies will now be described. Objects in the RDT database communicate with each other for the purposes of performing the following functions: database integrity, event suppression, correlation of multiple events, protection switching and reconfiguration actions. In almost all cases, communication with other objects is limited to the set of objects for which one of the relationships described above, e.g., contained, supported, protected or simple, is valid. The following policies apply for propagating state changes and events to related objects.

In accordance with a supporting/supported entity propagation policy, objects in a supporting/supported relation propagate state change information in order to update state information and to suppress additional event reports. All updates to state information are in accordance with a system state-wide model.

In accordance with a simple relation propagation policy, objects related with a simple relation have propagation policies that do not apply to all objects related in this way. However, there are groups of objects in the RDT database which have similar propagation policy.

Cross-connect objects express a simple relation between a DS0 Channel Termination and a subscriber line termination. Subscriber line terminations are not part of the digital signal hierarchy. The association between a subscriber line termination and a DS0 channel is made for achieving connectivity, but the service state of subscriber line terminations are independent of the service state of the digital signal hierarchy in the RDT.

Neighboring circuit packs are those packs in the Common Core Shelf 26 which share a common bus (e.g., the SCP circuit packs 54 and the ASRG circuit packs 38 and 39). A simple relation is used to relate these neighbors. The relation is used to notify a neighboring set of packs that the service state has changed on a pack. This does not affect the service state of the neighbor packs, but can cause a reconfiguration to occur. This relation is also used to forward-sense failure events, which are announced by a neighbor pack to the object representing the pack that has failed.

2.3 Error Management

Error Management in the RDT Software System consists of the detection, reporting and logging of error conditions arising both from the RDT software itself and from one of the various equipment interfaces. Error management is broken down into the following activities: (1) event announcement; (2) event suppression; and (3) event reporting.

Event announcement is the generation of messages from a circuit pack to the NEP 62 which announce the occurrence of a detected and verified error condition. Several announcements can be generated for a single event. Event announcement messages affect the automatic service state of a circuit pack or termination. The event announcement mechanism is via the guaranteed delivery protocol described above. Events must generally be verified before they are announced. Verification of an event can occur by a number of means. On a facility, the event is typically integrated for a period of time specified in the standard for that facility. Internally, an event can be verified by debouncing the input, retesting the input, or performing a non-service affecting local diagnostic.

Event suppression is the filtering of duplicate announcements, and suppression of additional announcements which can be generated due to the failure of a supporting entity. The purpose of suppression is to avoid generating multiple event reports for the same overall condition. The event suppression mechanism is via propagation messages which update state information in the RDT database, and command messages which are delivered to circuit packs from an NEP subagent 414. Propagation messages occur between objects which are related using one of the relations described above. These messages occur according to object propagation policies.

Event reporting is the process which can (1) update the standing conditions data store for the system; (2) update of the system alarm log; and (3) generate external alarm reports. The event reporting mechanism is via the subagent interface 400. All event report messages are generally sent to the Administrative Subagent object which represents the Administrative Subsystem 418. The Administrative Subsystem provides a repository for all event reports which are standing conditions, and manages the reporting of these events across a variety of interfaces. These interfaces include the following: (1) active sessions on the local asynchronous interfaces (sessions can be active for the following types of users: Craft; NMA; and RIDES); (2) system front panel; (3) E2A SAC; (4) E2A APR; (5) CO Audibles and Visuals; and (6) TR-TSY-000008 Derived Data Link. Additionally, the Administrative Subsystem is responsible for maintaining and determining the system alarm state. To support alarm retrieval requirements, the Administrative Subsystem provides an interface to retrieve all standing conditions for a particular object in the database.

Each circuit pack in the RDT software system has a watchdog timer which resets the circuit pack in the event the software on the circuit pack is not sane. Sanity is defined by the software's ability to meet its scheduled watch point deadlines.

2.4. Debug System

The RDT provides a logging facility that is derived from the logging facility. The log consists of several logs which can be retrieved, initialized and customized. These logs are:

1. Alarm Log—records system wide alarms (there is one alarm log for the entire RDT, and this log is resident on the NEP);

2. Error Log—records system and software errors that have been detected and verified;

3. Trace Log—records specific milestones in the execution path of a processor in the RDT (trace logs are resident on all Motorola 68000 class processor packs in the system);

4. Crash Log—captures a snapshot of the processor state when an irrecoverable error occurs on the processor (one crash log is resident on all Motorola 68000 class processors in the system); and 5. Statistics Log—records statistics on the activity of each log in the system (each processor which performs logging maintains a statistics log for its logs).

A number of logging data types will now be described. These data types are defined for use with the above-described logs. Other data types are used in other areas of the system as well.

Figure 20:
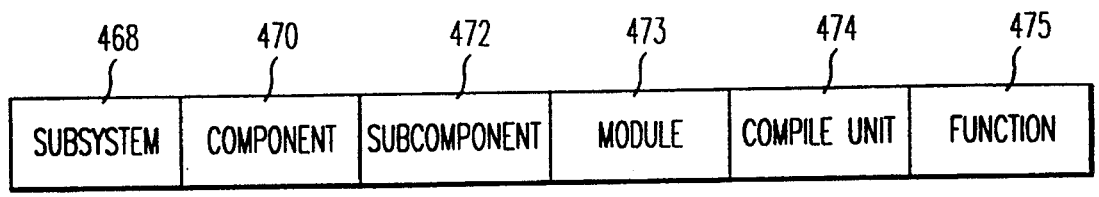
FIG. 20 illustrates the fields in an application identifier.

The Application Identifier (AID) data type identifies which software made the logging entry. AID is defined below in section 5. As shown in FIG. 20, the Application Identifier identifies a software element according to its position in the RDT software architecture hierarchy, as opposed to its runtime parameters such as the program counter and process identifier. The requirements for logging a process identifier and program counter were removed from the RDT. A process identifier will not indicate much on subsystems which define tasks to be nothing more than an execution shroud. Subsystems which provide functionality that is always associated with one task designate these tasks as components 470, subcomponents 472 or modules 473. This indicator can then be permanently associated with a particular task. The Subsystem portion 468 of the Application Identifier is defined as a system-wide constant. This is the same set of constants that are used in the IMH message class field. The remaining portions are defined in the subsystem architectures.

An application filter is applied to the error and trace logs on a circuit pack. This filter provides logging on individual or groups of architectural elements. There is one application filter per circuit pack, and this filter is readable and writable through the use of external commands defined in accordance with TL1 specifications. The format of the application filter is essentially identical to the format of the Application Identifier. The application filter is applied to all function points where trace or error log entries are attempted. Only function points which are not masked by the application filter are logged.

Figure 21:
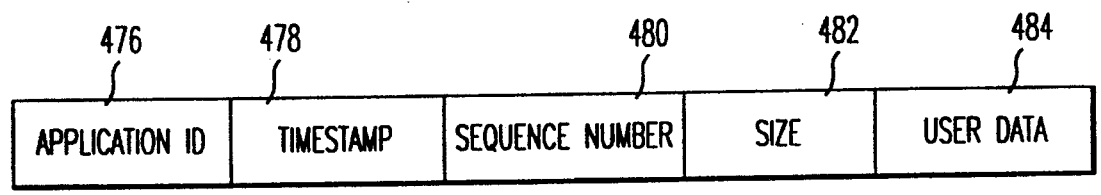
FIG. 21 illustrates the fields in a log entry.

All log entries in the error and trace logs are made in the format shown in FIG. 21. The log entry consists of the following fields:

1. Application ID 476—as previously defined.

2. Timestamp 478—The time of day the log entry was made.

3. Sequence Number 480—This data type is a monotonically increasing number which is associated with each log entry in a particular log. The log sequence number allows fine distinction between log entries which occur with the same time of day stamp. The log sequence number is generally required. This type is defined and managed within the logging software component.

4. Size 482—The number of bytes in the user data area.

5. User Data 484—A sequence of ASCII printable bytes. This area must be ASCII printable to avoid requiring an output driver in the RDT from having to know how to decode every possible structure that can be placed in this area.

An error identifier for an error is a code that is used to decode the error by offline tools in an output driver in the RDT. This code is used to associate the error with a printable ASCII string. For the RDT, the error code is divided into system-wide error codes and subsystem-specific error codes. System-wide error codes are unique across the system. Subsystem-specific error codes are not required to be unique. The subsystem field in the Application Identifier is used to decode the error code when a subsystem-specific error code is used.

The severity of an error is defined to be one of the following:

1. Warning—recoverable, non-service affecting error. This type of error indicates a potential problem or onset of a condition leading to a service outage.

2. Severe—recoverable, service affecting error. This type of error is used to record the detection of events that are used to generate system alarms which may be service affecting and cause automatic reconfigurations, but which do not cause a panic restart of a processor or the system.

3. Panic—irrecoverable error. This type of error indicates a panic restart of a single processor or the entire system. This type of error can affect database and process integrity. An error severity is assigned to each entry in the error log.

A trace level is applied to each point in a software entity where a entry in the trace log is attempted. Generally, higher trace levels are associated with more detailed architectural elements. The trace level is defined to be one of the following:

Level 0—These trace statements indicate entry into, exit from, and progression through sections of code that handle irrecoverable errors which cause a processor enter a failed state or perform a panic restart.

Level 1—Level 1 trace statements indicate the begin and end points of normal transaction processing. A level 1 trace log is generally an indication of all inter-circuit pack messages. The collection of level 1 trace logs across the system is typically a reliable test of conformance to behavior specifications.

Level 2—Level 2 trace statements capture all inter-subsystem messages and transactions within a circuit pack. On the NEP, a trace log at level 2 generally indicates all SAI transactions and their returns, as well as all level 1 log entries.

Level 3—Level 3 trace statements capture intra-subsystem messages. Care is taken to restrict tracing to a small set of components at trace level 3 and above. This trace level captures all send and receive calls to ICN and the SAI whether they are used between subsystems or internal to a subsystem. Level 3 trace statements generally also indicate high level logic flow in a subsystem. Entries and exits at the component or sub-component level are traced.

Level 4—Level 4 trace statements capture resource usage in a software component. Trace statements at this level indicate memory resource allocation and de-allocation, semaphore usage, task allocation and timer usage. This include buffers used to send and receive messages and data buffers used for the long term storage of data records or objects within the subsystem. Level trace statements generally indicate mid level logic flow in a subsystem. Entries and exits at the sub-component or module level are traced.

Level 5—Level 5 trace statements capture detailed execution flow through a software entity. Trace statements at this level include entry to a function or method, abnormal exits from a function or method and all changes to state data.

A trace filter provides filtering which determines which trace points are recorded in the trace log and which trace points are discarded. Trace filtering is generally applied to all architectural elements on a circuit pack uniformly. The trace level is configurable on individual circuit packs through the use of external commands. The format of the trace filter is identical to the trace level. Trace points with a trace level less than or equal to the trace filter are logged.

The Alarm Log contains system-wide alarm conditions. It complements the standing conditions data store by providing a short historical record of alarm conditions that may no longer be active.

The Error Log contains software and system error conditions that are detected on a circuit pack. It aids in system debugging during integration, and in the field by providing visibility into exceptional conditions that have been detected on each circuit pack.

The Trace Log contains software and system error conditions that are detected on a circuit pack. It aids in system debugging during integration and in the field by providing visibility into the execution flow through software entities on each circuit pack.

The Crash Log contains information about the state of the processor. The crash log has one record which is overwritten each time a new crash log entry is made. An entry to the crash log is made when an irrecoverable software error or hard reset occurs. This entry captures the state of the processor.

The Statistics Log contains summary information on all of the logs on a circuit pack. This log aids in debug during integration or in the field by providing a glimpse into the long term performance of the system.

3. Common Subsystem

The common architectural components in the RDT provide the following functions: (1) support for common inter-circuit pack communication; (2) support for common inter-subsystem communication; (3) a common boot interface and component; and (4) a common operating platform. The common inter-circuit pack communication and common operating platform are grouped together into the System Services Subsystem 416. The common boot component is also provided by the System Services Subsystem.

As previously discussed, the RDT database 464 is organized as a collection of objects that are distributed across subsystems. The subagent interface (SAI) 400 is the interface that is used to tie this distributed database into a virtual machine interface. This interface is preferably used for all communication between agents and subagents on the NEP. In addition, subsystems can use the SAI for intra-component communication within an agent or subagent on the NEP. The SAI provides the following functions: (1) construction and manipulation of messages; and (2) application level delivery of messages.

The interface 400 is organized as an message-based interface. A subsystem component on the NEP communicates with another subsystem component by sending a message to one of the objects contained by that subsystem. Subsystems perform operations on these objects by sending them messages. The SAI directs messages targeted to objects to the appropriate subsystem for processing. This is accomplished by requiring that each subsystem provide a name resolution function that the interface can call. This function is essentially a look-up table for the objects in a subagent. A subagent can have many more object instances than the ones that are visible across the SAI 400. Only the objects that are visible across the SAI, however, need be represented in the name resolution function. As shown in FIG. 22, the SAI is a value-added interface which resides in the NEP only and performs higher level messaging between subsystems than the messaging provided by the ICN of the System Services Subsystem 416, which provides messaging, for example, between microprocessors or between processes associated with two different circuit packs.

This abstraction is convenient to the subsystem that is performing an operation because it hides implementation details and differences between subsystems that provide similar services. For instance, the RDT can provide several types of access shelves, each with objects representing POTS subscriber terminations. A subsystem requiring access to these subscriber terminations does not need to know how each access shelf subsystem implements these objects or, in other words, without knowing in what subagent a particular object resides. A subsystem operates on a particular object instance by knowing (1) the identifier for the object, and (2) the messages available for that object class. The identifier for the object is called the Subagent Interface Object Identifier (SAOID). This is a unique name for the object. The naming scheme is similar to TL1 AIDs in that it is based on the physical architecture of the RDT. However, the SAOID also contains an identifier of the subsystem which contains the object instance. This is how a request is routed to the correct subsystem.

The message identifies a service or event and its associated parameters. The underlying organization of the objects in the database (for example, which subsystem contains a particular object instance, and how the operation is carried out) is hidden to the subsystem sending the message. By describing the set of messages associated with each object class and the mechanism for delivering messages, the interface 400 is defined.

The SAI 400 interfaces to each of the subsystems through a registered name resolution function. The purpose of the name resolution function is to provide subsystems the flexibility of having messages routed to a particular task based on the SAOID for which the message is targeted. The name resolution function registration is accomplished statically before system build time. As stated previously, the SAI uses the ICN component of the System Services Subsystem to deliver messages.

With continued reference to Subagent Interface Object Identifiers (SAOIDs), the naming scheme used across the subagent interface 400 is based on the physical containment hierarchy in the system in much the same way TL1 AIDs are typically defined. Each object that is visible across the subagent interface 400 is assigned an object identifier or SAOID. This SAOID contains a field containing the address type, followed by a variable number of fields that are interpreted according to the address type. Each SAI class does not necessarily have its own address type. For instance, all FAS subscriber line terminations are addressed using the same address type, although there may be several SAI classes that represent different types of subscriber line terminations in the FAS. The subagent interface object identifier is not required to be meaningful outside of the NEP 62.

There are a number of requirements for subagents interfacing with the Subagent Interface 400 and subagents providing services in support of the Subagent Interface. Each subagent must export a name resolution function. Each subagent must process all messages defined for an object class if the subsystem supports that object class. A list of the object classes that must be supported for each subsystem is provided in FIGS. 23 through 31. All messages across the subagent interface are preferably delivered with the above-described Reliable Message Delivery Protocol with Error Recovery.

Each SAOID is preferably unique. Each SAOID specifies a type as its first data field. This fixed size data field is used to decode the rest of the SAOID. Each SAOID maps uniquely to an agent or subagent on the NEP. This requirement is to support the routing of requests by the subagent interface with a minimum of registration. Unused SAOIDS are reserved.

The subagent interface object classes define the set of services that are available in the database. These services are grouped according to the entity they are performed on and, therefore are described as objects. For example, for each circuit pack in the system, the network management agents are able to remove the pack from service, restore the pack to service, reboot the pack and retrieve its CLEI code. The interface object class SAICircuitPack defines these services: (1) remove—remove the pack from service; (2) restore—restore the pack to service; (3) restart—reset the pack; and (4) retrieve—retrieve information about the pack. Each service maps onto one message in the implementation. This mapping is at least 1:1 but it can be 1:n because optimizations are available (i.e., it is possible to accomplish several services with one message definition.) These messages define the interface through which the network management agents perform these operations on any circuit pack in the system, despite the fact that some circuit packs are managed by the FAS subagent, some are managed by the CCS subagent and some are managed by the TAS subagent. Further, each of these subagents can have slightly different representations of the data and different implementations of the services. The SAI 400 provides the following services:

1. Retrieve the attributes of an object instance
2. Set the attributes of an object instance
3. Perform an action on an object instance
4. Send a notification to an instance
5. Create an object instance
6. Delete an object instance A list of SAI object classes is provided below, along with a short description of selected object classes that were created to support system or architectural requirements. Most of the objects in the SAI are derived from TR-303 and TL1 specifications.

1. SAI Equipment

The SAI Equipment defines messages to access and operate on physical equipment object in the RDT database. The definition includes messages to manipulate the service state of an equipment and access its contact points.

2. SAI Equipment Holder

The SAI Equipment Molder defines messages to access and operate on physical equipment slot objects in the RDT database. The definition includes messages to provision an equipment slot for a particular circuit pack and retrieve the equipment status from the slot.

3. SAI Circuit Pack

The SAI Circuit Pack defines messages to access and operate on circuit pack objects in the RDT database. The definition includes messages to boot the pack and restart the pack.

4. SAI Memory

The SAI Memory defines messages to access and operate on different types of memories in the RDT. The definition includes messages to backup and restore a memory. All instances of memory objects are contained in the Administrative Subsystem 418.

5. SAI Network Element

The SAI Network Element defines messages to access and operate on the network element object in the RDT database. This object is contained in the Administrative Subsystem 418, and there is only one instance in the RDT. The definition includes messages to set and retrieve system wide attributes such as the system timing sources, system name and system time and date.

6. SAI Virtual Network Element

The SAI Virtual Network Element defines messages to access and operate on the virtual network element objects in the RDT database. These objects are contained in the Administrative Subsystem 418 and there are up to 24 instances in the RDT. The definition includes messages to create and delete terminals and add and delete feeders and binding posts.

7. SAI Internal Termination Group

The SAI Internal Termination Group Object Class is a class that manages a set of internal terminations that have the ability to switch between one of two inputs. This object class are used for management of the internal LAN and internal timing bus. This object class ensures that each element in the group is always on the same input. If an one element in the list does not respond to a change in input, this object class ensures that this event is reported.

8. SAI Internal Termination Element

The SAI Internal Termination Element Object Class is a class that manages an individual internal termination that has the ability to switch between one of two inputs. Instances of this object class are generally always contained by an instance of an SAI Internal Termination Group Object Class.

9. SAI Turnup Pack List

The SAI Turnup Pack Object Class is a class that contains a list of all packs which are supported by the Turnup subagent.

10. SAI Cross-Connection

The SAI Cross Connection object class defines messages to create, delete, edit and retrieve cross connects. All cross-connects are contained in the Call Processing Subsystem.

11. SAI Administrative Subagent

This object class represents the Administrative Subsystem. It is contained by the Administrative Subsystem and there is only one instance.

12. SAI Network Managing Subagent

This object class represents the Network Managing Subsystem 420. It is contained by the Network Managing Subsystem, and there is only one instance. The definition of this object defines messages to advance the subagent through the subagent state model.

13. SAI AUX Shelf Subagent

This object class represents the AUX Shelf Subsystem. It is contained by the AUX Shelf Subsystem, and there is only one instance. The definition of this object defines messages to advance the subagent through the subagent state model.

14. SAI CP Subagent

This object class represents the Call Processing Subsystem 422. It is contained by the CP subsystem 422, and there is only one instance. The definition of this object defines messages to advance the subagent through the subagent state model.

15. SAI Transport Access Subagent

This object class represents the Transport Access Shelf (TAS) Subsystem 404. It is contained by the TAS Subsystem 404, and there is only one instance. The definition of this object defines messages to advance the subagent through the subagent state model.

16. SAI Common Core Shelf Subagent

This object class represents the Common Core Shelf Subsystem 406. It is contained by the CCS subsystem and there is only one instance. The definition of this object defines messages to advance the subagent through the subagent state model.

17. SAI Fiber Access Shelf Subagent

This object class represents the Fiber Access Shelf (FAS) Subsystem 408. It is contained by the FAS Subsystem 408, and there is only one instance. The definition of this object defines messages to advance the subagent through the subagent state model.

18. SAI Turnup Subagent

This object class represents the Turnup Subsystem 424. It is contained by the Turnup Subsystem 424, and there is only one instance. The definition of this object defines messages to advance the subagent through the subagent state model.

19. SAI Alarm Log

This object class represents the system Alarm Log. It is contained by the Administrative Subsystem 418, and there is only one instance. This object class provides messages to retrieve the log.

20. SAI Error Log

This object class represents the Error Logs on each circuit pack performing logging. There is one instance per error log in the system and the instance is contained by the subsystem managing the circuit pack whose error log it represents. This object class provides messages to retrieve the contents of the log and initialize the log.

21. SAI Trace Log

This object class represents the Trace Logs on each circuit pack performing logging. There is one instance per trace log in the system and the instance is contained by the subsystem managing the circuit pack whose trace log it represents. This object class provides messages to retrieve the contents of the log, initialize the log and set the trace level.

22. SAI DS0 Channel Termination

23. SAI DS1 Framed Path Termination

24. SAI 3DS0 ISDN Framed Path Termination

25. SAI Feeder DS1 Line Termination

This object class represents DS1 lines that terminate on the feeder side of the system. This object class defines messages which are used to configure the DS1 line.

26. SAI Analog Line Termination

27. SAI DDS Line Termination

28. SAI Subscriber DS1 Line Termination

This object class represents DS1 lines that terminate on the feeder side of the system. This object class defines messages which are used to configure the DS1 line and also perform binding post assignments.

29. SAI ISDN Line Termination

30. SAI Local Async Interface Termination

This object class represents the local asynchronous ports on the MAU. There are four instances of this object class contained by the Network Management Interface Subsystem 420. This objects class defines messages to send to and receive from a local asynchronous port. The use of these messages are restricted to the Administrative Subsystem 418 and the Network Management Subsystem 420.

31. SAI Metallic Test Access Path Termination

32. SAI Backup Schedule

This object class represents a system wide schedule for backing working memory up to non-volatile memory. There is one instance of this object, and it is contained in the Administrative Subsystem 418. This object defines messages to create, delete, edit and retrieve the schedule.

33. SAI Diagnostic Schedule

This object class represents a system wide schedule for performing diagnostic tests. There is one instance of this object, and it is contained in the Administrative Subsystem 418. This object defines messages to create, delete, edit and retrieve the schedule.

34. SAI Performance Monitoring Report Schedule

This object class represents a per session schedule for reporting the results of performance monitoring. There can be one instance of this object per active session. This object is contained by the SAI Session object in the Administrative Subsystem 418.

35. SAI Session

This object class represents a TL1 user session. This object class is created when the user activates a session and deleted when the user cancels the session. This object defines messages to validate TL1 commands, inhibit and allow messages on the session.

36. SAI Metallic Test Access Unit

37. SAI Test Response Circuit

The call processing interface is a private interface between the Call Processing Subsystem 422 and selected circuit packs in the Fiber Access Shelf and Common Core Shelf Subsystems 408. The circuit packs that the Call Processing Subsystem can communicate with over this interface are: the FSP and the SCP 54.

The turnup/boot interface is a private interface between the turnup subsystem and the boot component on each circuit pack. The purpose of this interface is to allow the turnup subsystem to communicate with the boot component of a circuit pack which has an ICN driver with reduced functionality and routing table.

All of the circuit pack interface subsystems in the RDT preferably have a similar architecture at the down-to-the-component level. The other subsystems (Administrative, Network Management Interface, Call Processing and Turnup) have a similar decomposition in that they must have at least one component on the NEP that is an agent or subagent.

Figure 32:
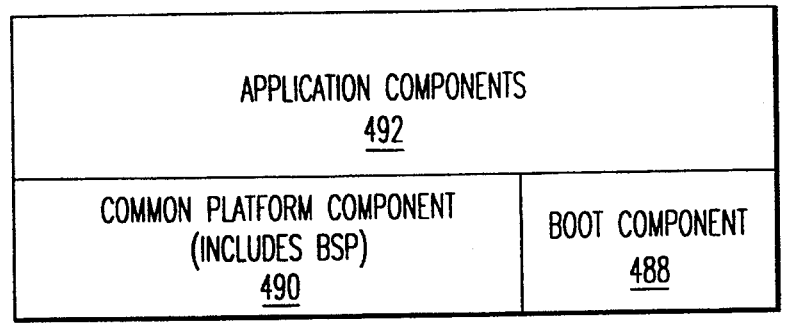
FIG. 32 is a functional block diagram illustrating the general architecture of a circuit pack.

As shown in FIG. 32, a circuit pack generally comprises a System Services Component with a boot subcomponent 488; A Common Platform component 490 with a Board Support Package subcomponent, and Application Components indicated generally at 492. At least two objectives are made for all circuit packs in the RDT. These objectives are made to ease program maintenance and regression testing. First, all application software in the RDT is self-configuring at run time. Configuration of application components is directed from the NEP. This objective, in particular, is made to reduce, compile and build dependencies between different application components on different circuit packs. All runtime configuration is directed from the NEP. A notable exception to this is the SYNC circuit pack 64 which must initialize with a default configuration to allow communication over the internal LAN (FIG. 3).

Second, all runtime application constants that are derived from manifest constants defined in the common platform 490 are bound to the application at runtime. Wherever possible, these application constants are defined once for the entire system. Thus, the objective is to reduce, compile and build dependencies between the common platform 490 and the application software running on it, and to isolate changes in the platform to as few application modules as possible. This greatly reduces the impact of changes in the platform on the application code and makes a simplified approach to regression testing possible when such changes occur. The major sources of change to the constants in the platform are cost reductions or feature enhancements in the hardware circuit packs, and debug and system tuning in the software. It is desirable to isolate the application software from these sources of change as much of as possible.

System Services Components will now be described. A Boot Subcomponent 488 is provided by the System Services subsystem and is stored in a write-protected region of the non-volatile memory on the circuit pack. This component provides support for announcing the presence of the circuit pack in the system over the ICN, accepting a code download and starting the application code.

A Common Platform Subcomponent 490 of the System Services Subsystem 416 provides the operating platform that is used by the application components. This platform contains the real-time multi-tasking executive and the ICN 486, as well as services for buffer management, watch-dog timer management, logs and board support for custom hardware components.

A Board Support Package Subcomponent (BSP) is a set of modules which provide driver level access to custom devices on the circuit pack. The devices supported by the BSP are devices which are unique to the board or a subset of boards in the RDT. This includes off-the-shelf hardware components, as well as custom logic.

The application components 492 for each circuit pack are not specified. The application components on the NEP are partially specified below.

Regarding the NEP Agent/Subagent, each subsystem, with the exception of System Services Subsystem 416, generally contains an application component targeted for the NEP. These components, which are indicated generally at 416 and 424 in FIG. 5, comprise a set of application components on the NEP. These components are agents or subagents. These components have the following characteristics: (1) provide support for Subagent Interface 4000—the agent or subagent component provides support for the SAI to the subsystem, including receiving and processing all SAI messages directed to the subsystem and providing routing support for SAI messages; and (2) provide RDT database domain—the agent or subagent component allocates and manages the working memory for the database objects in the subagents domain.

Each subagent on the NEP interacts with other subagents via the NEP subagent interface 400. Communication off of the NEP to other circuit packs is performed using one of the application level protocols described above.

Figure 33:
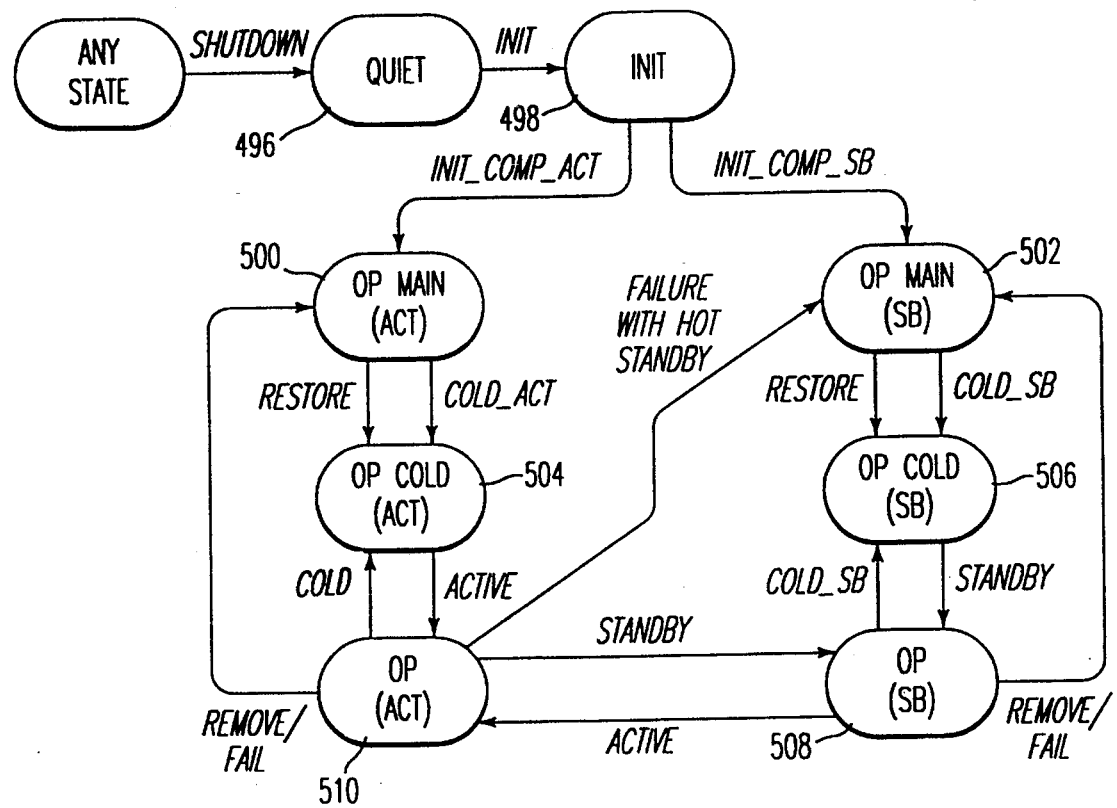
FIG. 33 is a state diagram for a subagent.

Each subagent provides a predictable state behavior to allow for controlled initialization, operation and shutdown. The subagent state behavior is shown in FIG. 33. The state behavior shown assumes the existence of an entity which can generate the necessary stimuli to transition all other subagents to their required state. This entity is called the start-up coordinator. The start-up coordinator is slaved to the NEP circuit pack state. As the NEP circuit pack makes service state transitions, the start-up coordinator makes the appropriate subagent state transitions. The RDT has specific requirements for maximum time allowed to be ready for service after power-on. This translates into a time budget to perform specific start-up functions.

The Quiet State 496 is the initial state for an agent or subagent. In this state, the subagent exists with a minimum of resources and it does not generate any external ICN message traffic or subagent interface transactions.

In the Initializing state 498, the subagent performs internal initialization functions. Data is copied from a flash memory during this order initialization. Most of a subagent's resources are allocated in this state. These resources are tracked to provide a transition back to the quiet state from an operational state.

During the Operational Maintenance Active State 500, the subagent can communicate with other subagents, cards turning up and the craft interface device.

During the Operational Maintenance Standby State 502, the subagent can communicate with other subagents, cards turning up and the craft interface device.

The Operational Cold Active State 504 is an intermediate state which signifies that diagnostics have been performed and passed. Service specific provisioning can be performed. From this state, the subagent can transition to Operational Active State 510. The transition to the Operational Active state occurs on an NEP that transitions directly to an in-service active state.

The Operational Cold Standby State 506 is an intermediate state which signifies that diagnostics have been performed and passed. From this state, the subagent can transition to Operational Standby state 508. The transition to the Operational Standby state occurs on an NEP that transitions to an in-service hot standby state.

During the Operational Standby State 508, the subagent synchronizes with the mate NEP prior to the transition into the Operational Standby state 597 from the Operational Cold Standby State 506. The Operational Standby State is a fully initialized state, in which the subagent is performing as a hot standby for an identical subagent in the operational active state. In this state, the subagent receives database changes from the operational active subagent residing on the in service active NEP. The behavior exhibited by the subagent is to receive the request and process it, without generating any traffic on the internal LAN, except for acknowledgments to the active NEP. Also, in the Operational Standby State, the subagent can only receive changes to the database at major checkpoints in a state transition machine. As a result, an entity which implements a state machine in an subagent in the operational standby state can be required to bypass some intermediate states and proceed directly to a major stable state. The operational standby state is the state that all subagents reside in on the NEP that is designated as the in-service, standby NEP. A transition from this state to an Operational Active state generally occurs only when the standby NEP becomes active. On this transition, the subagent assumes that all provisioning and status data that it holds is accurate and perform activities to verify that all circuit packs under its control reflect this. This is not true for call control data objects and channel test data objects. For these data objects, it is assumed that, if there is any discrepancy between the subagent's data objects and the data objects on the circuit packs, they will disappear quite rapidly in accordance with the central office switch's call processing engine or the with testing system time-out due to expected replies or responses from the RDT. The subagent reports automatically when the transition to the operational standby state is complete using the SAI notification service.

The operational active state 510 is a fully initialized state in which the subagent is providing its full functionality. In the RDT, all agents and subagents on the in-service, active NEP are in the operational active state. The current state of the subagent is the system state and can be imposed on any supported entities in the Operational Active state 500. Transitions can occur from either the Operational Cold or Operational Standby states. In this state, the subagent receives all of its ICN and external message traffic and generates all of its ICN and external message traffic. The behavior exhibited by the agent or subagent is to receive a request or message and process it. Subagents in this state are generally required to provide synchronization messages to the mate NEP as internal subagent attributes are modified or at predefined check points.

4. Administrative Subsystem

The Administrative Subsystem 418 provides common functions that are used by all subsystems. The following functions are provided: (1) scheduling; (2) performance monitoring administration; (3) virtual network element administration; (4) event reporting and standing conditions database maintenance; (5) database synchronization; and (6) database back-up. The administrative subsystem is entirely resident on the NEP. The software hierarchy for the Administrative subsystem is shown in FIG. 34.

Scheduling is supported for back-ups, diagnostics and performance monitoring reports. Note that some level of scheduling is required for internal operations, even if the external commands to manipulate these schedules are not supported. For instance, the RDT can be configured so as not to support the manipulation of diagnostic schedules. A set of internal diagnostics however, can be run periodically, according to a built-in internal schedule.

With regard to performance monitoring administration, each circuit pack is responsible for accumulation of a general set of performance statistics for any monitored entities supported by the pack. The precise definition of each performance statistic from this general set is determined by the support software on the circuit pack. The administrative subagent is responsible for performance monitoring administration, which includes announcing when performance statistics should be collected and stacked, and creating scheduled performance reports.

With regard to virtual network element administration, the administrative subsystem maintains the virtual network element view of the RDT. This allows the subagents to operate with no knowledge of the virtual network elements. The administrative subsystem also provides the capability to store all provisioned associations that are made for each virtual terminal, as well as system wide provisioned parameters.

The containment for the internal network element is shown in FIG. 35 and comprises a Physical Network Element 514, a Virtual Network Element 516, Subscriber & Feeder Terminations 510 and 520, respectively, and IDLC Data Links. The purpose of this containment is to correctly route system alarms. The Physical Network Element 514 contains all of the RDT equipment and the Virtual Network Elements (Virtual RDT) 516. Multiple (up to 14) Virtual Network Elements 516 can be present, depending on mode. The Virtual Network Elements contain all of the Terminations (subscriber and feeder). Feeder terminations 520 are pointers to objects in the CCS or TAS subagents. Subscriber terminations 518 are pointers to objects in either the CAS or FAS subagents.

With regard to network element object behavior, one of the services available in the Subagent Interface (SAI) 400 is event/alarm notification. These notifications are maintained in a single event list contained in the administration Subagent 418. When the notification data base is updated, the new notifications are delivered to the Physical Network Element. Based on provisioning information contained within the Physical Network Element 514, notifications arriving at the Physical Network Element are delivered to a single entity. This entity could be one of the IDLC Data Link terminations contained within the Physical Network Element or to a Virtual Network Element.

With regard to event reporting and standing conditions database maintenance, the Administrative Subagent 418 maintains the standing conditions database. All standing conditions are stored in the Administrative Subagent's data store. The Administrative Subagent receives event reports from all of the other subagents in the system. All other subagents are not required to store standing conditions. These subagents are able to operate correctly by consulting the service state of each entity. Once an event is received, the Administrative Subagent assigns a severity to the event, decides which links the event must be reported on, and then updates the system alarm state of the virtual network element. This requires updates on the TR-008 DDL alarm field for each virtual network element affected by the change, as well as updates to the local visual indications, central office audible and visual indications, if present, and E2A, if present.

The administrative subagent provides user and session security management capabilities for the RDT. User security consists of provisioning and storage of user security profiles. A user security profile contains, at a minimum, a user identifier and a password identifier. Session security consists of validating commands and providing an identifier timer for each session.

5. Network Management Interface Subsystem

Figure 36:
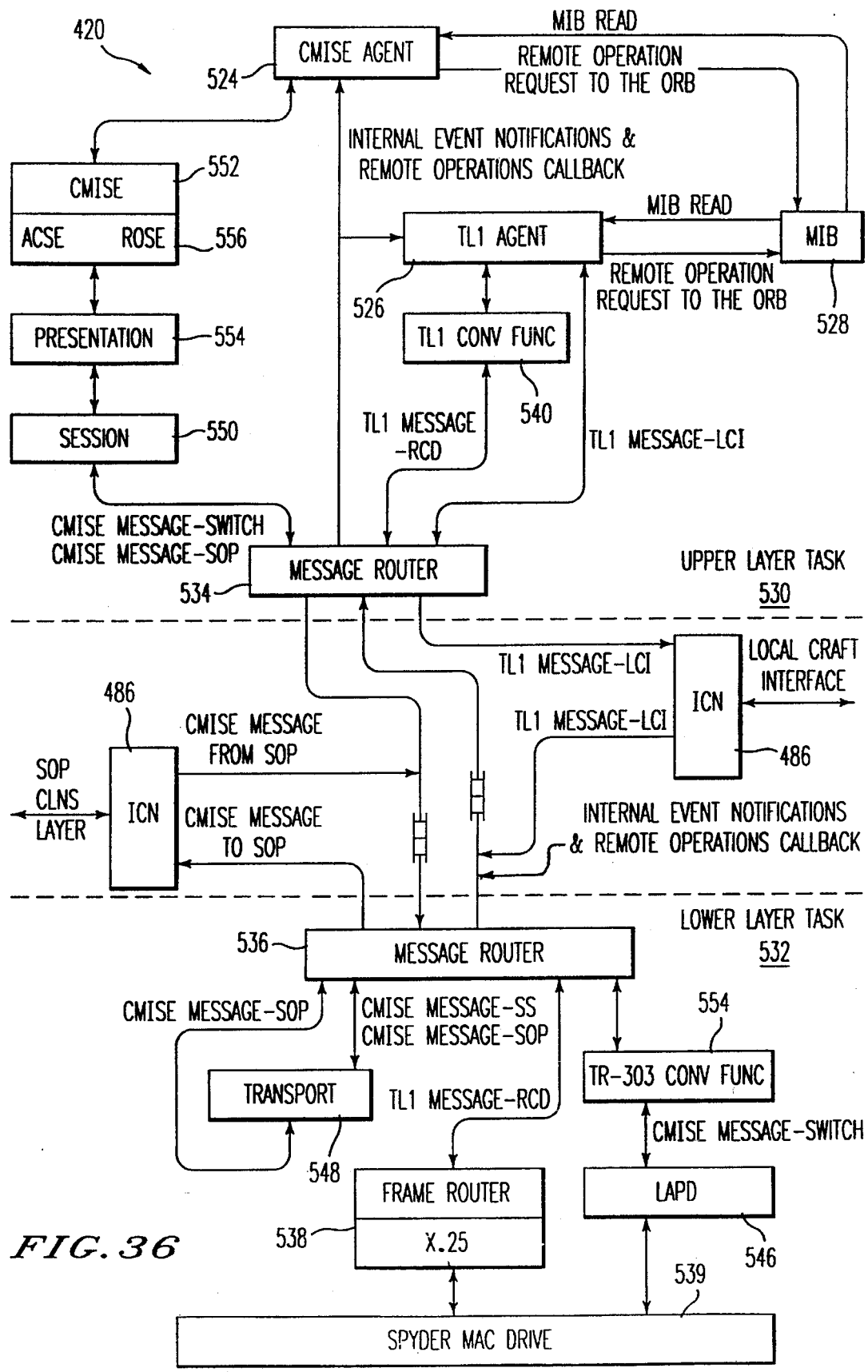
FIG. 36 is a functional block diagram of a Network Management Subsystem configured in accordance with the present invention.

The primary purpose of the Network Management (NM) Subsystem 420 (FIG. 4) in the RDT is to support communication with external managers for the purpose of controlling and monitoring the RDT. With reference to FIG. 36, the architecture of the subsystem comprises three main modules, that is, a CMISE-based network management agent 524, a TL1-based network management agent 526, and the Management Information Base (MIB) 528, and a set of communications interfaces. The MIB 528 is logically located outside of the NM Subsystem 420 because it must be accessed by other subsystems in the RDT, but is nevertheless an important part of the NM Subsystem 420. FIG. 37 depicts the software hierarchy of the NM Subsystem. The subsystem can be split into two pSOS tasks. pSOS refers to an operating system which is commercially available from Software Components Group, San Jose, Calif. The Upper Layer Task denoted generally at 530 comprises the CMISE Agent, the TL1 Agent, and the upper layers of the communication interfaces. The Lower Layer Task denoted generally at 532 comprises the necessary protocol layers for reliably transporting messages from a remote manager to the RDT.

Before describing the architecture of the NM Subsystem, managed and control objects will be discussed. Managed objects are often referred to internally as control objects. Both refer to the same data viewed differently. When the data is viewed as a managed object instance, it is projecting to an external manager. When the data is viewed as a control object instance, it is projecting internally to the equipment. The requirements for the two projections are different. An external manager expects a standardized view of the data conforming with international agreements. The equipment expects a specific view based on the hardware architecture. Only one data instance exists, whether it is viewed by NM as a managed object in accordance with the present invention, or viewed by Call Processing, for example, as a control object.

Threading relates to supporting multiple execution flows without requiring separate tasks. There are two basic types of threads in the NM tasks: service execution and command execution. Multiple service threads can be carried out simultaneously by building state machines for each control path. The state machine contains the current state information of the thread and an automata to determine the valid next states, based on events, that the thread can transition to. As the thread executes, its state machine is updated to reflect its current state. A thread can suspend itself by sending out a message and transition to a "wait" state for the reception of a response. If the thread suspends, all information about its state before suspension can be retrieved from the state machine and execution can be continued upon resumption. Service threads are used in the Lower Layer Task 532 for supporting multiple protocol stacks and multiple associations per stack. When a message is received from a manager containing an association, it is routed to the correct stack based on a destination identifier in the message. The stack machine, in turn, calls the protocol state machine to determine how to react to the message for the particular association it has appeared on. If the current state of the association indicates that the message is valid, the machine transitions to a new state and executes operations based on the message. If the message is invalid (e.g. a data request on a terminated association), then the stack generates an error. The other type of thread is for command execution, as described in further detail below. Since the RDT supports multiple simultaneous commands from multiple external managers, it creates a command thread to track the execution of the command within the RDT. The command thread sets up a state machine with the current state of the command (e.g. parsing, send to Object Request Broker (ORB), waiting for completion status, building response) and commences processing. Command threads are essentially contained completely within the two agents 524 and 526.

The basic functionality of both agents 524 and 526 is to coordinate command execution. Each agent receives a command from an external manager and creates a thread to track the command processing. Next, the agent simplifies the command into a sequence of discrete operations and sends each discrete operation to the Object Request Broker for execution. Since the agents and the ORB are in separate processes, a pSOS message needs to be sent to the ORB for the operation request. While the MIB is a passive element for storing information, an ORB is an active software element that is partitioned in relation to the subagents. Each ORB partition preferably accesses a particular part of the MIB. The ORB and the MIB, however, can be combined or implemented separately. After the message is sent to the ORB, the agent suspends the command thread and executes others, until the ORB sends a callback message detailing the execution status and supplemental information, as indicated by the arrow labelled Internal Event Notification and Remote Operations Callback in FIG. 36. The agent generally does not suspend completely after the request because it can be a relatively long time before the ORB sends a response. In the meantime, the agent continues processing other threads. For example, the ORB may need to set data on a peripheral card on a channel shelf 28 before completing the operation. This mode of operation is termed "Asynchronous Request and Callback". Once the execution thread has completed and built the appropriate response messages to the external manager, it terminates itself, and the corresponding resources are returned to the pool of resources for the system. In the diagram, the arrow labelled Remote Operations Request to the ORB can be seen extending from each agent. The callback comes into a message queue and is routed to the correct agent via the Message Router 534, as shown in FIGS. 38 and 39.

Asynchronous Request and Callback is necessary to separate the NM Subsystem 420 from the rest of the system 24, and to provide one entry point (i.e., the ORB) for updating the MIB 528. However, the agent can synchronously read the MIB, because it is a passive access. If the read requires information external to the NEP, the agent executes it as an asynchronous request. The agents perform synchronous MIB reads to process an operation (e.g. name resolution, scoping, filtering) for efficiency reasons. Retrieval operations on managed objects requested by an external manager are processed asynchronously, as with other operation requests.

Along with command execution, the NM Subsystem 420 supports the capture and transformation of internal event notification messages into CMISE M-EVENT-REPORT and TL1 Automatic messages for transmission to external managers. The internal event notifications are placed in an Upper Layer Task input queue and routed directly to both agents 524 and 526 by the Message Router 534. Each agent has the knowledge of how to format the notification into the appropriate standard (CMISE or TL1) event message and upon what channels to place the formatted event message. Once an agent formats an event message and determines the communication path to send it over, it calls the correct stack implementation to carry out the transmission.

The communications interfaces are based on protocol stack standards provided by Bellcore, CCITT, and ISO. Four protocol stack implementations are preferably provided in the RDT for remote connections. The NM Subsystem 420 also supports local craft interface for on-site connections.

The communications architecture is broken into two pSOS tasks: an Upper Layer Task 530 containing the agents and upper stack layers, and the Lower Task 530 containing the lower stack layers. The two tasks communicate using queue mechanisms supported by the ICN 486. Individual modules in each task package an outgoing message into a message, and call the ICN to send it to the correct destination. A message router 534 and 536 in each task reads a message from the incoming queue, strip off the ICN header 444, and calls the correct service thread to process the message.

The Upper Layer Task 530 comprises two major processing flows: one for the CMISE Agent and one for the TL1 Agent. The CMISE Agent interfaces to the Application, Presentation, and Sessions Layers of the OSI stack. These provide a well-known and negotiable dialogue capability between the RDT and a managing system. They communicate with the CMISE Agent above them and with the Lower Task 532 (either Transport Layer or TR-303 Convergence Function) below them. The TL1 Agent interfaces to the TL1 Convergence Function 540. The TL1 Convergence Function provides the same function as the OSI upper layers but with a reduced capability.

The Lower Layer Task 532 is primarily responsible for the reliable transportation of messages between the RDT and a set of external peer entities. It contains the Transport, Network, and Datalink modules that receive, reassemble and error-check messages for delivery to the NM Upper Layer Task 530 or the Call Processing Subsystem 422. It communicates with the NM Upper Layer Task above and with the Spyder-T interrupt handlers 539 below.

The four remote protocol stacks and the local craft interface will now be described. A TL1/X.25 stack from a Remote Craft Device or an OS is provided, as indicated in FIG. 36 by an arrow labelled TL1Message-SS. This stack uses the X.25 module 538 in the Lower Layer Task to reliably receive TL1 commands and pass them, via the Message Routers 536 and 534, to the TL1 Convergence Function 540. The TL1 Convergence Function handles connection establishment, release, and aborts; otherwise, it sends a complete TL1 command message to the TL1 Agent 526 for parsing. As shown in FIG. 38, the TL1 Parser module 542 analyzes the input message for syntax and minor semantic errors, while building an agent request bound for the ORB 529. If parsing is successful, the resulting agent is sent. If not, the Parser calls the TL1 Formatter module 544 to build a error response in TL1, and sends it back down the TL1/X.25 stack, that is, TL1 Convergence Function 540, Message Routers 534 and 536, X.25 module 538 and then to the remote manager.

An OSI 7-layer stack for the Supervisory System and testing purposes is provided, as indicated in FIG. 36 by an arrow labelled CMISE Message-SS. This stack uses the X.25/LAPB and Transport modules 538 and 548 in the Lower Layer Task 532 to reliably receive CMISE commands and pass them to the Session module 550 in the Upper Layer Task 530. From there, the message is transmitted to the CMISE module 552 and converted to a CMIP Interface Data Unit structure accepted by the CMISE Agent. A CMIP Interface Data Unit, referred to hereinafter as a CMIDU, comprises all of the information in the CMISE request, but formatted to a form more readily processed and understood by the CMISE Agent. While the CMISE message is converted to a CMIDU in the protocol stacks, the Presentation, ROSE, and CMISE modules 554, 556 and 552, respectively, perform syntax checking on the CMISE message. If the message is found to be valid and correct, the CMIDU is sent to the Agent 524 for processing. If not, the module that detects the error builds an error response, and sends it back down the stack without the CMISE Agent being aware that a request was received. It does not include security or semantic validation of the message, which is done by the Agent.

An OSI short stack based upon Section 126.1 of TR-TSY-000303 is provided and is illustrated in FIG. 36 by an arrow labelled CMISE Message-Switch. This stack uses the LAPD module 546 and the TR-303 Convergence Function module 554 in the Lower Layer Task to receive the CMISE command. While this implementation of the TR-303 Convergence Function performs the same functionality as that defined in TR-303, it is constructed differently. The TR-303 Convergence Function then passes the CMISE message to the Session module 550 in the Upper Layer Task 530. The rest of the flow is the same as the 7-layer stack implementation.

A SONET 7-layer OSI stack is provided which is defined in TR-253. The lower three layers, Physical, LAPD, and the Connectionless Layer Network Protocol (CLNP) are supported on the SOP circuit pack 63. Network layer routing software is based on the ISO ES-IS standard. LAPD is connected to CLNP using the Subnetwork-dependent Convergence Function (SNDCF) software developed by Retix Incorporated, Santa Monica, Calif. The SOP circuit pack sends a Transport Layer message to the Transport module 548 of the Lower Layer Task, as indicated by an arrow labelled CMISE Message-SOP. The remaining paths up the CMISE stack are the same as the CONS-type OSI 7-layer stack.

The Local Craft Interface is provided via a UART on the Maintenance cirucit pack, as indicated by an arrow labelled TL1 Message-LCI. The UART is controlled by a handler task on the Maintenance circuit pack which provides enough dialogue to receive a complete TL1 command and package it in an ICN message. The ICN transmits the message to the Upper Layer Task 530 where it is routed directly to the TL1 Parser module 542. As with the TL1/X.25 stack, if the Parser is successful it sends an agent request to the ORB; if not, it calls the TL1 Formatter 544 to send a TL1 error response back to the local craft interface. This communication channel does not use the Lower Layer Task 532 at all.

The CMISE Agent 524 provides the necessary control to process incoming CMISE requests from external managers, and to format and route responses and internal events to managers. It communicates with external managers via CMIDUs from/to one of the interfaces it services. FIG. 39 depicts the modules within the CMISE Agent. It communicates with the protocol stacks on the external side, and with the ORB 529 on the internal side.

The CMISE external message, encoded in ASN.1 and adhering to an international standard, is primarily translated in the CMISE module 552 (FIG. 36) of the Application Layer to a CMIDU. All information in a CMISE message is fully parsed and validated, except for managed object attribute data values. Naming, filtering, and attribute list parameters are examples of fields that contain attribute value data. CMISE passes attributes values to the CMISE Agent in their encoded form. All other information is parsed. If CMISE discovers an error in parsing the received message it generate an error reply and return it to the manager without alerting the agent that a CMISE message was received. For output from the CMISE Agent, complimentary steps are taken. The Agent builds a CMIDU containing internal data except for attribute values to ASN. 1 which it will have to encode explicitly and place in the CMIDU.

The reason the CMISE Agent is responsible for encoding/decoding individual attributes is it eliminates the need for bulk encodes and decodes on areas of the original CMISE message that may never be used. The Agent decodes an attribute value generally only once during the processing of a CMISE operation, no matter how many times the attribute is accessed. The Agent encodes an attribute generally only once, no matter how many times it is duplicated in the response or event.

The CMISE Agent 524 follows these steps to process a received CMIDU structure. Every step has an indication of how it is performed (synchronously or asynchronously).

1. CMIDU Break Up (synchronous)—The Core 558 breaks up and validates the received CMIDU. It converts the CMIDU to an independent structure that it can work upon. During this step, all generic elements of the CMISE request are parsed and validated. If a syntax error is found, the Core forms a CMIDU containing an error response and sends it back to CMISE.

2. Name Resolution (synchronous)—Using the Name Resolution Interface 560, the Core converts the Distinguished Name of the base managed object defined in the CMISE message to an internal reference called an Instance_Ref.

3. Scope (synchronous)—Using the Scoping module 562, the Core locates all of the object instances within the searching scope specified in the CMISE command. The scope starts from the base managed object instance (BMOI) and collects all instances within the scope defined by the command. The BMOI is identified in the CMISE command using its Local Distinguished Name.

4. Filter (synchronous)—Once the Scoping module returns the set of scoped object instances, the Core 558 applies a filter to each for further refinement of the desired instances. The filter, passed in the CMISE command, specifies a set of attribute value assertions (AVA) to be applied to the scoped instances. Multiple assertions can be grouped in a filter using the logical operators: AND, OR, and NOT. The managed object instances that pass filtering are now ready to have the CMISE operation perform upon them.

6. Perform Access Control (synchronous)—The first step in applying the CMISE operation to individual managed object instances collected during scoping and filtering is to confirm that the operation can be performed by the user on the instance. For CMISE commands that operate on more than one managed object instance, access control 564 is performed on an instance-by-instance basis.

7. Execute operation on individual instances (asynchronous)—The Core calls the Managed Object Interface (MOI) module 566 to build and send a single-instance operation request to the ORB for processing. Once sent, the MOI module returns a status of "waiting for callback" to the Core 558. Only one operation can be sent to the ORB per operation thread.

8. Suspended thread (asynchronous)—The Agent Core 558 suspends this execution thread until the ORB 529 sends a callback message containing the completion status of the current operation.

9. Receive Callback (asynchronous)—The Core 558 receives the execution callback containing the completion status and builds a CMISE response structure. There is one response structure per instance. If the CMISE request works on more than one managed object instance, the Agent generates individual CMIDUs containing a response for each instance, and correlates them using the link-reply parameter in the CMIDU. The CMISE Agent converts each CMIDU into a CMISE message and sends it to the correct manager.

10. CMIDU Build Up (synchronous)—The Core 558 at this point has all of the information in an independent form to build a CMISE response. This step converts the data to its CMISE dependent forms and places it in a CMIDU. It subsequently sends the fully built CMIDU to the CMISE module 552 for transmission back to the manager.

11. Termination (synchronous)—Once the responses are sent, the thread terminates itself and free all of the corresponding resources.

The Core 558 can abort request processing due to resource depletion, cancelled requests, schema errors, MIB errors and a variety of other errors. If the Core aborts, it calls the CMIDU Build Up and Termination steps to provide the CMISE 552 with a CMISE/ROSE error indication of what happened and gracefully shut down the operation.

Notifications of internal events are received in an asynchronous manner by the CMISE Agent 524. Generally, the only responsibility of the agent is to report the event using a standard M-EVENT-REPORT message to necessary external CMISE-based managers. All internal behavior initiated in response to the event (e.g. facility protection switch or equipment switch) is typically carried out by other subsystems. More than one manager may want to know about the event. The agent determines which of the managers to send the event to by checking the state and authorization status of the manager held in the MIB 528.

All managed data visible to NM Subsystem 420 is defined in the Schema 568 (FIGS. 38 and 39). The Schema 568 is configured as a set of independent tables grouped into three primary areas:

1. An external area for interpreting and validating CMISE requests. This is called the GDMO Area 572 (FIG. 39) because it is described and built using templates defined in ISO 10165-4 Guidelines for the Definition of Managed Objects.

2. An external area for interpreting and validating TL1 requests. This is called the TL1 Area 570 because it contains the parsing table for the TL1 Parser module 542 (FIG. 38).

3. An area for defining the internal data structures called the AO Area (e.g., AO or Agent-ORB). These internal data structures 574 (FIGS. 38. and 39) define a consistent internal representation of CMISE and TL1 operations. Also, they define the internal representation of events that can then be converted to external notifications based on the CMISE or TL1 schema areas.

The goal is for the CMISE Agent to be a structured automata feeding off the CMISE and AO areas of the Schema in developing operations messages to the ORB. In this way, the CMISE Agent code is compact and generic. Extensions to the external interface can be provided via table updates to the Schema.

With Bellcore, AT&T, and Northern Telecom producing TR-303 Interface specifications that are neither consistent nor fully meet the functionality of the RDT, some form of allomorphism needs to be supported. While the long-term goal of ISO is to add a parameter to the CMIP request to identify a list of allomorphic classes that can be determined during the CMIP operation, the standards are not consistent yet. As a result, the RDT provides allomorphism by assigning unique object identifiers to each variant of a managed object class. Effectively, each variant becomes a unique object class in itself. Only one instance of data typically exists for all of its allomorphic classes. The class definitions can be interpreted as a template placed over the data for viewing by the manager.

For example, an Analog Line Termination subclass for an ESPOTS channel contains the standard TR-303 attributes, as well as a vendor specific attribute for on-hook transmission. When a manager requests an instance using the TR-303 object identifier, it receives only those attributes specified in TR-303 Supplement 3 for Analog Line Termination. A manager using the AT&T object identifier will receive those attributes specified in the AT&T Interface document. A manager using a vendor-assigned object identifier for the ESPOTS channel receives the TR-303 standard attributes, and the on-hook transmission attribute. When a new feature is added to the ESPOTS channel (e.g., an extended range of equalization parameters), an new object identifier must be generated for the new characteristics of the ESPOTS channel. Managers using the old object identifier still receive the original data, because it will not understand the new equalization parameters. Managers that can understand the new features of the ESPOTS channel use the new object identifier and receive the new equalization parameters.

Notifications are for the most part, performed in a similar manner. A notification does not know how it should appear until it knows what the managing system that it is destined for can accept. If the managing system conforms to TR-303, the notification must present itself as a TR-303 M-EVENT-REPORT. If the destination is a vendor-specific craft interface, the notification presents itself in a format accepted by the craft interface. For example, a TR-303 compliant M-EVENT-REPORT for the current alarm summary report has a number of arguments to determine the alarm, its severity, its state, and the reference object. The vendor-specific interface can extend that report to include other arguments such as alarm duration. The Agent receives an internal notification and send it out to the desired channels (configured by the user) in the form recognized by the manager on the channel. This applies to sending CMISE or TL1 events as well.

The TL1 Agent performs the same basic function as the CMISE Agent but for the TL1 commands. There are two major functional differences between the TL1 Agent and the CMISE Agent: (1) where the external message is translated; and (2) how the MIB Containment Tree is referenced.

A CMISE external message, encoded in ASN. 1 and adhering to an international standard, is primarily translated in the CMISE module 552 of the Application Layer to a CMIDU. A TL1 message is ASCII-based and very simple. Thus, it does not need complex translation procedures. The TL1 Agent 526 performs all of the parsing of TL1 commands, and the formatting of TL1 responses.

TL1 commands use the Address Identifier (AID) field to address the entities on which to perform the operation. An AID serves the same purpose as a Distinguished Name (DN) but with a different philosophy. A DN is a structured, hierarchical address of an object instance based on object-oriented paradigms. An AID is a more flexible method of addressing entities using the existing view of the public telephone network. A framework for AIDs has been established by Bellcore, but it is left to each vendor to define the specifics of the AIDs. It may or may not be the case that an AID matches to a DN in a one-to-one mapping. In fact, it may be that an AID maps to a set of object instances or a partial object instance. Based on requirements, the best information model for defining data within the RDT is based on object-oriented paradigms presented in TR-303, T1M1, and ISO standards. These paradigms use CMISE/ASN.1 to define and transmit the information in the model. Because of the differences between CMISE and TL1, this generally requires that TL1 and its AID structure be overlaid on top of the MIB in some consistent, but non-obstructive, fashion.

The mapping of TL1 on top of the object-oriented data model requires the introduction of TL1 "proxy" objects. A TL1 proxy is an entity that logically resides in the MIB 528 and interfaces between the requested TL1 operation and the "real" object instances in the MIB. The TL1 Agent sends an operation request to the ORB 529 and, and in turn, calls the proper TL1 "proxy" object to execute the command. The proxy object resolves the AID into an instance reference or a set of instance references, carries out the operations on the real instances required by the TL1 operation, and collects the results. When the operation is done the proxy object generates a single call back, and sends it to the TL1 Agent via an asynchronous call back.

Like the CMISE Agent, the TL1 Agent sends a translated TL1 command to the ORB for processing and awaits an asynchronous call back. The TL1 Agent follows the steps listed below in processing a TL1 command. As with the CMISE Agent, every step indicates whether it is performed synchronously or asynchronously.

1. Parse command (synchronous)—The TL1 Parser module 542 parses the command into a sequence of single-AID operation requests. If a syntax error is detected, then the Parser builds an error response and sends it to the TL1 Formatter module 544. All TL1 commands have a comparable TL1 proxy object. Proxy objects can support more than one command.

2. Execute operation on individual AIDs (asynchronous)—The TL1 Agent sends the agent request to the ORB 529 asynchronously, and waits for a call back in a manner mirroring the CMISE Agent.

3. Suspend thread (asynchronous)—As with the CMISE Agent, the Agent waits for a call back to resume the thread. Within the ORB, the TL1 Agent request is routed to the correct proxy object for execution.

4. Receive Callback (asynchronous)—Receive the callback containing the completion status of the command and supplemental information. Transmit this to the TL1 Formatter module 544 to build a TL1 response, and to transmit to the source of the command. The TL1 Formatter can buffer the responses in a multi-AID command.

5. Termination (synchronous)—Once all of the responses have been received from the ORB and sent to the manager, the thread terminates and frees all corresponding resources.

Notifications of internal events are received in an synchronous manner by the TL1 Agent. As with the CMISE Agent, the only responsibility is typically to format a TL1 automatic message, and send it to the proper manager and local craft device. The TL1 agent does this by applying a policy defined in the MIB for the routing of TL1 events.

As described in the above section on the CMISE Agent, definitions of data are contained in the Schema. For the TL1 Agent, this includes TL1 parsing tables, TL1 formatting tables (conversion from internal data types to TL1 expressions), and the structure of internal data structures. As with the CMISE Agent, the goal is to provide a generic TL1 engine driven by the tables in the Schema.

The TL1 Agent can be configured to not support AID grouping. In other words, a TL1 command can execute on only one AID per command. However, it will be multi-threaded up to a maximum number of TL1 commands. Any received command beyond the maximum can be rejected with a "Try Later" negative acknowledgement.

The Management Information Base (MIB) is physically organized as a tree of managed object instances representing the Management Information Tree (MIT). FIGS. 38 and 39 both show the MIB as a containment tree of square-circle pairs. Each pair represents one managed object instance in the tree. The square represents a structure containing generic information about the object such as its managed object class, control object class, MIT tree links. The square is manifested as an Instance system object. The circle represents a structure containing the specific information for the instance, an instance of a control object class. As was mentioned before, the management data is stored in a form most readily used by the internal RDT components, that is, as a control object instance.

The entire MIB operates from RAM and is periodically saved as a whole to Flash PROM. Once written to RAM, MIB changes are considered permanent although, in reality, they will not be until copied to Flash PROM. However, safeguards and procedures are in place to prevent loss of power on both the active and standby NEP until RAM from at least one is saved to Flash PROM.

When and how often the RAM gets saved to Flash PROM depends upon a number of factors such as (1) a backup schedule provided by the customer; (2) the number of write operations supported by the Flash PROM chips before they fail; and (3) environmental factors such as power stability and level of maintenance.

From an external point of view, the TL1-CMISE interface system appears as a TL1-only system if the command was received from the TL1 interface, and as a CMISE-only system if the command was received from the CMISE interface. To provide this type of flexibility, the TL1-CMISE interface system is designed such that, regardless of where the command came from, it performs the same operations internally. As stated previously, the MIB in the RDT is defined as a set of standard object classes as defined in TR-TSY-000303, the Bellcore document for IDLC Generic Interfaces. In this proposed architecture, TL1 commands acts on "TL1 Proxy Objects", which, in turn, interacts with the standard object classes.

The manner in which the same operation is handled, depending on whether it originated at the TL1 interface or the CMISE interface, will now be described in accordance with the proposed TL1-CMISE implementation of the present invention.

In the last TL1 example discussed in the background, the TL1 command was "ED-T1::<aid>:<ctag>:::LINECDE= B8ZS, FMT=ESF". Some of the complications that arise due to the differences between the TL1 and CMISE interfaces are addressed as follows:

a) The TL1 command is converted to "TL1 Proxy Objects", which is the equivalent of two CMIS M-SET type services (one for "DS1 Line Termination" object class, and the other for "DS1 Framed Path Termination" object class).

b) Because the TL1 command is a single entity, both the M-SET type services are preferably completed successfully before the operation is considered successful. If the first service operation succeeds, and the second service operation does not succeed, then the object classes are returned to their original state. In order to do so, all of the information related to both object classes is retrieved and stored until both of the service operations are successful. If the second service operation fails, then this retrieved information is used to restore the object classes back to their original state.

c) If a service operation fails, the failure is translated into the most appropriate TL1 error code.

The CMISE interface gets the equivalent functionality with the help of two independent CMIS M-SET service operations. In contrast to the behavior of the two M-SET type operations in the TL1 interface, the two M-SET operations in the CMISE interface are truly independent. Either one of the two operations can fail without any effect on the other operation.

The following text provides two examples of a set of steps for executing a TL1 command. The second example also provides the equivalent M-SET CMISE commands in the TL1-CMISE implementation.

EXAMPLE 1

In this example, the following parsed TL1 command is mapped to a TL1 proxy object and ultimately to an SAI message: ENT-TO::<aid>:<ctag>:::TypE=<clei>:gsfN= 4DU, RATE=24, SC=N. The Schema tables associated with the TL1 Agent 526 provide the information listed in the tables depicted in FIGS. 40, 41, 42 and 43. As shown in FIG. 40, the command (ENT-TO) and the parameter (GSPN= 4DU) correspond to a message ID XI_DEF_MSG_ID_ DLT_SET_C). With reference to FIG. 41, the message ID is preferably converted to the one byte field 456 (FIG. 15) by using a look-up table (not shown) to match the message ID to a binary number between 0 and 255. Further, the SAI service and the object class are also derived from the table, depicted partially in FIG. 40, based on the command, and corresponding modifiers, and, in some cases, parameters.

The TL1 AID is combined with the object class to obtain an SAOID (FIG. 42). Further, the parameters in the TL1 command are converted to SAI attributes using a table that is partially depicted in FIG. 33. The combination of the SAOID, the message ID, and the SAI attributes is sufficient to generate an SAI message, in response to the TL1 command in accordance with the present invention, and to therefore invoke service to operate on objects in the MIB. This is because objects in the MIB have an address (SAOID), a name (object class) and a list of attributes such as parameters that can be modified in the object.

EXAMPLE 2

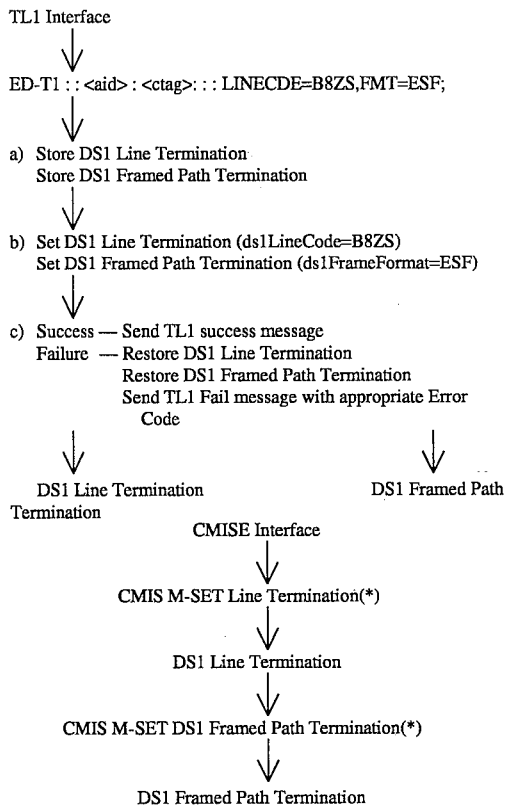

*One of the two CMIS M-SET service operations could fail without any effect on the operation of the other M-SET service operation.

The advantages of a TL1-CMISE NGDLC implementation are a smooth migration from a OS-RDT TL1 to a CMISE OS-RDT interface, elimination of cost-prohibitive and time-consuming hardware upgrades or replacements, and a design that addresses current, as well as future requirements of BOCs.

6. Call Processing Subsystem

The Call Processing Subsystem 422 provides the cross-connection and call control services for the RDT. This subsystem consists of a call processing subagent in the NEP, and associated interface and functional software in the CAS and FAS subsystems.

The Call Processing Subsystem supports signaling interpretation, signaling translation, and time-slot assignment functions. Signaling interpretation reports signaling state changes for each SAI subscriber line interpretation. Signaling translation provides translation functions for future feature enhancements. Time-slot assignment is managed with the cross-connection objects and assigns a SAI DS0 Channel Termination to a SAI subscriber line Termination.

Figure 44:
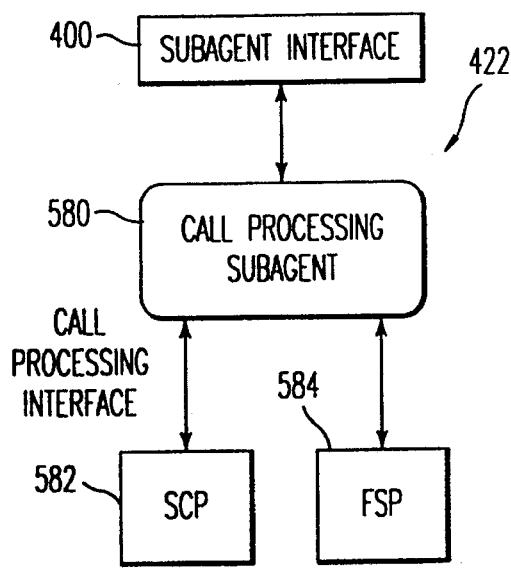
FIG. 44 is a diagram illustrating the software hierarchy of a Call Processing Subsystem in accordance with the present invention.

With reference to FIG. 44, the Call Processing Subsystem 422 comprises a component that resides on the Network Element Processor 62 called the Call Processing Subagent 580. There are also components 582 and 584 resident on the SCP 54 and the FSP, respectively, to support signaling translation and signaling interpretation functions. The subagent 580 supports cross-connection and management functions. The Call Processing Subagent communicates directly with the SCP and FSP circuit packs. This optimization is made to improve the throughput of the Call Processing Subsystem 422.

7. Transport Access Subsystem

Figure 45:
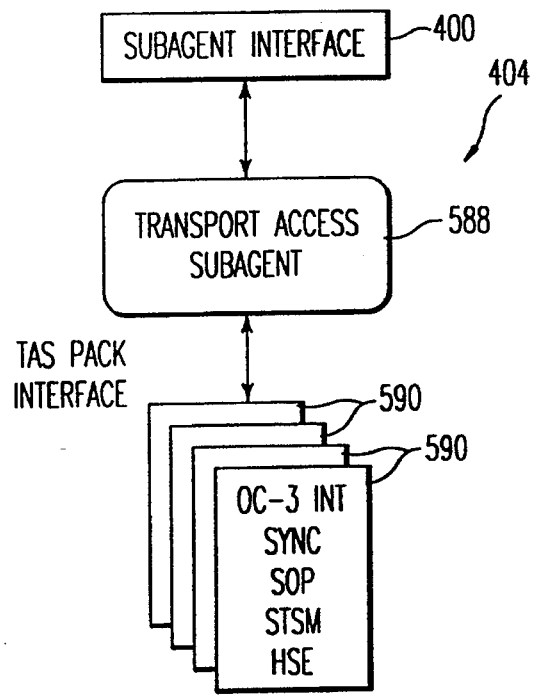
FIG. 45 is a diagram illustrating the software hierarchy of a Transport Access Subagent in accordance with the present invention.

With reference to FIG. 45, the Transport Access (TA) Subsystem 404 comprises the TA Subagent 588 and the FEEDER, SOP, STSM, SYNC, and HSE circuit pack components indicated generally at 590 on the Common Core Shelf 26. This subsystem is also responsible for managing the OC-3 facility and the Internal LAN (FIG. 3).

The transport access subagent 588 manages all the circuit packs that handle system synchronization and the SONET transport in the Common Core Shelf. In addition, the transport subagent manages the terminations associated with a particular circuit pack.

Figure 46:
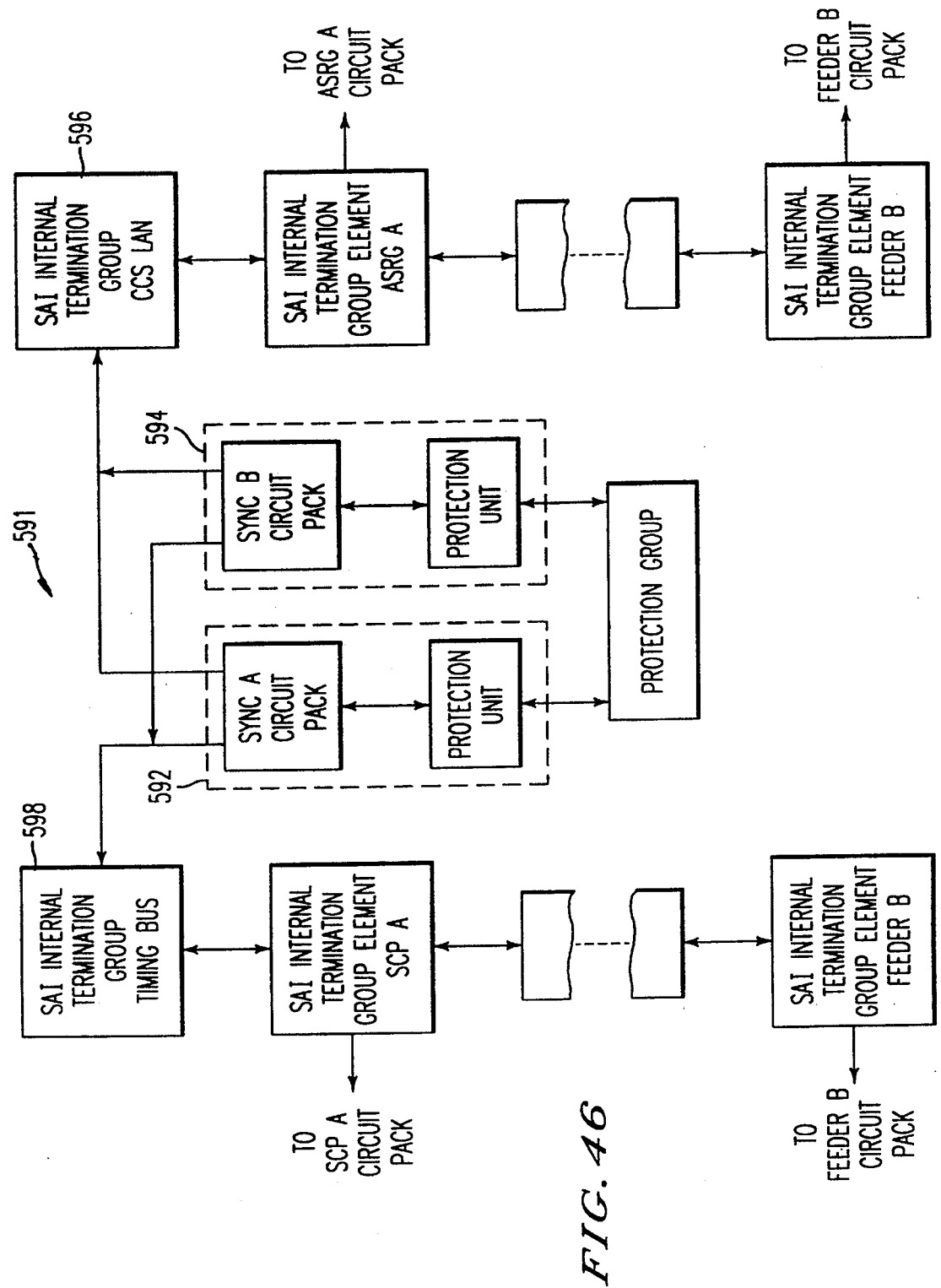
FIG. 46 is a functional block diagram of system timing equipment.

The System Timing Equipment indicated generally at 591 in FIG. 46 comprises SYNC circuit packs 592 and 594, SAI Internal Termination Groups, and SAI Internal Termination Group Elements. Two SAI Internal Termination Groups 596 and 598 are managed for the internal CCS LAN, and the System Timing Bus, respectively. The CCS LAN Termination Group 596 comprises an SAI Internal Termination Group Element to control the LAN termination for each circuit pack in the common shelf. These circuit packs exist in multiple subagents. The ASRG A&B, SCP A&B, VTG 1-7&EPM, AOW, and MAU Group Elements are within the CCS subagent. The System Timing Bus Termination Group 598 comprises an SAI Internal Termination Group Element for each circuit pack which receives timing signals from the SYNC card. The STSM A&B, OC-3 A&B, SOP A&B, and SYNC A&B Group Elements are within the TAS Subagent.

The System Timing Equipment 591 objects include SAI Protection Groups, SAI Protection Units, SAI Circuit Packs, SAI Internal Termination Groups, and SAI Internal Termination Group Elements. FIG. 46 illustrates the relationship of peer objects for the purpose of propagating notifications. In general, the following notification paths exist: (1) notifications to the Physical Network Element; (2) propagation to peer objects; (3) notifications to/from supported entities such as terminations.

8. Common Core Shelf Subsystem

Figure 47:
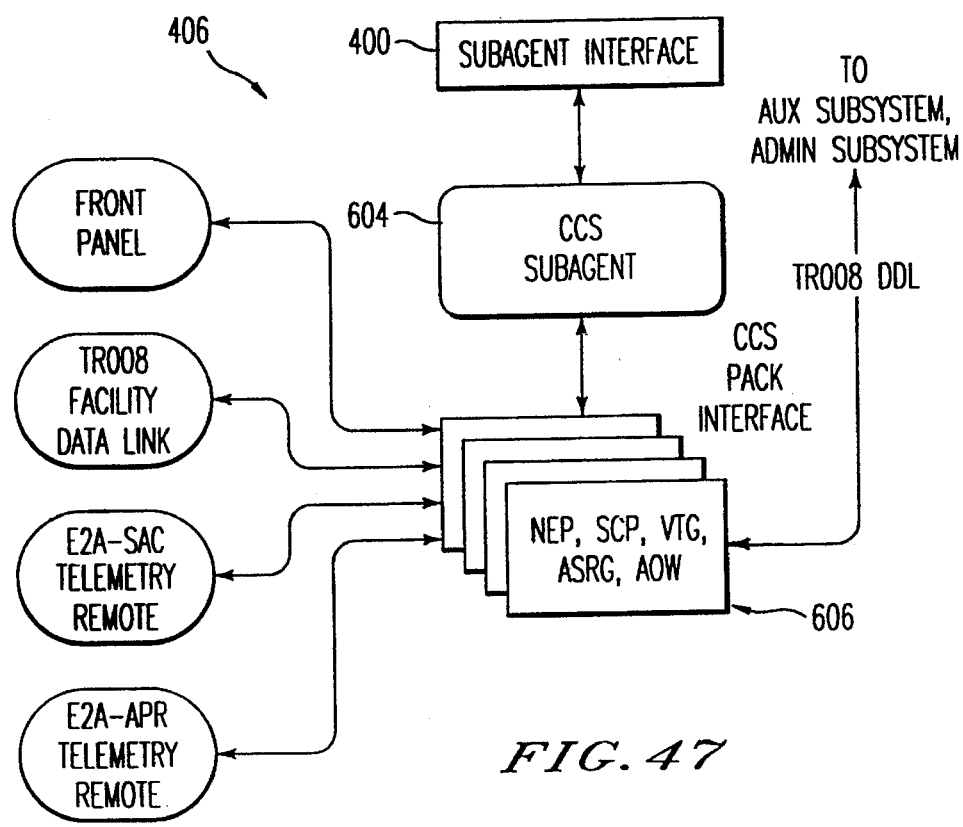
FIG. 47 is a diagram illustrating the software hierarchy of a Common Core Shelf Subagent in accordance with the present invention.
Figure 48:
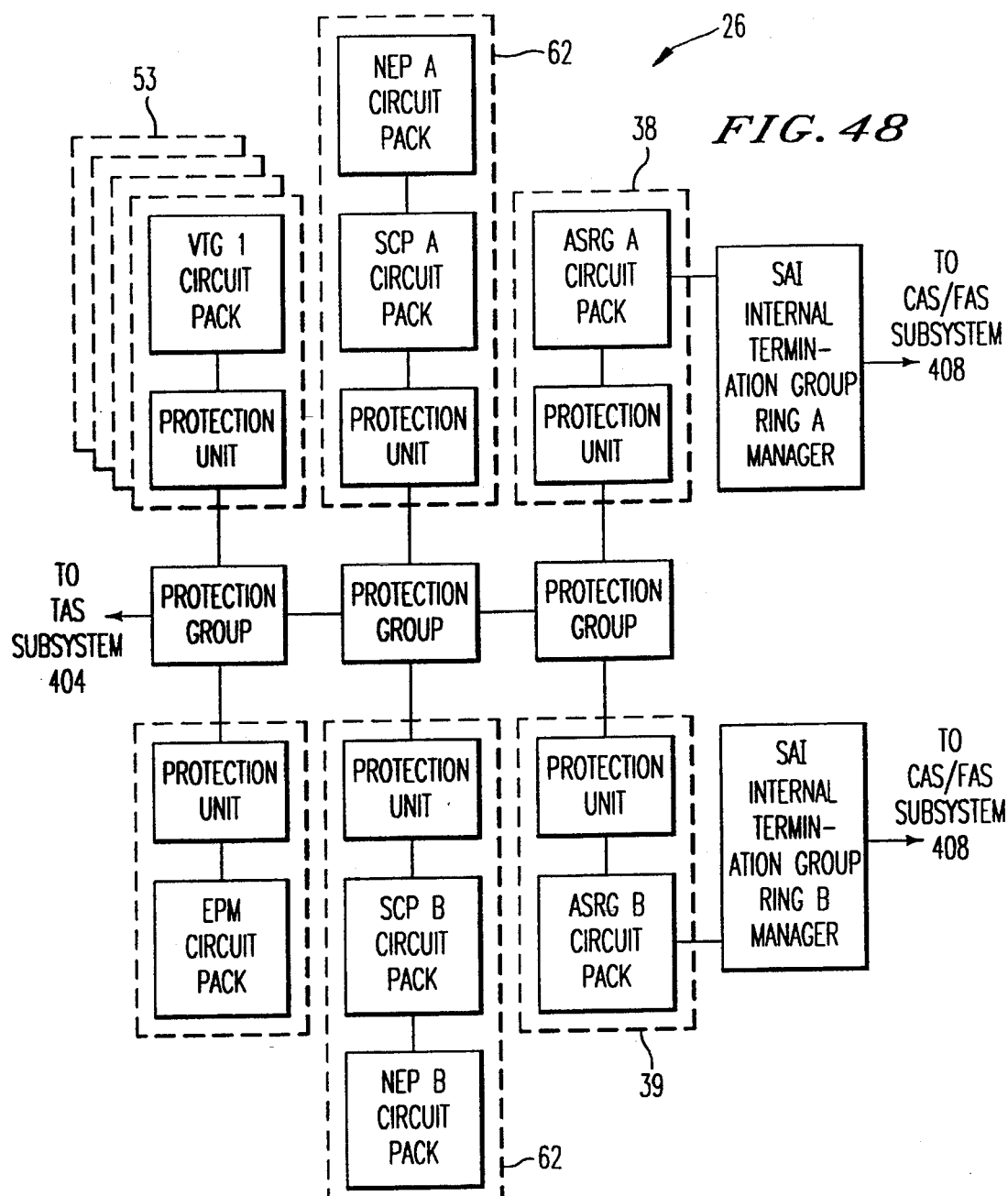
Figure 49:
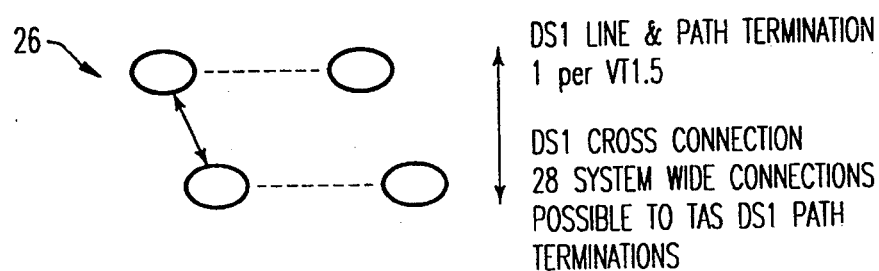

With reference to FIG. 47, the CCS Subsystem 406 comprises a CCS Subagent resident on the Network Element Processor, SCP, VTG, ASRG, and AOW circuit pack software components indicated generally at 606. The NEP is managed at runtime by the CCS Subsystem, and built at compile time by the CCS Subsystem, although the only component provided by this subsystem is the CCS Subagent. All other components on the NEP are provided by other subsystems (agents and subagents) or the system services subsystem (platform and BSPs). The CCS subagent manages the circuit packs that do not deal with the SONET transport in the Common Core Shelf 26. FIGS. 48, 49 and 50 illustrate, respectively, the CCS equipment, termination and ring manager relationships in the CCS Subsystem 406.

9. Auxiliary Shelf Subsystem

The Auxiliary Shelf or Test Subsystem 410 comprises the Auxiliary Shelf 608 Subagent and an interface to the CCS subsystem which allows the test subagent to terminate the TR-008 DDL test messages. The Auxiliary Shelf Subsystem performs initiation and coordination of TR-TSY-000008 channel and customer loop testing, and craft initiated channel and customer loop testing for the RDT. In addition, the Auxiliary Shelf Subsystem manages the operation of the circuit packs in the auxiliary shelf.

The resources generally required for a test in the fiber access shelf are: (1) ONU and Loop Fault Emulator (LFE); (2) that the circuit pack that supports the termination under test; and (3) the termination under test. Once these resources are acquired, the Auxiliary Shelf Subagent 608 conducts the test.

The Auxiliary Shelf Subagent conducts the test by advancing through a state machine for the particular test that has been requested. The Auxiliary Shelf Subagent performs actions on the resources that have been acquired for this test in response to state transitions. The Auxiliary Shelf Subagent responds to events generated by the acquired resources for the particular test. The Auxiliary Shelf Subagent tears down the test, and returns the state machine to an idle state.

10. Turnup Subsystem

With reference to FIG. 52, the Turnup Subsystem 424 performs the following functions: (1) coordinates the start-up functions of the circuit packs; (2) verifies the correct software load is present; (3) performs software down-load to the circuit packs if required; and (4) introduces circuit packs to the managing subsystem at start-up. The managing subsystem is the subsystem that performs all of the provisioning, maintenance, and fault management for the circuit pack. The Turnup Subsystem 424 interacts with the boot component on each circuit pack as it boots. When the boot is complete, and the circuit pack transitions to operational software, the Turnup Subsystem delivers control of the pack to the subsystem that manages the pack. This provides the RDT software with a single point of interface with the boot component on each circuit pack.

The Turnup Subsystem comprises essentially one component, that is, the Turnup Subagent 612, and a private interface to a Turnup software component on the circuit packs. This interface is used to report the presence of a new circuit pack, or for the subagent to control the Turnup functions of the circuit pack. The Turnup subagent preferably contains a single managed object called the SAI Turnup Pack List. This list is updated by the SAI Circuit Pack Objects as they are created or deleted.

11. System Services Subsystem

The System Services Subsystem 416 provides the operating system functions, the internal message delivery services and the interfaces to standard components, such as non-volatile memory for the RDT. In addition, this subsystem provides standard functions for software error detection. This subsystem is structured as a collection of cohesive services with low level coupling between them. This subsystem, or a portion of it, is resident on the circuit packs. Each service provided by the subsystem therefore must generally be configured for each environment. The following services are provided by this subsystem are (1) Real Time Operating System Extension (RTOSE); (2) Internal Communication Network (ICN); (3) error envelope; (4) watchdog timer service; and (5) Timed Services Manager.

Figure 53:
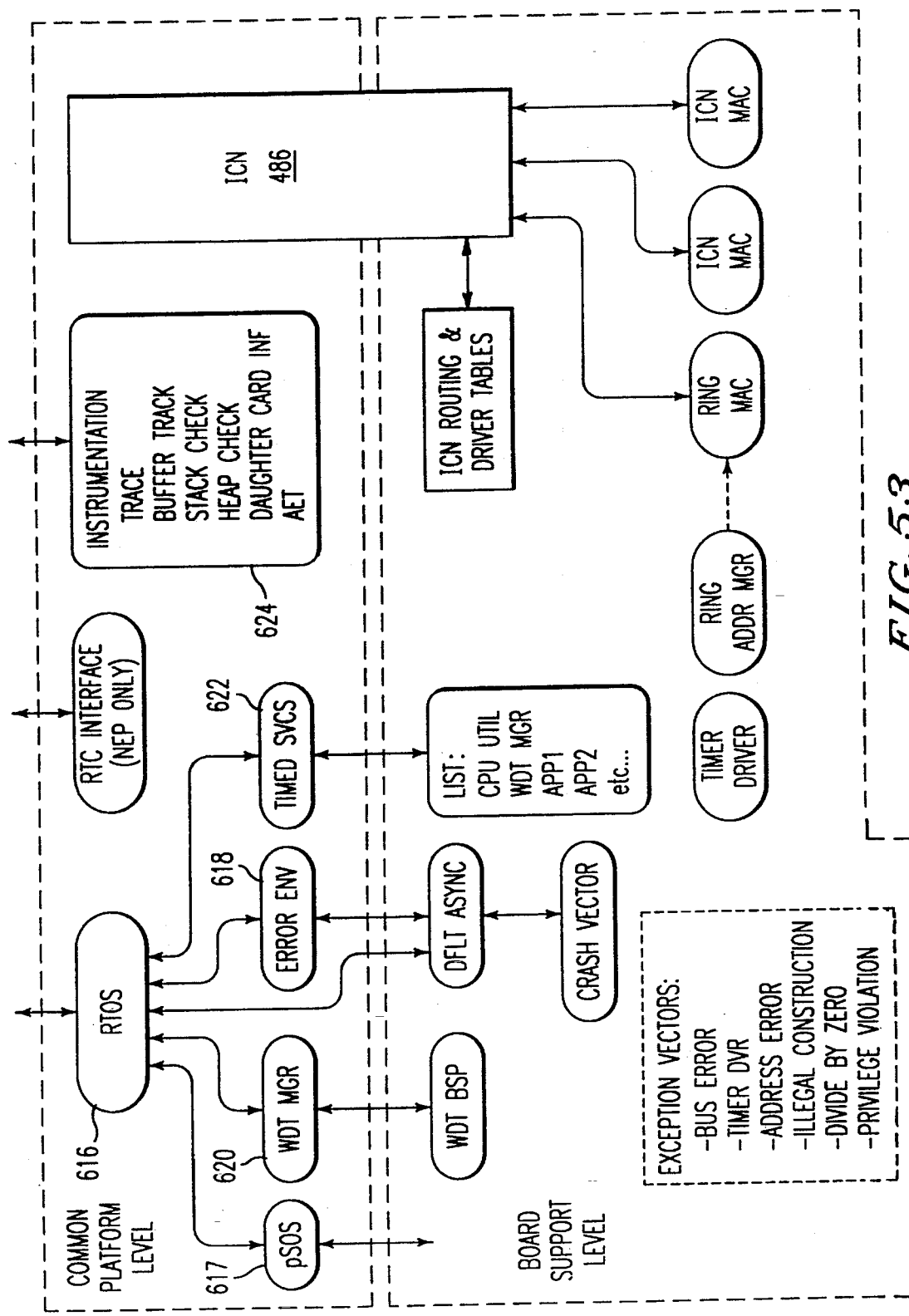
FIG. 53 is a functional block diagram illustrating the system services provided by the System Services Subsystem.

With reference to FIG. 53, RTOSE 616 provides an interface between RDT application programs and the operating system kernel 617. The kernel that has been selected is pSOS+. Additional capability has been included in the RTOSE interface to include features not present in pSOS+.

The RTOSE Task Management services manage operating system tasks by creating and deleting, starting and stopping, and suspending and resuming tasking resources. RTOSE tracks resources allocated by tasks so that they can be released if the task is restarted or is deleted abnormally. RTOSE provides a means to create and start tasks at start-up, as well as to create and start tasks dynamically during normal operations. In addition, RTOSE task management services provides the mechanism for recovering from system errors through an asynchronous handler which is automatically installed at task creation.

The RTOSE Signal management services 616 manage operating kernel signal objects. These objects include events, semaphores, and asynchronous signals. The RTOSE Queue Management services manage operating kernel message queues. The RTOSE Memory Management services manage operating kernel memory resources. The RTOSE Timer Management services allow a user to start and/or stop a timer block object. The timer resolution is at least 100 ticks/second.

The Internal Communication Network (ICN) 486 interconnects the processors of the common shelf, the auxiliary shelf, and the access shelves. ICN connections are provided as a message delivery network. The sender need only know the receiver's node name and gueue name for a message to be delivered correctly.

The Envelope Error Recovery mechanism 618 provides a means to isolate the detection and recovery means from an application. The Envelope is a block of code which is protected by a single error recovery function. These error Envelopes can be nested. The nested Envelope can attempt recovery and continue processing or pass the recovery action to the next recovery function.

The Watch Dog Timer (WDT) service 620 provides a means for tasks to establish a timed checkpoint. If the task cannot achieve the checkpoint in the predefined time, the WDT Strobe is inhibited resulting in a hardware reset. Multiple checkpoints can be defined within a task or in multiple tasks. This service consists of a WDT manager which runs during the CPU idle time, and a library of functions for each task to manage the WDT resource.

The Timed Services task 622 provides a means for a task to execute a function according to a schedule. This schedule can use a time relative to the current processor clock tick and, on the NEP, a time relative to the calendar time of day. The clock tick resolution is in second intervals, and the NEP's wall clock time resolution is in minute intervals.

The Timed Services task 622 is generally the lowest priority task in the circuit pack's architecture. This task has been called the IDLE task in many systems. Effectively, when no CPU activity is being performed, this task gets the CPU to perform its actions. This Timed Services task has an activity list which determines what functions are to be invoked in this timed interval. Tasks can register and deregister functions to this list dynamically at run time to perform low priority activities. An example of a timed services function which system services would register is the watch dog timer strobe (strobe the watch dog device every second).

The System Services Subsystem provides various instrumentation tools 624 to aid the developers in understanding what resources are being utilized by application software on a circuit pack. The instrumentation tools include: (1) Buffer Tracking; (2) CPU Utilization; (3) Stack Check; (4) Heap Checking; and (5) Alarm, Event, Trace Recorder.

The Buffer Tracking tool tracks which application task(s) own a buffer from the RTOSE buffer pools. It tracks when a buffer is queued to another task by transferring the buffer ownership when a buffer is queued and dequeued. It tracks the buffer ownership when a buffer is allocated and deallocated by a task.

The CPU Utilization tool determines how much processor time has been utilized in a given interval by every task on a circuit pack. The time interval is a run time variable which is defined at compile time. This allows each board designer the flexibility to define the intervals according to the circuit pack requirements.

The Stack Check tool determines when the end of the task's stack has been overwritten and takes appropriate action.

The Heap Check tool determines when the end of a memory heap partition has been overwritten and takes appropriate action.

The Log Services subsystem provides an interface to the logs previously described.

12. Access Shelf Subsystem

Figure 54:
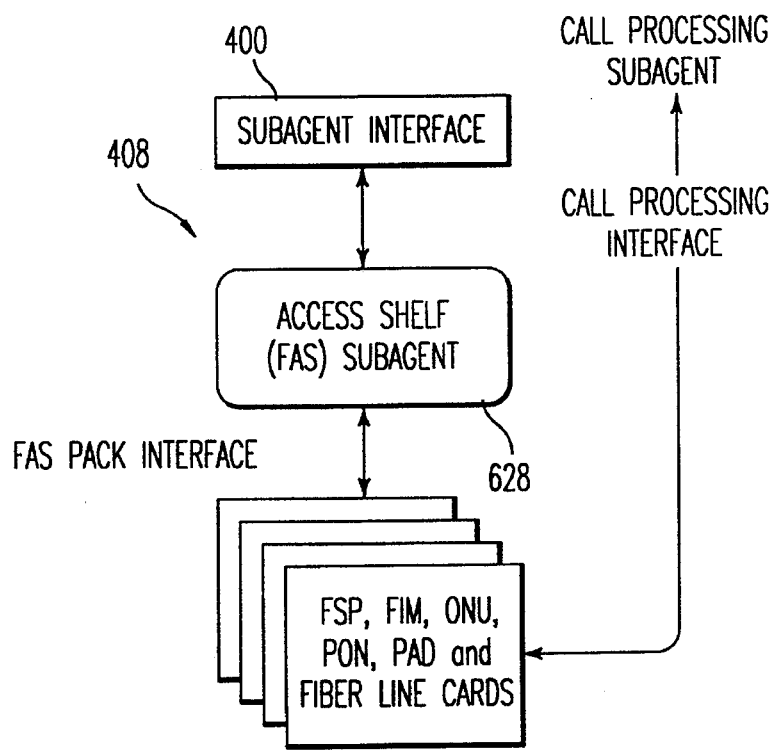
FIG. 54 is a diagram illustrating the software hierarchy of an Access Shelf Subagent in accordance with the present invention.

With reference to FIG. 54, a Fiber Access Shelf Subsystem 408 provides for the management and control of all fiber access shelves in the RDT. The Fiber Access Subsystem comprises a FAS subagent on the Network Element Processor and a component for the application on each distinct circuit pack in the Fiber Access Shelf. A similarly structured Copper Access Shelf subsystem is provided to manage and control Copper Access Shelves.

13. Subagent Interface

The Subagent Interface (SAI) is used for all subsystem communication on the NEP. It provides an abstraction that permits information about where and how operations are performed to be hidden from the applications. In addition, the interface provides a uniform view of system entities which is independent of the internal organization of each subsystem. The SAI provides the following functions: (1) constructing and manipulating of SAI messages; and (2) object-based communication.

Figure 55:
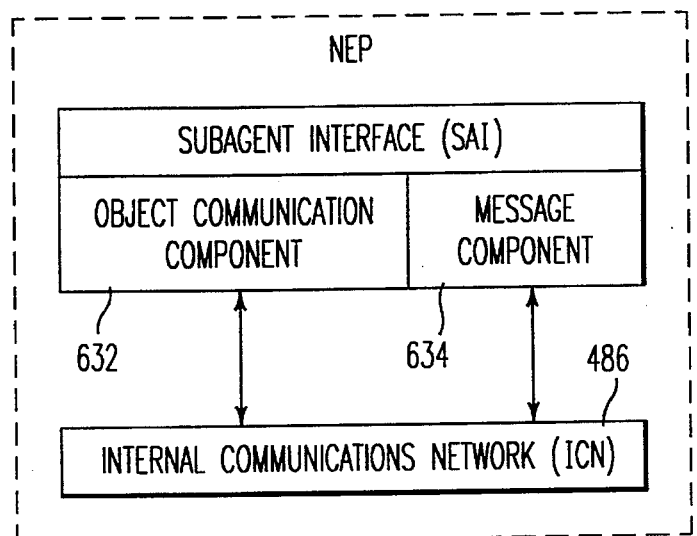
FIG. 55 is a diagram depicting the hierarchy of Subagent Interface (SAI) components.

The SAI interfaces to each of the subsystems through a registered name resolution function. The purpose of the name resolution function is to provide subsystems the flexibility of having messages routed to a particular task based on the SAOID the message is targeted for. The SAI interfaces to ICN through a public API, and comprises two major components (1) SAI Message Component 632, and (2) SAI Object Communication Component 624, as shown in FIG. 55, which depicts the hierarchy of SAI components.

The SAI message components 632 is an object class library that facilitates the construction and manipulation of SAI messages. SAI messages are messages between subsystems that represent a request, response, acknowledgment, or event. SAI messages are sent to objects defined by the interface object classes associated with the software architecture via the SAI object communication component 634.

The object communication component (OCC) 634 is a library which encapsulates ICN and delivers messages created by the message building component 632 to the correct subsystem task queue based on the object instance identifier (SAOID) to which the message is targeted. The object communication component also receives SAI messages arriving at a subsystem filtering out non-SAI transactions. By allowing applications to direct their messages toward objects rather than specific tasks, the details about which subsystem is responsible for handling a particular message and the internal organization of subsystem internals is hidden.

Figure 56:
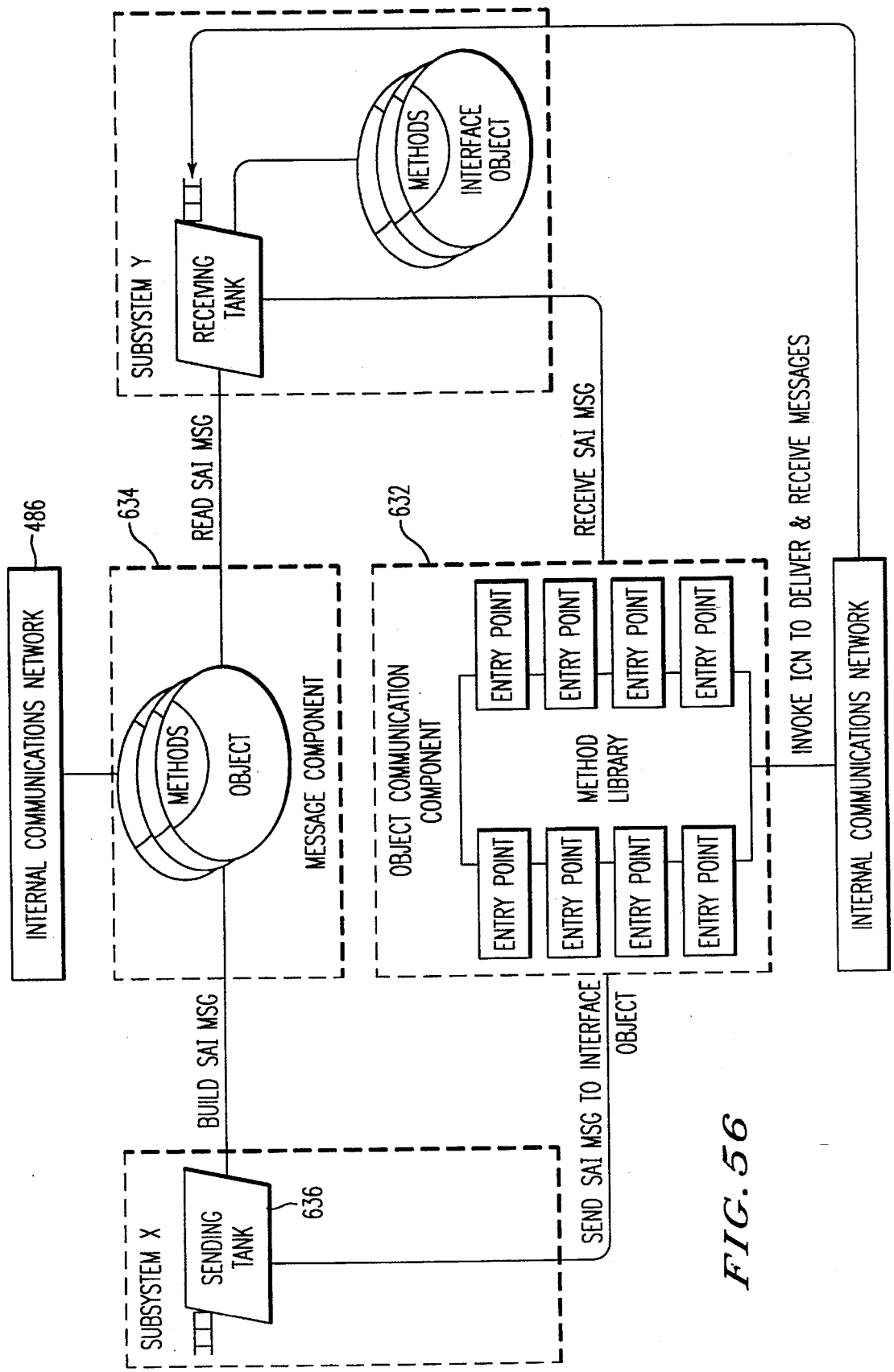
FIG. 56 is a diagram depicting SAI components in the RDT of the present invention.

FIG. 56 depicts the SAI components 632 and 634 within the context of the system. The sending task 636 uses the message class library to construct and address the message and initialize the message payload. The message class library invokes the ICN 486 when the message is created to allocate a buffer for the SAI message. The sender then uses the object communication component 632 to send the message to one of the interface objects, for example, a DS0 channel termination. The object communication component determines which subsystem and ACID within the subsystem to route the message to using the SAOID and a registered name resolution function. The message is then delivered to the ACID via ICN. The receiving task calls the object communication component 632 to receive SAI messages. The receiving task can alternatively call ICN directly to receive the SAI message. This requires the receiving task to perform a decode of the message class in the IMH header before using the SAI message component to access the message payload. When the message is received, the receiving task uses the message class library to determine the message type and access the message payload. The method of sending the response back to the sending task is essentially the same. The receiving task becomes the sending task and the sending task becomes the receiving task.

The physical organization of the interface objects is determined by the individual subsystems. FIG. 56 shows an interface object existing as an entity in subsystem y for illustrative purposes and is not meant to imply an organization of subagent internals.

The SAI uses the memory management scheme imposed by ICN with added protocols that make the originator of the message responsible for allocation and de-allocation of a message object. One exception to this rule is unacknowledged event messages. If an event message is sent across the SAI and an acknowledgment is not requested, the receiver is responsible for deleting the event message. Allocation of the ICN message buffer is encapsulated by the message component of the SAI. When a message is sent, the sender has no rights to the message and cannot delete it.

Applications generally must specify a target object address (SAOID) to initiate communication with entities outside of their subsystems. The object address comprises components shown in FIG. 57 which are preferably organized as a 32 bit entity. A class is provided to construct and manipulate SAOIDS and to therefore allow future implementation to alter the structure and format of this address. The SAI object communication component 632 determines the subsystem to route the message to based on the subsystem type component 638 of the SAOID. On determining the correct subsystem, the SAI calls a statically registered name resolution function supplied by each subsystem to resolve the destination ACID of the message. This function takes an SAOID as an argument, and returns an ACID. The ACID is used to identify a task queue which the ICN uses to deliver the message. Subsystems wanting all SAI transaction to arrive at one queue register a name resolution function that returns the same ACID regardless of the SAOID passed to it.

SAI messages comprise the following return address information: (1) from ACID; (2) from SAOID; and (3) transaction ID. This return address information is used by the SAI to return responses and acknowledgements back to the original requestor 636. Applications responding to or acknowledging SAI transactions do not need to specify address information.

Each SAI command message has a response. SAI command and response message payload formats are identical. The flags field in the IMH header 448 indicates whether the message is a command or a response. The receiver of an SAI command fills out the response fields contained in the command message and sends the message back to the original sender. Likewise, acknowledgments to SAI event messages are identical to the original event message with the flags field set in the IMH header indicating an acknowledgment. Since SAI messages are generally always routed on the NEP, there is no additional overhead incurred using this scheme. In addition, the receiver does not need to de-allocate each SAI message and re-allocate a response or acknowledgement message.

Because some object attributes can only be set once during creation and defaulting may occur, object creation messages are distinguished from object modification or "set" messages. Object creation messages are addressed to the object identifier (SAOID) to create. These messages contain values for all semantically related object attributes. Defaults for attributes not supplied by the application are provided where appropriate. In addition, each attribute has an associated "status" attribute which is used to identify detail status information when create operations fail. Object deletion messages are addressed to the object identifier (SAOID) to delete.

Modification of object attributes is accomplished by sending one or more "set" messages to an object. As a rule, all semantically related attributes are grouped together in one set message. Unique set messages can be developed to modify other logical groups of attributes, such as performance thresholds and alarm severity assignments. In addition, attribute modification operations which have special behavior or imply a higher level operation are accomplished with "action" messages. For example, "remove" or "restore" operations are used to bring entities in and out of service rather than "set" operation on the primary service state. Each attribute in a set message has an associated "status" attribute to identify detail status information when set operations fail, and to indicate to the receiver of the message the attributes being modified.

Retrieval of object attributes is accomplished by sending one or more "get" messages to an object. As a rule, "get" messages are similar to the "set" messages but include additional attributes which can not be modified. As with "set" messages, unique messages can be developed to retrieve other logical groups of attributes such as performance monitoring information and current problem lists. Operations which perform actions on objects comprise all of the attributes necessary to perform the operation.

The SAI object communication component filters messages for synchronous send and receive operations. On synchronous blocking send operations, the object communication component waits for the response to the originating transaction and filters out all other responses, placing them on an error queue specified by the application. On receive operations, the object communication component waits for SAI transactions to arrive. All other arriving transactions generate an exception.

As discussed previously in connection with FIG. 12, an SAI message preferably comprises four distinct parts. The first part is the ICN specific portion 444. The second part is the IMH header 446 which is common to all applications. The third part is the SAI header 448 and the last part is the message payload 450. The ICN header is used by the System Services Subsystem to route messages to tasks. The IMH header is used by the application software to determine the format of the application header.

The SAI header is shown in FIG. 58. The To object identifier 644 identifies the object that originated this message. This field is generally never modified by the receiver of the transaction. The transaction ID 646, in conjunction with the to object identifier, uniquely identifies the instance of a message. It is used to match up application commands and responses, detect tardy responses, and detect lost responses. Applications calling a synchronous SAI send operation provide a unique transaction identifier for each transaction based on the object instance ID and transaction number. The status field 648 is used to indicate the general status of the SAI operation. Detailed status information is part of the message payload. The content of the message payload 450 is specific based on the SAI message type.

The SAI provides synchronous blocking, synchronous non-blocking and asynchronous protocols for communication. The synchronous blocking interface allows subsystems to obtain indirect access to entities contained in other subsystems. A message is sent to the subsystem managing the entity and the caller's task is blocked until a response for the message is received or a time out occurs. The asynchronous interface allows subsystems to obtain indirect access to entities contained in other subsystems. A message is sent to the subsystem managing the entity, and control is returned to the caller's task. The synchronous non-blocking interface allows a subsystem direct access to entities contained in other subsystems via a function call. This interface is provided for time critical operations which cannot afford the overhead of messaging to access entities in other subsystems. This method of accessing entities is generally limited to a few special cases.

The SAI does not manage errors, but rather reports them. Errors that occur when constructing a message use an error envelope to throw an exception. Examples of such errors are (1) errors encountered on ICN call to allocate a ICN buffer; and (2) constructor argument out of range. Methods which initialize message attributes return an error status code if the value of a particular attribute is determined to be out of range. The object communication component returns an error status code if errors are encountered. Examples of possible errors are: (1) errors encountered on ICN calls; (2) messages that are not properly addressed; and (3) time out expires on a synchronous send operation. The object communication component uses an error envelope to throw an exception if it receives messages with a class other than SAI. Errors encountered during message construction use an error envelope to report the error. The object communication component uses an error envelope to report messages received that are not SAI class messages.

No special controls are needed to debug the SAI internals. The SAI can to capture information which can aid in debugging system-wide problems. The SAI supports internal debugging designed for use during product development and testing, and product debugging designed for use during the deployment of the product. Internal debug consists of logging to RAM or an output debug port. This debugging is designed for use during the unit, component, subcomponent, and system test phases. This facility is disabled during the product test phase and is not available in the deployed product. Since the SAI does not have its own task context, logging is accomplished by sending a message to a logging task. At a minimum, the debut control bit mask for the SAI comprises (1) Debug Control to enable/disable RAM logging and External I/O logging; and (2) Object Class to filter SAI transactions on the basis of the target object class. Logging is generally only available in the object communication component of the SAI.

To conserve RAM resources, identifiers are logged in numeric format. These identifiers are translated to ASCII text when the debug log information is presented at an external interface. The SAI Debug Entry Format is shown in FIG. 59. The debug entry comprises (1) To ACID 650—destination ACID of the message; (2) To SAOID 652—destination SAOID of the message; (3) From SAOID 654—object source of the message; (4) Flags 656—flags of the IMH header; (5) Sequence No. 658—Application specified sequence number; (6) Message ID 660—Numeric message identification code; (7) SAI Status 662—Status field of the SAI header; and (8) Time 664—Date and time stamp of the operation. External debugging is supplied for the collection of debug information when the product is deployed in a customer environment. Trace statements are logged as strings for all SAI transactions. These strings comprise: (1) SAI—indicates SAI transaction; (2) Message ID—ASCII representation of numeric message ID code; and (3) To SAOID—ASCII representation of target SAOID.

While a particularly advantageous embodiment has been chosen to illustrate the invention, it will be understood by those skilled in the art that various changes and modifications can be made therein without departing from the scope of the invention as defined in the appended claims.

What is claimed is:

1. Network management apparatus for interfacing a network element in an access system with at least two operations systems employed in an open system interconnection or OSI architecture, and a non-OSI architecture, respectively, the network management apparatus comprising:

a first interface for interfacing said network element to said OSI operations system;

a second interface for interfacing said network element to said non-OSI operations system;

a control device coupled to the said first interface and said second interface for receiving OSI and non-OSI operations system commands from said first interface and said second interface, respectively; and a memory device coupled to said control device for storing a database of managed OSI-based object instances organized into object classes, and at least one table of data comprising an access identifier, at least one of said object classes and an object instance identifier corresponding to a non-OSI command;

wherein said control device being programmable to process said OSI commands using said database and said non-OSI operations system commands using said table to create messages for requesting services on said object instances.

2. The network management apparatus as claimed in claim 1, wherein said first interface is a Common Management Information Service or CMIS interface, and said second interface is a Transaction Language 1 or TL1 interface.

3. A method of generically mapping a Transaction Language 1 or TL1 command into a Common Management Information Service or CMIS-type service, comprising the steps of:

generating TL1 proxy objects corresponding to at least one of a plurality of CMIS-type services requested in said TL1 command;

generating a service message for delivery to a memory device which stores object instances organized into classes;

retrieving object classes stored in said memory device to which said service message is directed and saving said classes until corresponding ones of said plurality of services are complete;

performing said generating TL1 proxy objects step, said generating a service message step and said retrieving step to complete each of said plurality of services and correspondingly modify respective ones of said saved classes from a first state in said memory device;

generating a success message after said plurality of services are all complete; and generating a failure message if any one of said plurality of services fails to be completed, and restoring said object class to which said failed service was directed back to said first state.

4. The method as claimed in claim 3, further comprising the step of translating said failed service into a TL1 error code.

5. A control system for a network element apparatus in an access system, the network element comprising common equipment for supporting a plurality of different subscriber systems, the common equipment having a number of circuit packs for performing functions common to all of the subscriber systems, and the subscriber systems each also having at least one circuit pack for performing functions associated with that subscriber system, the control system comprising:

at least one processor in each of said plurality of subscriber systems, said plurality of subscriber systems being connected to at least one of said common equipment circuit packs and operable in accordance with at least one of a plurality of application subsystems;

at least one processor in said common equipment for controlling the operation of the circuit packs therein and for communicating with said at least one of subscriber system processors; and at least one memory device connected to and accessed by said common equipment processor, said memory device comprising:

a collection of objects, subsets of said collection of objects corresponding to respective ones of said application subsystems; and at least one subagent stored therein and used by said common equipment processor for supporting each of said application subsystems;

said common equipment processor being programmed to operate a common subagent interface along which each of said subagents can generate and transmit messages to other ones of said subagents and receive messages therefrom.

6. A network element control system as claimed in claim 5, wherein said subagents are configured to send messages to at least one object from said collection of objects that is associated with a destination application subsystem, said common equipment processor being operable to route said messages to said destination application subsystems transparently with respect to said originating subagents using said object such that the organization of said collection of objects and said subsystems is concealed from said originating subagents.

7. A network element control system as claimed in claim 6, wherein at least one of said plurality of application subsystems is an administrative subsystem for performing at least one of a group of functions consisting of creating and maintaining virtual network elements with respect to said network element, alarm and event reporting to a management system external to said network element, and database synchronization, back-up and restoration, and said collection of objects comprises an administrative subagent object class defining services available in said memory device corresponding to said administrative subsystem.

8. A network element control system as claimed in claim 7, wherein said collection of objects comprises a virtual network element object class defining services available in said memory device for accessing and operating on one of said virtual network elements created by said administrative subsystem.

9. A network element control system as claimed in claim 6, wherein at least one of said plurality of application subsystems is a network management subsystem for providing protocol stacks to interface said network element with different management systems external to said network element, and said collection of objects comprises a network management subagent object class defining services available in said memory device corresponding to said network management subsystem.

10. A network element control system as claimed in claim 9, wherein said collection of objects comprises a session object class defining messages to validate commands from one of said external management systems and to inhibit and allow messages during a session initiated by a user of said external management system.

11. A network element control system as claimed in claim 6, wherein at least one of said plurality of application subsystems is a turnup subsystem for performing at least one of a group of functions consisting of coordinating the start-up functions of said circuit packs, downloading software to said circuit packs and verifying the correct software load is present on said circuit packs, and said collection of objects comprises a turnup subagent object class defining messages to control the advancement of said turnup subsystem through a state model.

12. A network element control system as claimed in claim 11, wherein said collection of objects comprises a list of said circuit packs supported by said turnup subsystem.

13. A network element control system as claimed in claim 6, wherein at least one of said common equipment circuit packs processes signals from a synchronous optical network connected to said network element, at least one of said plurality of application subsystems is a transport access subsystem for managing equipment and terminations associated with said synchronous optical network, and said collection of objects comprises a transport access subagent object class defining services available in said memory device corresponding to said transport access subsystem.

14. A network element control system as claimed in claim 6, wherein at least one of said plurality of application subsystems is a call processing subsystem for controlling the assignment of channels associated with said network element among said subscriber systems, and said collection of objects comprises a call processing subagent object class defining messages to control the advancement of said call processing subsystem through a state model.

15. A network element control system as claimed in claim 6, wherein said subagents are each configured to place at least one of a plurality of subagent object instance identifiers in each of said messages to identify an object from said collection of objects, each of said plurality of subagent object instance identifiers corresponding to one of said objects and one of said application subsystems which operates on said object.

16. A method of controlling a network element apparatus in an access system comprising a plurality of different subscriber systems, each subscriber system having at least one circuit pack and a software subsystem to manage the circuit pack, and common equipment for supporting the subscriber systems having a number of circuit packs and software subsystems for performing functions common to all of the subscriber systems, the method comprising the steps of:

storing a collection of objects in a memory device connected to said common equipment, subsets of said collection of objects corresponding to respective ones of said software subsystems;

generating and storing an object identifier uniquely mapping one of said collection of objects to one of said software subsystems; and transmitting a message which comprises said object identifier to one of said collection of objects from one of said subsystems.

17. A method for controlling a network element apparatus as claimed in claim 16, wherein said transmitting step comprises the steps of each of said subsystems transmitting messages comprising one of a plurality of said object identifiers to other said subsystems along a common interface provided by a central processor in said common equipment, and further comprising the steps of:

receiving messages comprising one of said plurality of object identifiers along said common interface; and determining from said object identifier one of said subsystems and a transaction to be performed thereby, said object identifier in each of said messages being useful to conceal the objects and subsystems of said receiving subsystems from said transmitting subsystems.

18. A control system for a network element apparatus in an access system comprising a plurality of different subscriber systems, each subscriber system having at least one circuit pack and a software subsystem to manage the circuit pack, and common equipment for supporting the subscriber systems and having a number of circuit packs and software subsystems for performing functions common to all of the subscriber systems, the control system comprising:

a communications network associated with said common equipment and connected to a plurality of said circuit packs associated with said common equipment and said plurality of subscriber systems to transport messages therebetween, said circuits packs and said software subsystems being characterized as applications, said messages comprising circuit pack identifiers corresponding to source and destination circuit packs, respectively, and application class identifiers specifying at least one of a plurality of tasks that can be performed by said source and destination circuit packs, and a message payload, said communications network being configured to transport messages between applications using application class identifiers while concealing physical board addresses from said source and destination circuit packs.

19. A control system as claimed in claim 18, wherein said messages each further comprise an inter-process message header, said inter-process message header comprising a message class that is defined for each of said subsystems and for messages that are not part of one of said subsystems.

20. A control system as claimed in claim 19, wherein said message class specifies the manner in which said message payload is to be de-coupled and delivered via said communication network, said communication network being operable to transport messages between said subsystems when said subsystems employ different protocols.

21. A control system as claimed in claim 19, further comprising a memory device accessible by said common equipment for storing a collection of objects, said communications network being configured to transport messages between said software subsystems, said software subsystems being operable to communicate with other ones of said software subsystems by sending messages to selected objects in said collection of objects, said messages each comprising an object identifier which uniquely maps an object in said collection of objects to one of said subsystems.

22. A control system as claimed in claim 21, wherein said message class is operable to decouple different message formats used between said circuit packs and between subsystems.

23. A control system as claimed in claim 22, wherein said communication network is approximately an open system interconnect-type protocol stack having a plurality of communication layers comprising at least a low level layer for messaging between said circuit packs, and a high level layer for messaging between said subsystems using said collection of objects.

24. A control system as claimed in claim 19, wherein communications network is configured to support a plurality of delivery services for the transport of said messages, said inter-process message header comprising data indicating which of said delivery services is to be used when transporting said message or a response thereto.

25. A control system as claimed in claim 24, wherein said plurality of delivery services comprises services selected from a group of services consisting of: single and multiple attempts to deliver a message, transmission service, error recovery service, post back signal generation circuit upon delivery failure, and route diversity when delivery by a first route fails.

26. A method of controlling a network element apparatus in an access system comprising a plurality of different subscriber systems, each subscriber system having at least one circuit pack and a software subsystem to manage the circuit pack, and common equipment for supporting the subscriber systems and having a number of circuit packs and software subsystems for performing functions common to all of the subscriber systems, the method comprising the steps of:

defining a plurality of applications corresponding to different ones of said circuit packs and said software subsystems, said applications each being characterized by a plurality of application tasks that are performed by respective ones of said circuit packs and said software subsystems;

generating a message from one of said applications for delivery to another one of said applications, said message comprising a communications network header and an inter-process message header, said communications network header comprising a circuit pack identifier and an application class identifier, wherein said application class identifiers are assigned to corresponding tasks that can be performed by a circuit pack; and de-coupling said message to ascertain said circuit pack and said application task on said circuit pack to which said message is directed.

27. A method as claimed in claim 26, wherein said message further comprises an application header, and said inter-process message header comprises a message class, said de-coupling step further comprising the step of determining from said message class which of a number of formats is employed for said application header.

28. A method as claimed in claim 27, wherein said application header specifies one of a group of delivery services consisting of: single and multiple attempts to deliver a message, transmission service, error recovery service, post back signal generation circuit upon delivery failure, and route diversity when delivery by a first route fails.

29. A method as claimed in claim 26, further comprising the steps of:

generating a collection of objects representing said application tasks that can be performed by each subsystem;

generating a message comprising an object identifier for delivery between at least two of said software subsystems;

allocating a buffer associated with said communications network for transmitting said message;

determining from said object identifier which of said subsystems and the target application class identifier to send said message to via said communications network;

transmitting said message to said target application class identifiers via the communications network;

determining message type and accessing message payload in said inter-process message header using a message class library associated with said applications.

30. A method for mapping a command received from an external manager by a network element apparatus in an access system into a message having a format which can be processed by the network element apparatus, comprising the steps of:

generating at least one table of data in a memory device within the network element apparatus relating the command and parameters associated with the command to a message identifier;

converting said message identifier to a binary value within a predetermined range of values using a look-up table stored in said memory device, said look-up table relating said message identifier to one of said range of values, to a service provided on a communications network within said network element apparatus, and to at least one of a plurality of object classes which relate a plurality of objects stored in said memory device to each other;

generating an object class identifier using an address identifier within said command in combination with said object class;

converting said parameters in the command to message attributes; and generating a message from said object identifier, said message identifier and said attributes to invoke a service on at least one of said objects.

* * * * *